United States Patent [19]

McCullough et al.

[11] 4,257,096

[45] Mar. 17, 1981

[54] SYNCHRONOUS AND CONDITIONAL INTER-PROGRAM CONTROL APPARATUS FOR A COMPUTER SYSTEM

[75] Inventors: J. Warren McCullough, Rochester, Minn.; Terrell A. Poland, Davenport, Iowa; Dale N. Reynolds, Rochester, Minn.; Keith K. Slack, Rochester, Minn.; Richard T. Turner, Rochester, Minn.

[73] Assignee: International Business Machines Corporation, Armonk, N.Y.

[21] Appl. No.: 953,501

[22] Filed: Oct. 23, 1978

[51] Int. Cl.³ .............................................. G06F 15/16
[52] U.S. Cl. .................................................... 364/200
[58] Field of Search ........................................ 364/200

[56] References Cited

U.S. PATENT DOCUMENTS

| | | | |
|---|---|---|---|
| 3,657,736 | 4/1972 | Boom et al. | 364/200 |
| 3,984,818 | 10/1976 | Gnadeberg et al. | 364/200 |
| 4,015,242 | 3/1977 | Anceau et al. | 364/200 |
| 4,084,228 | 4/1978 | Dufond et al. | 364/200 |

Primary Examiner—Edward J. Wise
Attorney, Agent, or Firm—Kirkland & Ellis

[57] ABSTRACT

Synchronous and conditional inter-program control apparatus in a computer system is structured to temporarily suspend execution of an invoking program and to transfer processor control to an invoked program. Such transfer is initiated by a transfer initiation means which interacts with a function control means of a function control array and provides symbolic identification of an entry point in the invoked program and conditionally continuing the transfer mechanism. The function control means addresses call return elements (CRE's) when it is in an execute mode but transfers processor control back to the invoking program when it is in a by-pass mode. CRE's that are in an available, data-receivable state are chained on an available call return queue (ACQ) and may be removed therefrom and placed on a task dispatching element (TDE) on an as-needed basis through a receive message mechanism. Active CRE's contain a status save means for storing the state of the invoking program during execution of the invoked program. In the event there are no active CRE's available for such storage, a task switch occurs, and the current TDE, i.e., the invoking program, is inserted on a wait list of the ACQ where it remains until a CRE becomes available. When the CRE becomes available, the invoking program TDE is removed from the ACQ wait list and inserted in priority sequence on the task dispatching queue (TDQ). Once a CRE is made available to the TDE, the transfer initiation means is restarted. At the termination of the execution of the invoked program, a transfer return means transfers processor control back to the invoking program and inserts the CRE onto the ACQ. The invoking program then commences execution at the next sequential instruction.

52 Claims, 56 Drawing Figures

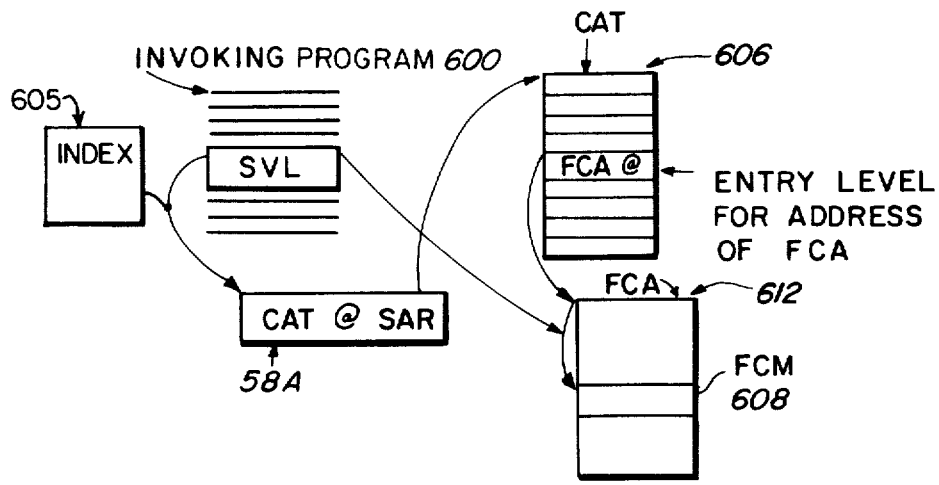
FIG-2A
GENERAL INSTRUCTION FORMATS
2-byte: | OP CODE | I FIELD |
EXPLICIT SVL
INDEX = I FIELD
IMPLICIT SVL
INDEX = OP CODE
4-byte: | OP CODE | I FIELD | OP1 @ |
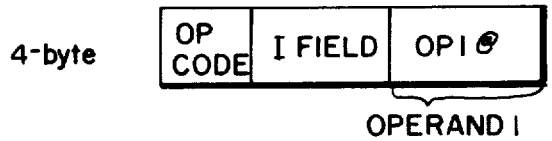
OPERAND 1
6-byte: | OP CODE | I FIELD | OP1 @ | OP2 @ |
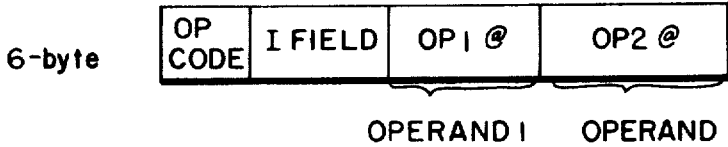
OPERAND 1  OPERAND 2
EXCEPTION SVL
INDEX = PREASSIGNED VALUE(S) IS(ARE) FORCED BY HARDWARE
FIG-2B

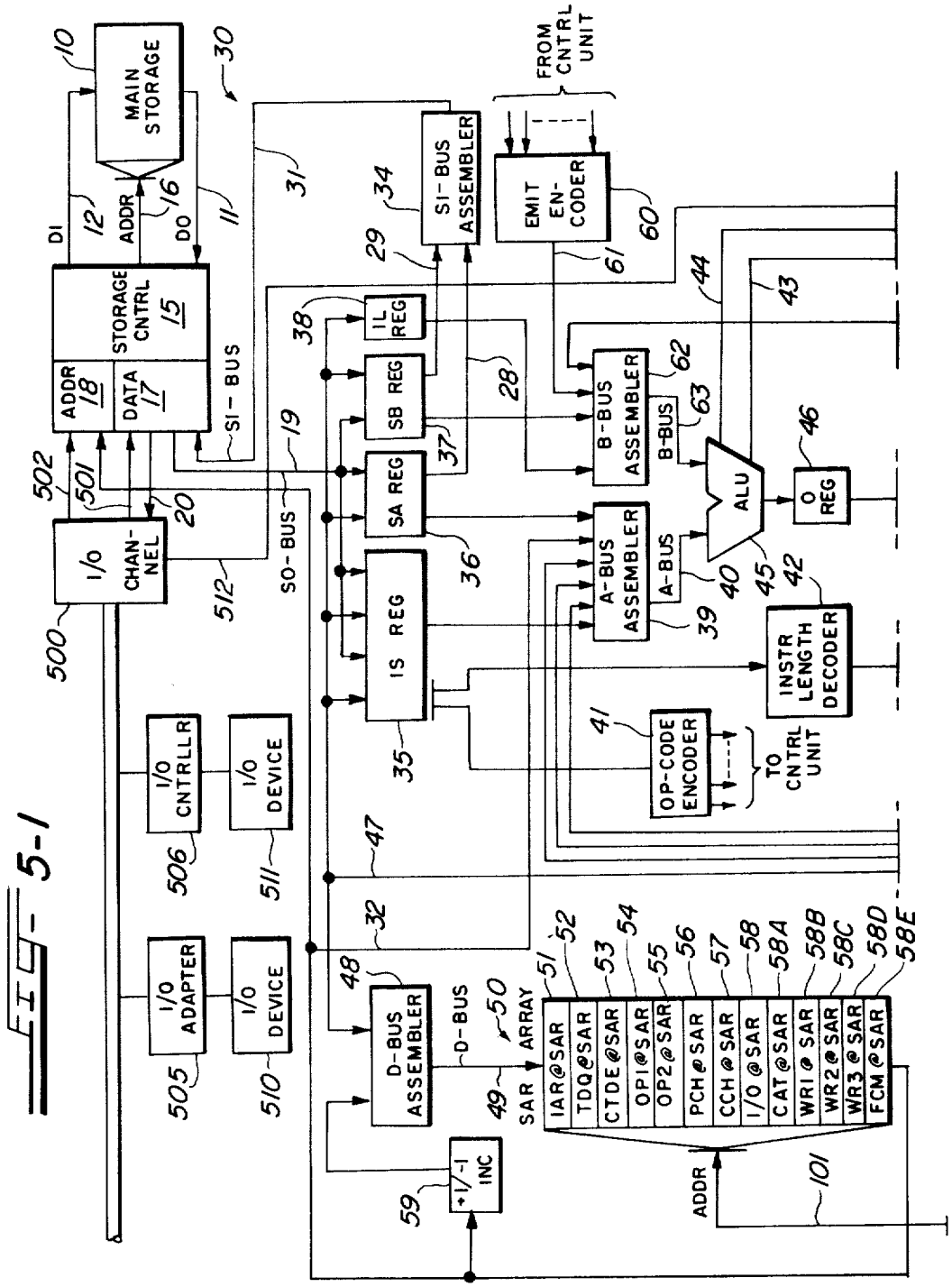

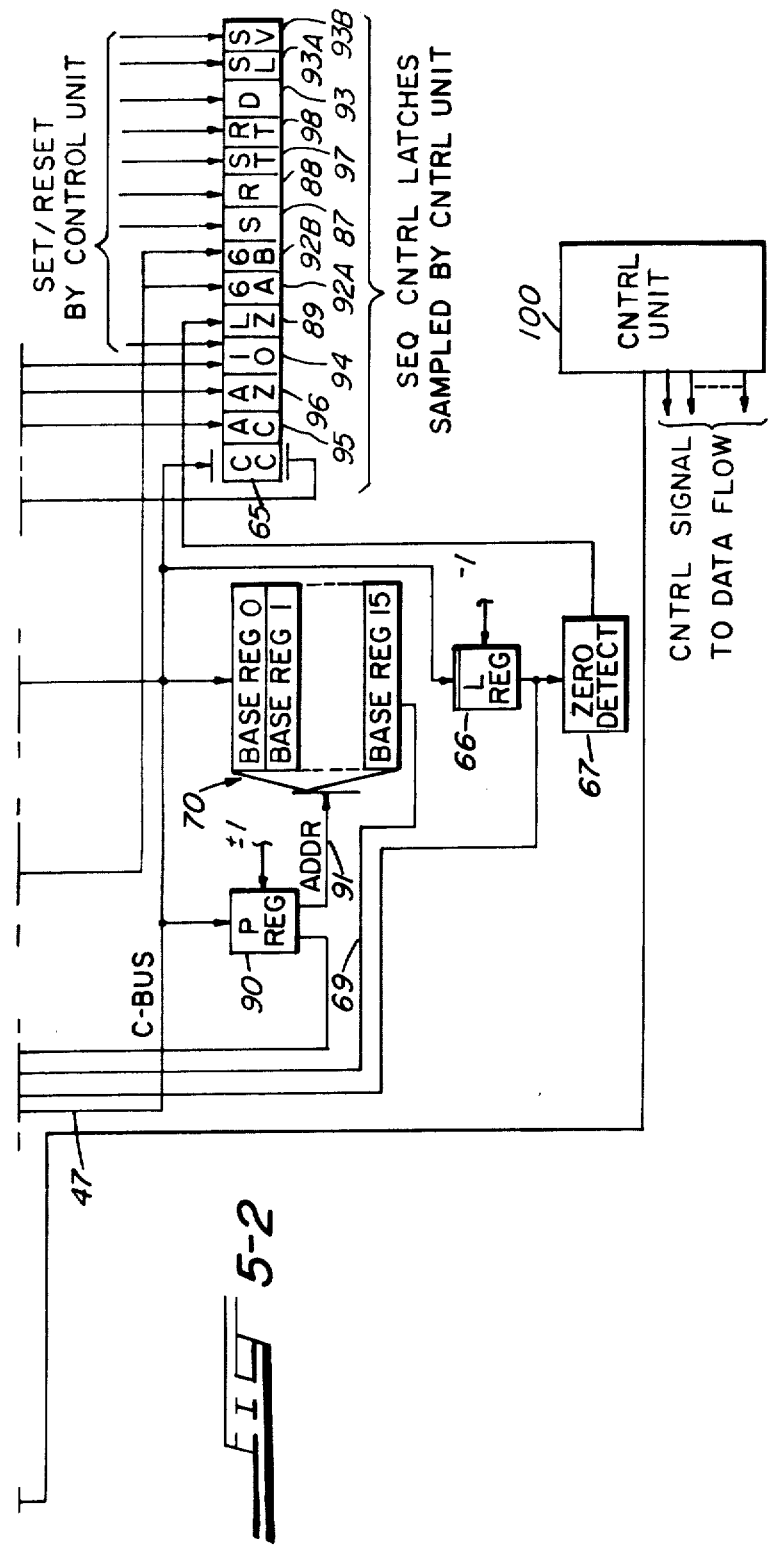

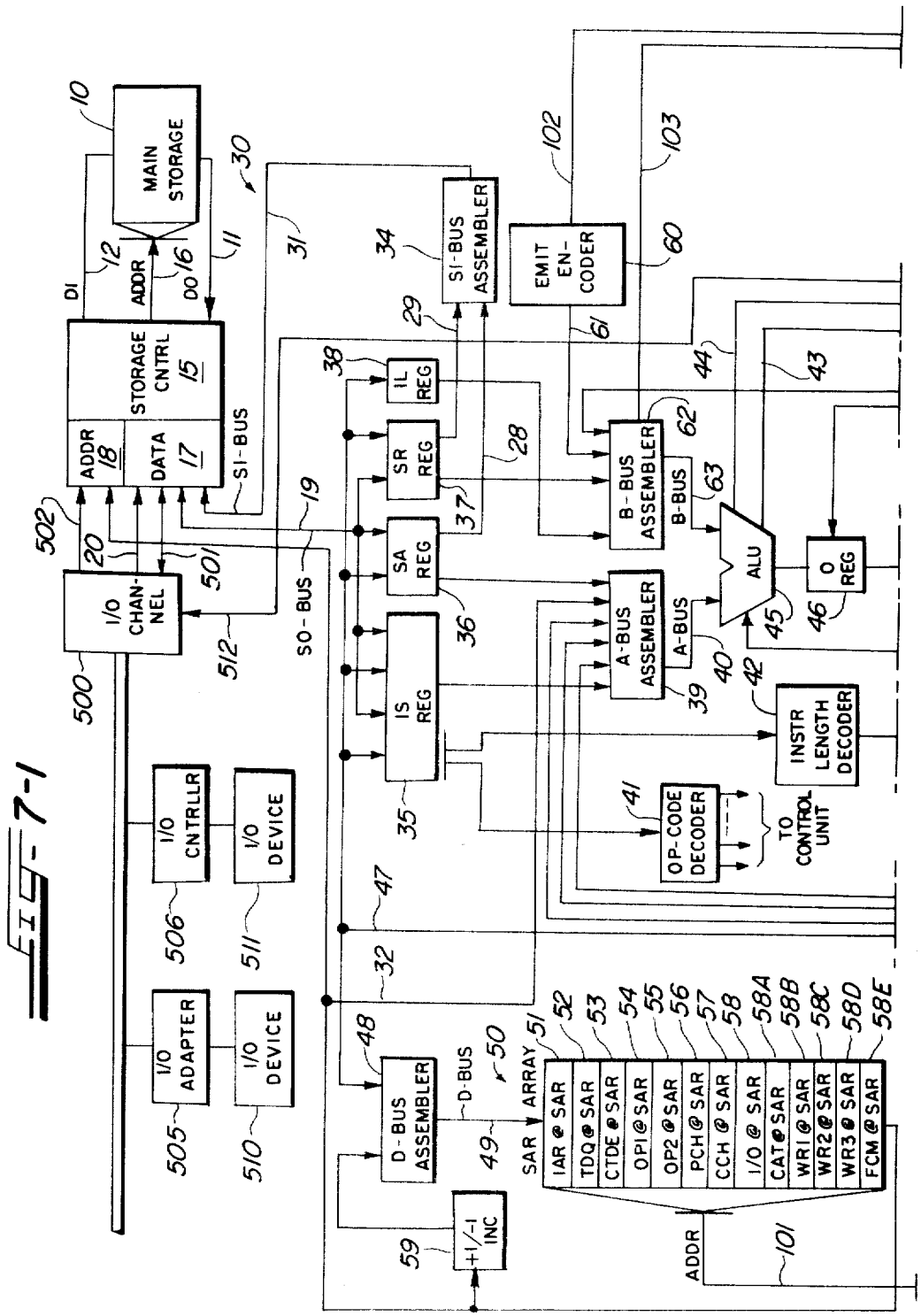

S - SEND OPERATION
RT - RECEIVE OPERATION TDE PHASE
D - DISPATCHER CYCLES REQ'D
LZ - L REG ALL ZEROS
6B - 6 BYTE INSTRUCTION
R - RECEIVE OPERATION
ST - SEND OPERATION TDE PHASE
CC - CONDITION CODE
AC - ALU CARRY
AZ - ALU ZERO
IO - I/O EVENT PENDING

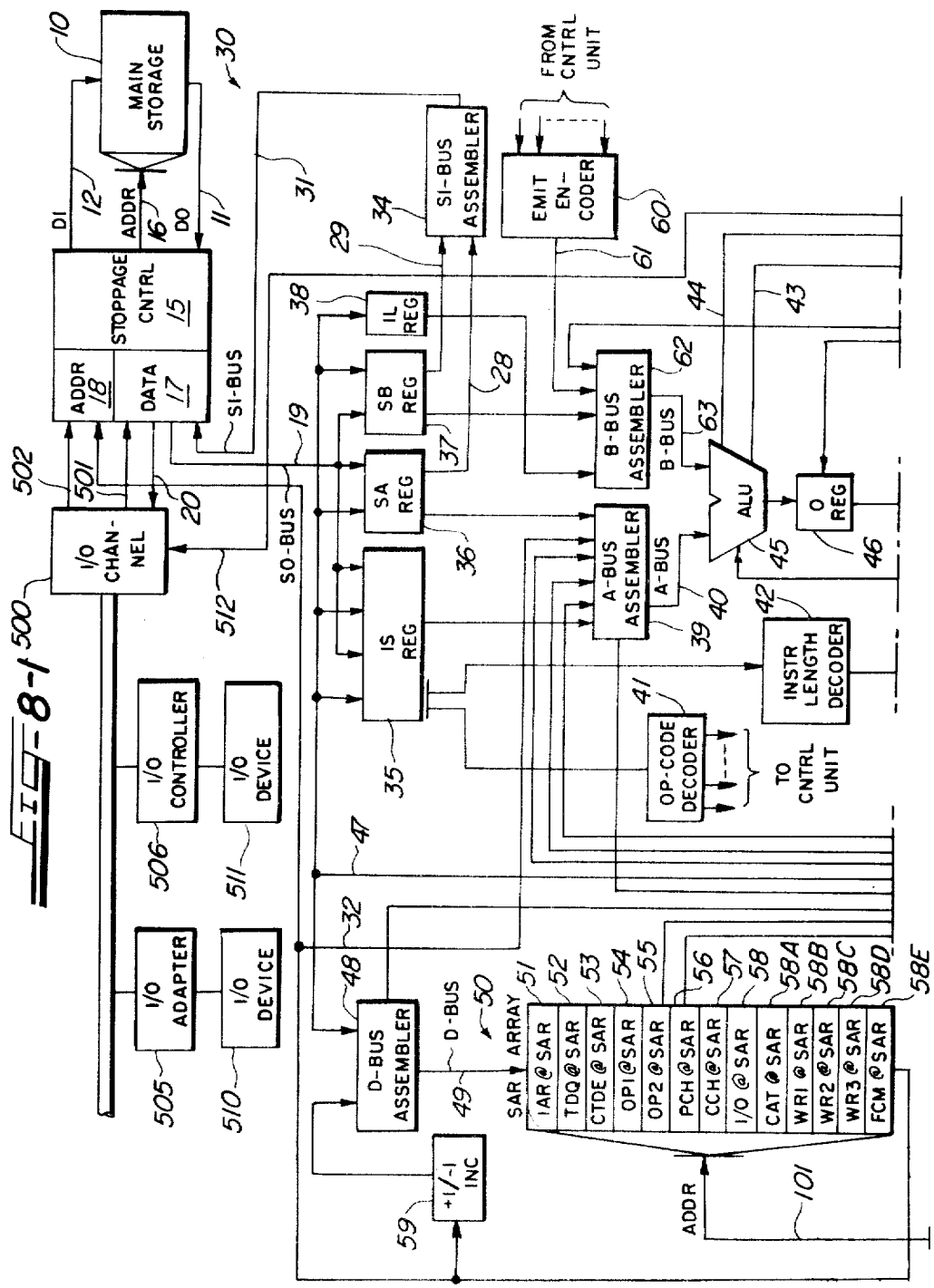

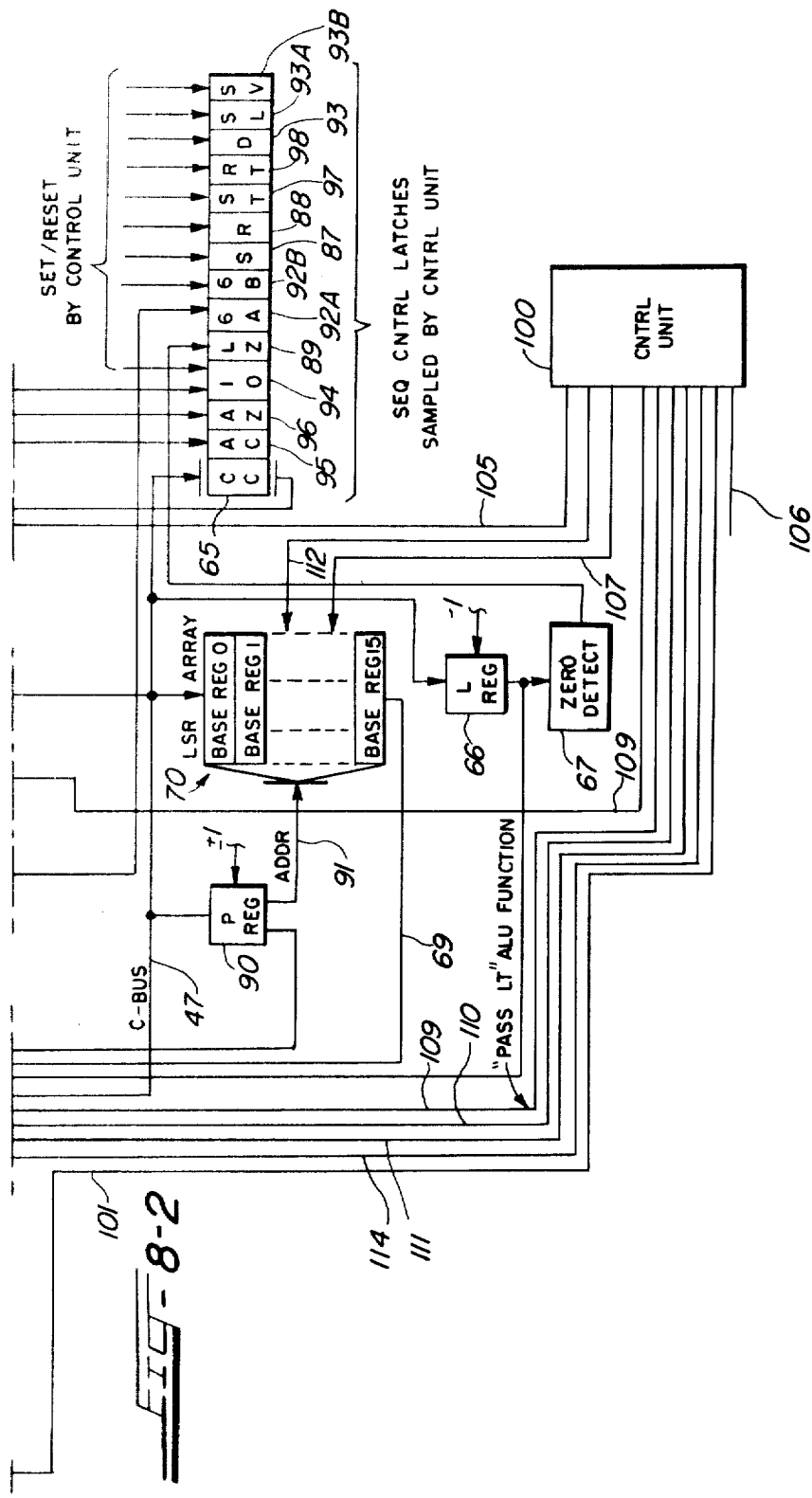

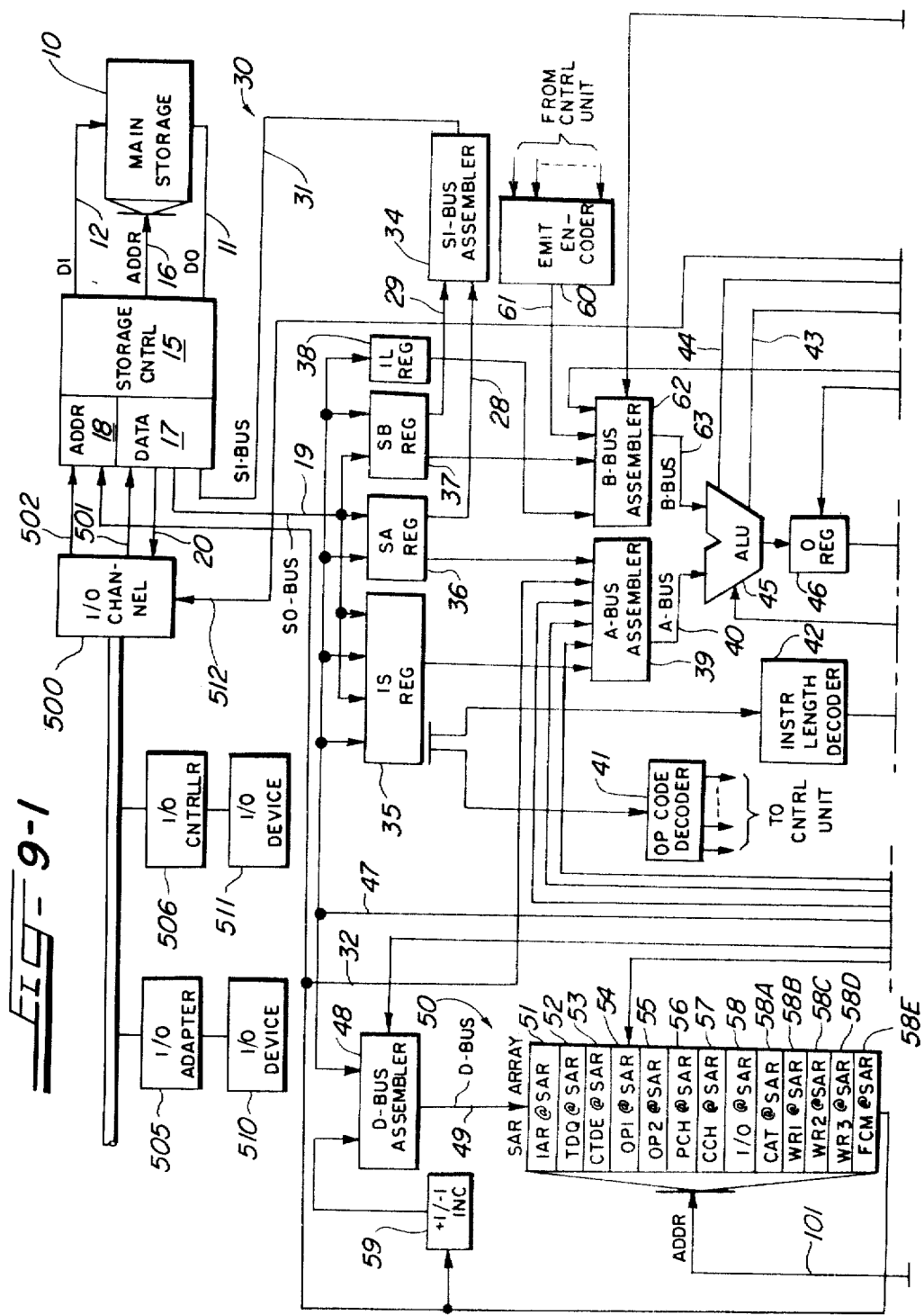

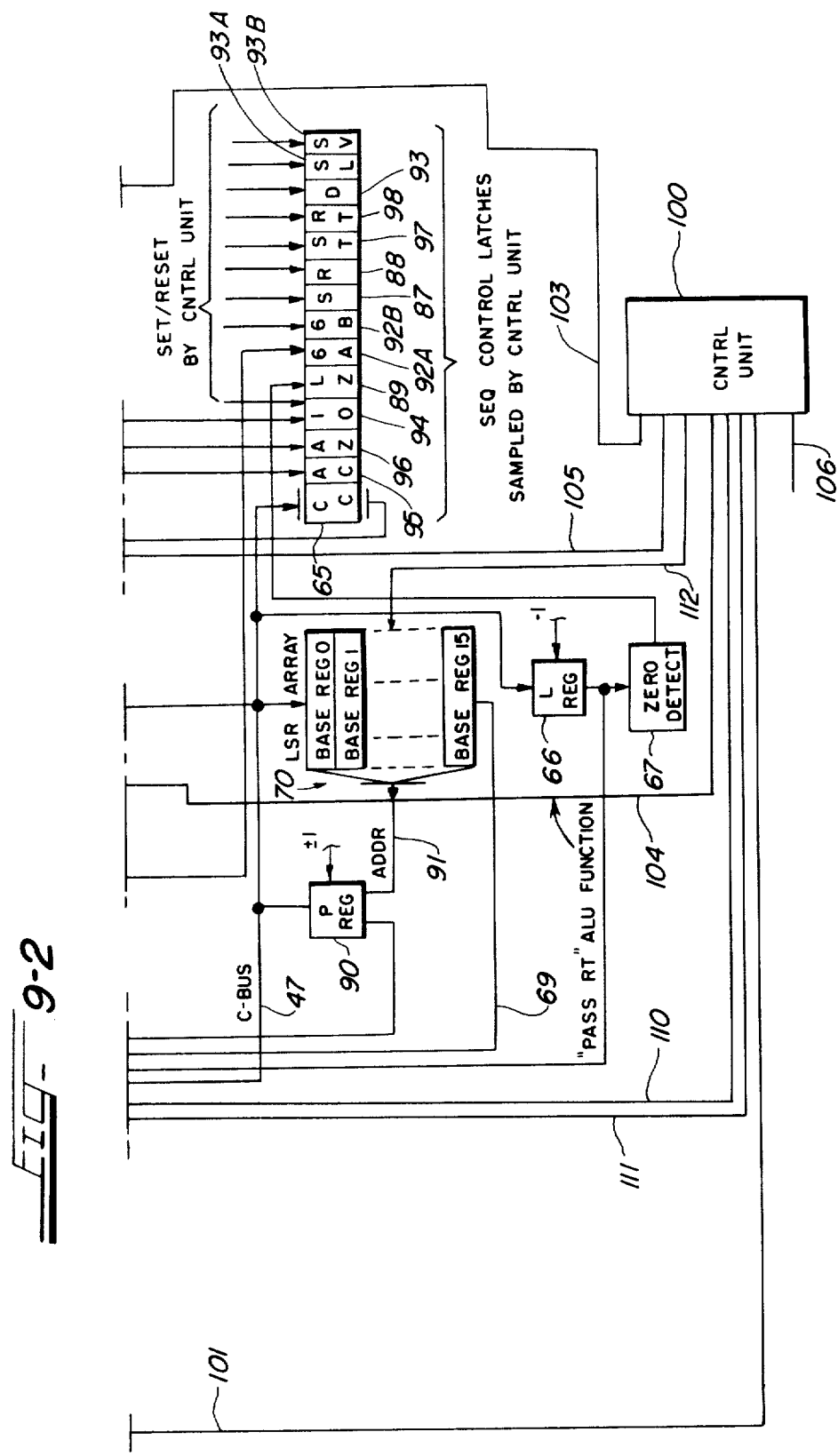

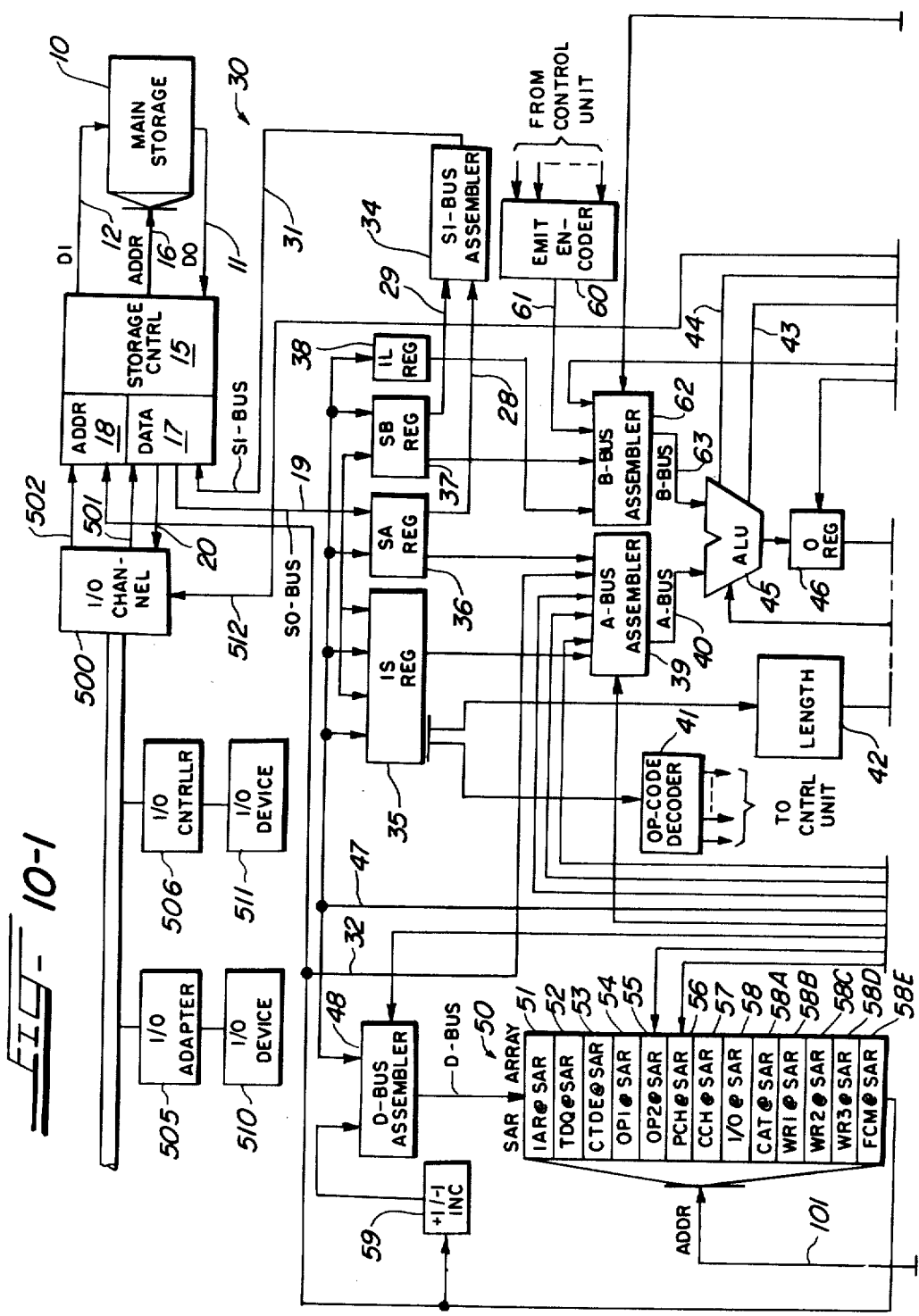

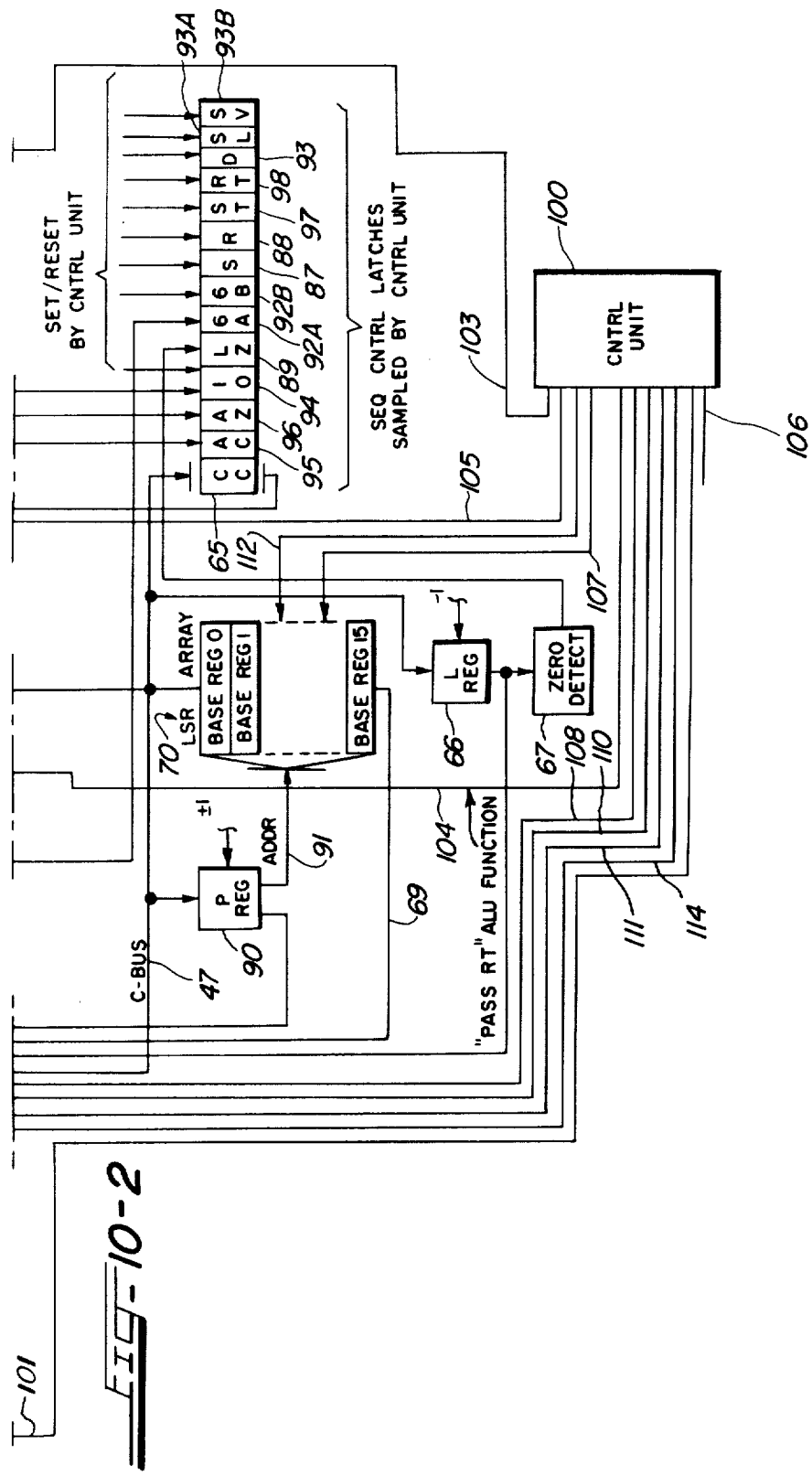

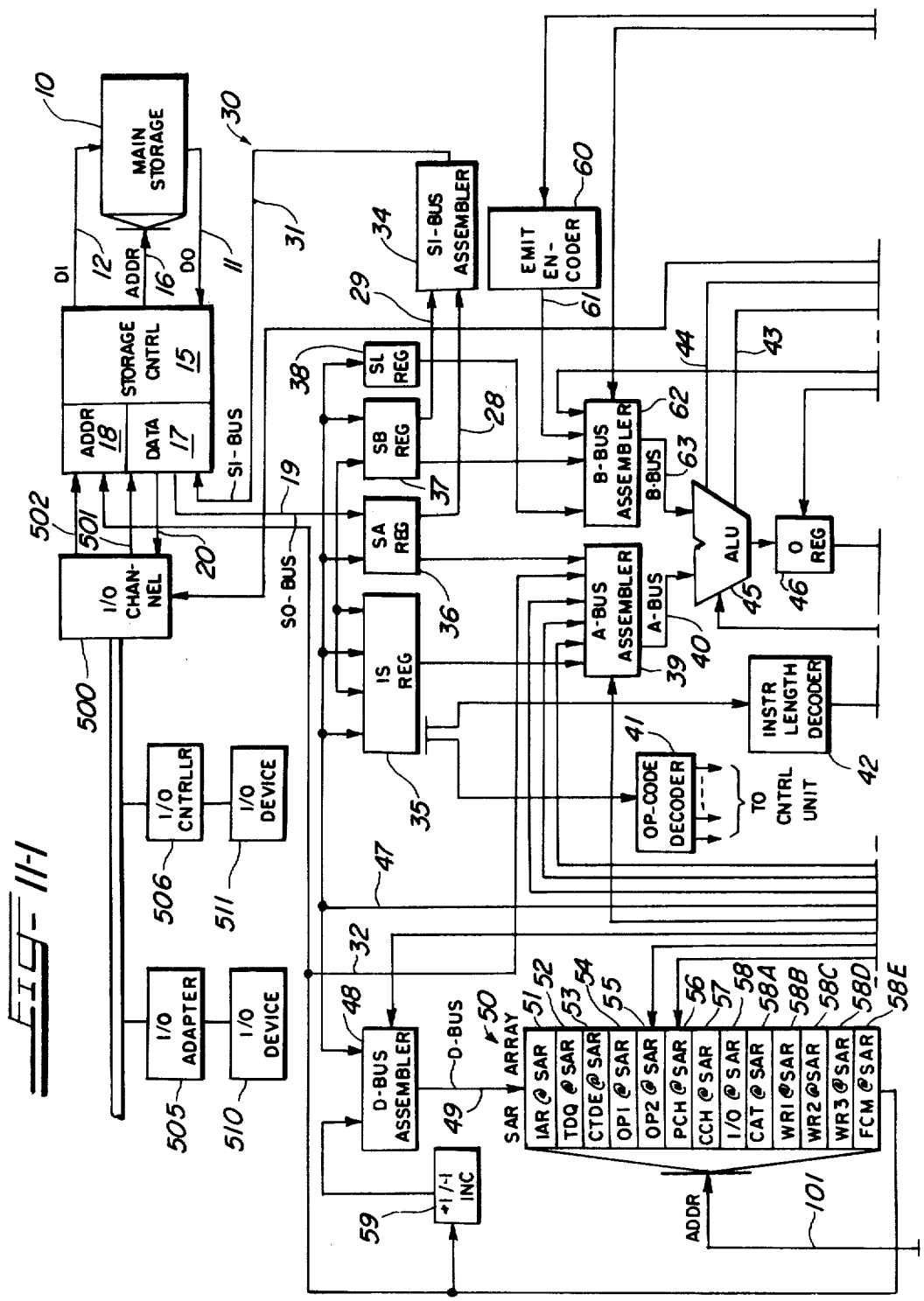

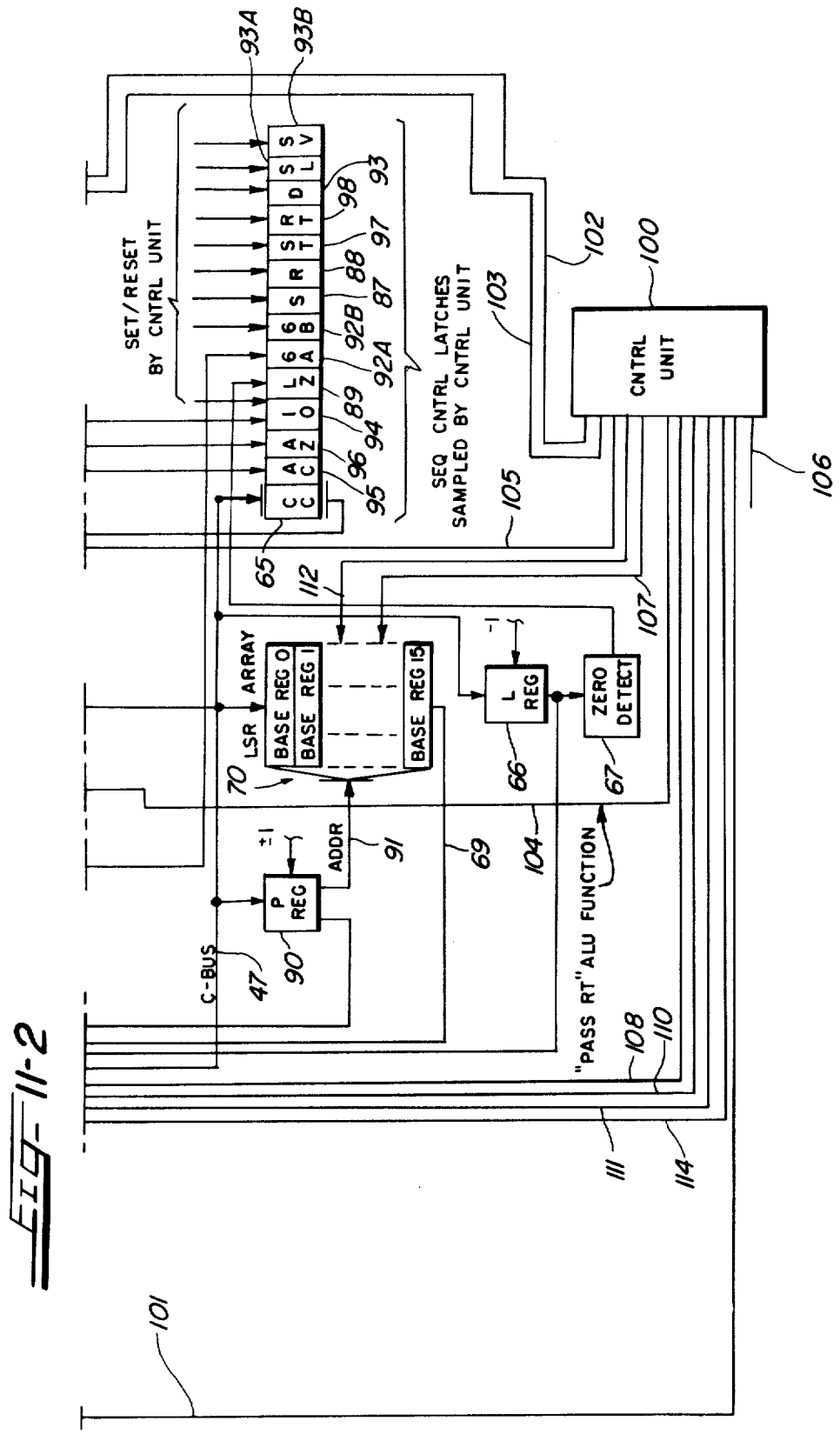

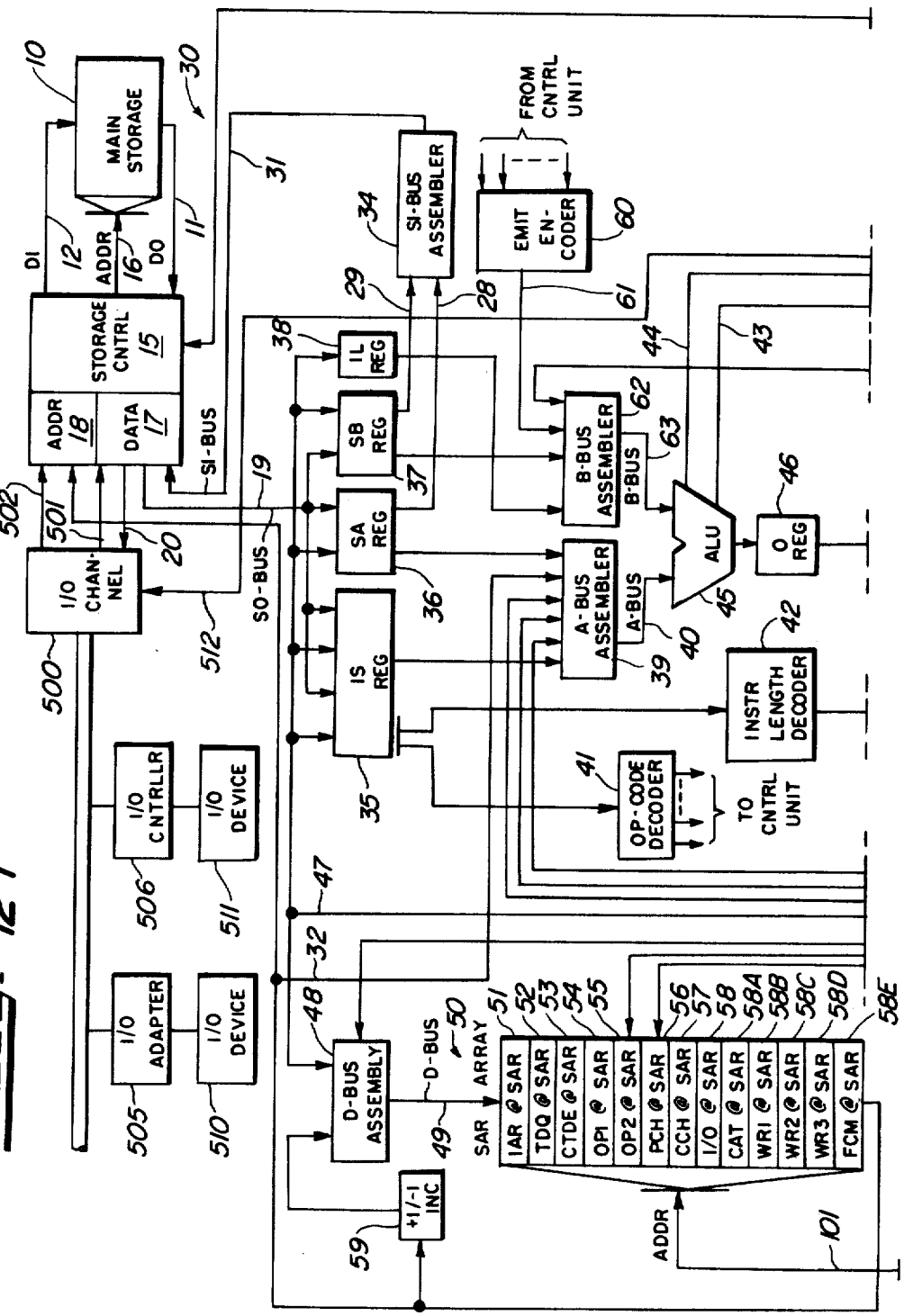

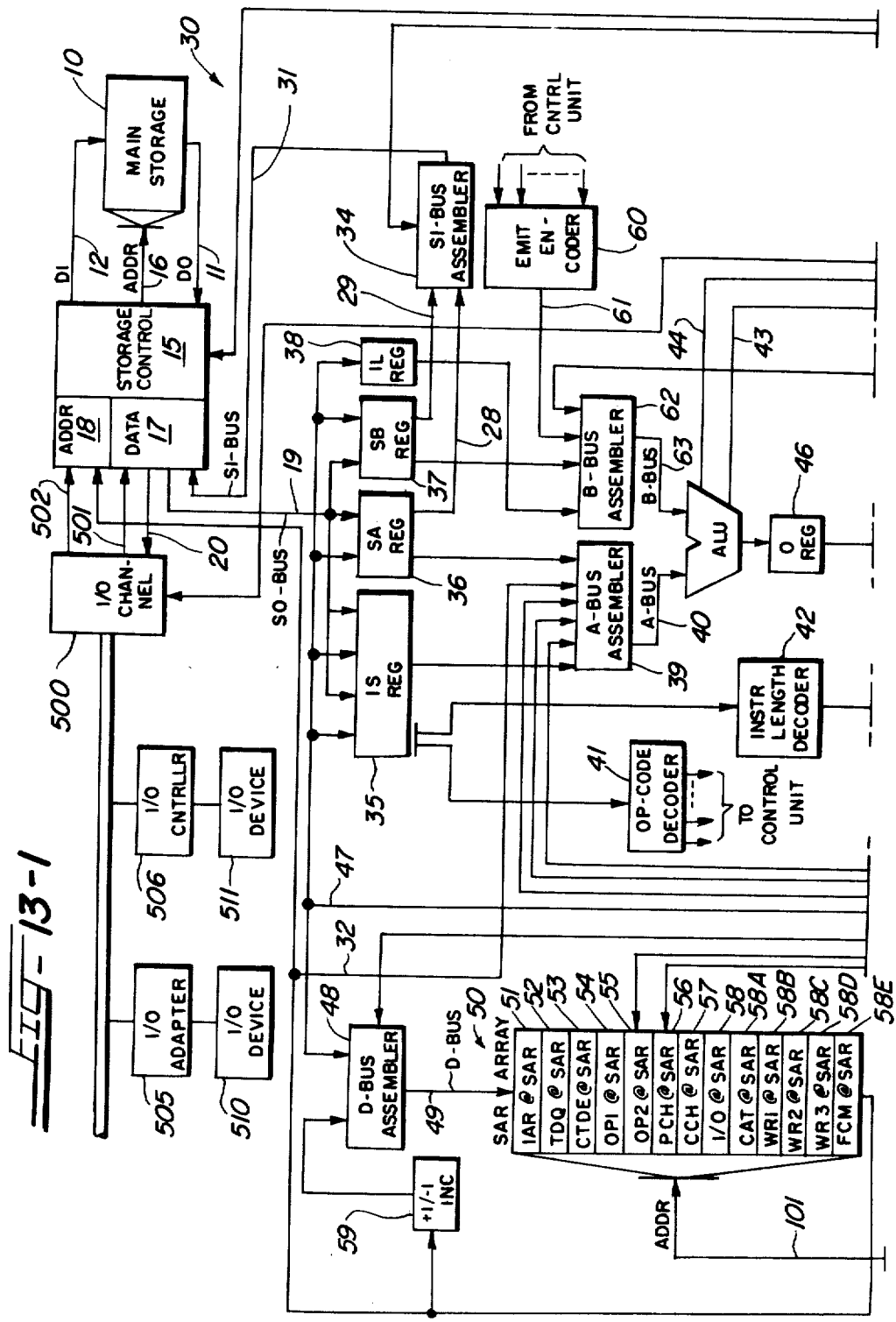

SVL/SVX SEQ CNTRL LATCHES

| | SL | SV |
|---|---|---|
| EXCEPTION SVL | 0 | ⊥ |
| IMPLICIT SVL | ⊥ | 0 |
| EXPLICIT SVL | ⊥ | ⊥ |
| SVX | ⊥ | 0 |

FIG. 14A

IL CTRL LATCHES

| | 6A | 6B |
|---|---|---|
| 2 BYTE=IL2 | ∅ | ∅ |
| 4 BYTE=IL4 | ⊥ | ∅ |
| 6 BYTE=IL6 | ⊥ | ⊥ |

FIG. 14B

PARAMETERS PASSED TO INVOKED PROGRAM

| | EXCEPTION PARAMETERS | OPERAND ADDRESSES | I FIELD OF INSTRUCTION | IAR INVOKING PROGRAM | CRE@ |
|---|---|---|---|---|---|
| EXCEPTION SVL | EXCEPTION TYPE EXCEPTION @ | | | ✓ | ✓ |
| IMPLICIT SVL | | NONE IL=2<br>OP1@ IL=4,6<br>OP2@ IL=6 | ✓ | ✓ | ✓ |
| EXPLICIT SVL | | NONE IL=2<br>OP1@ IL=4,6<br>OP2@ IL=6 | | ✓ | ✓ |

FIG. 14C

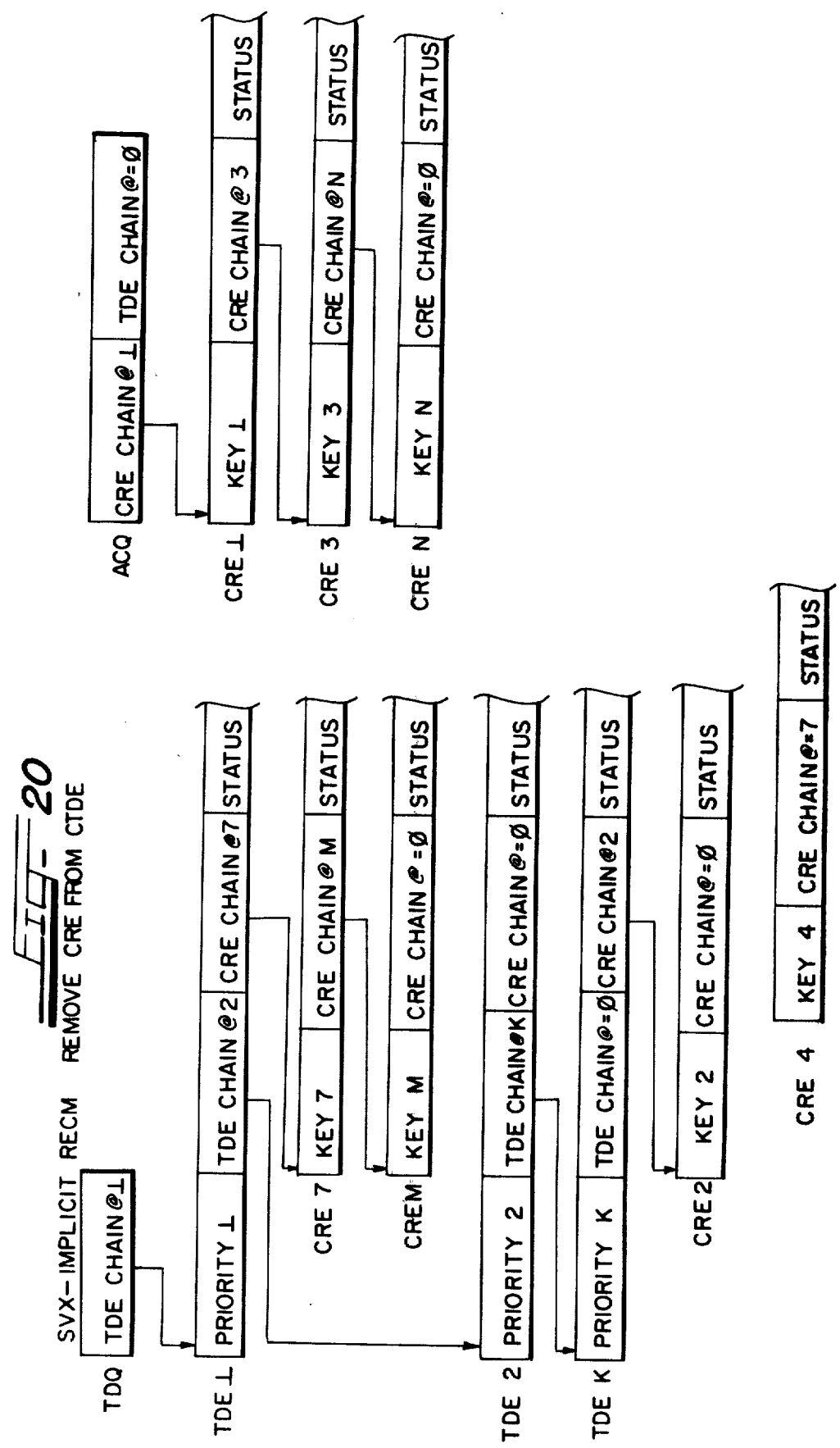

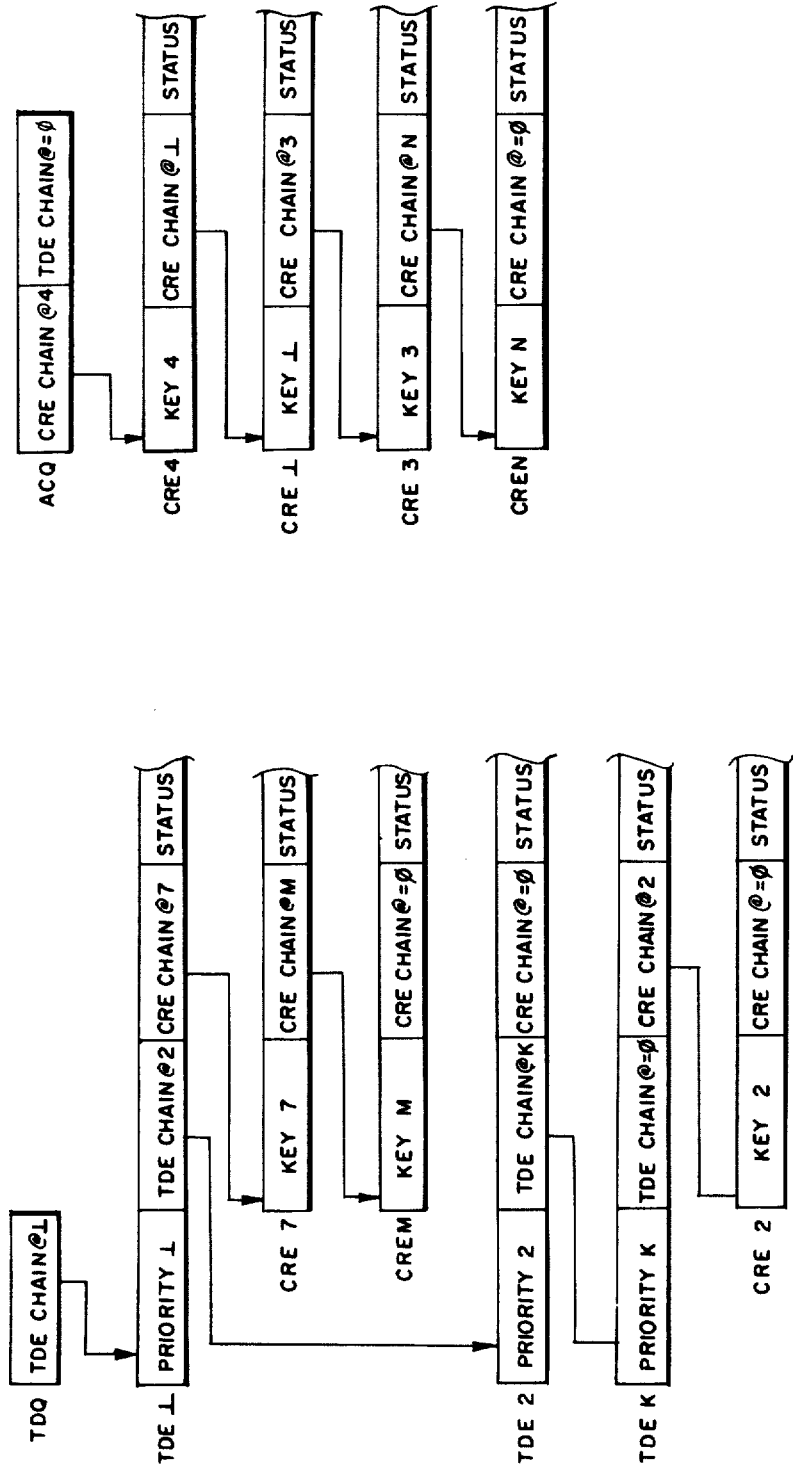

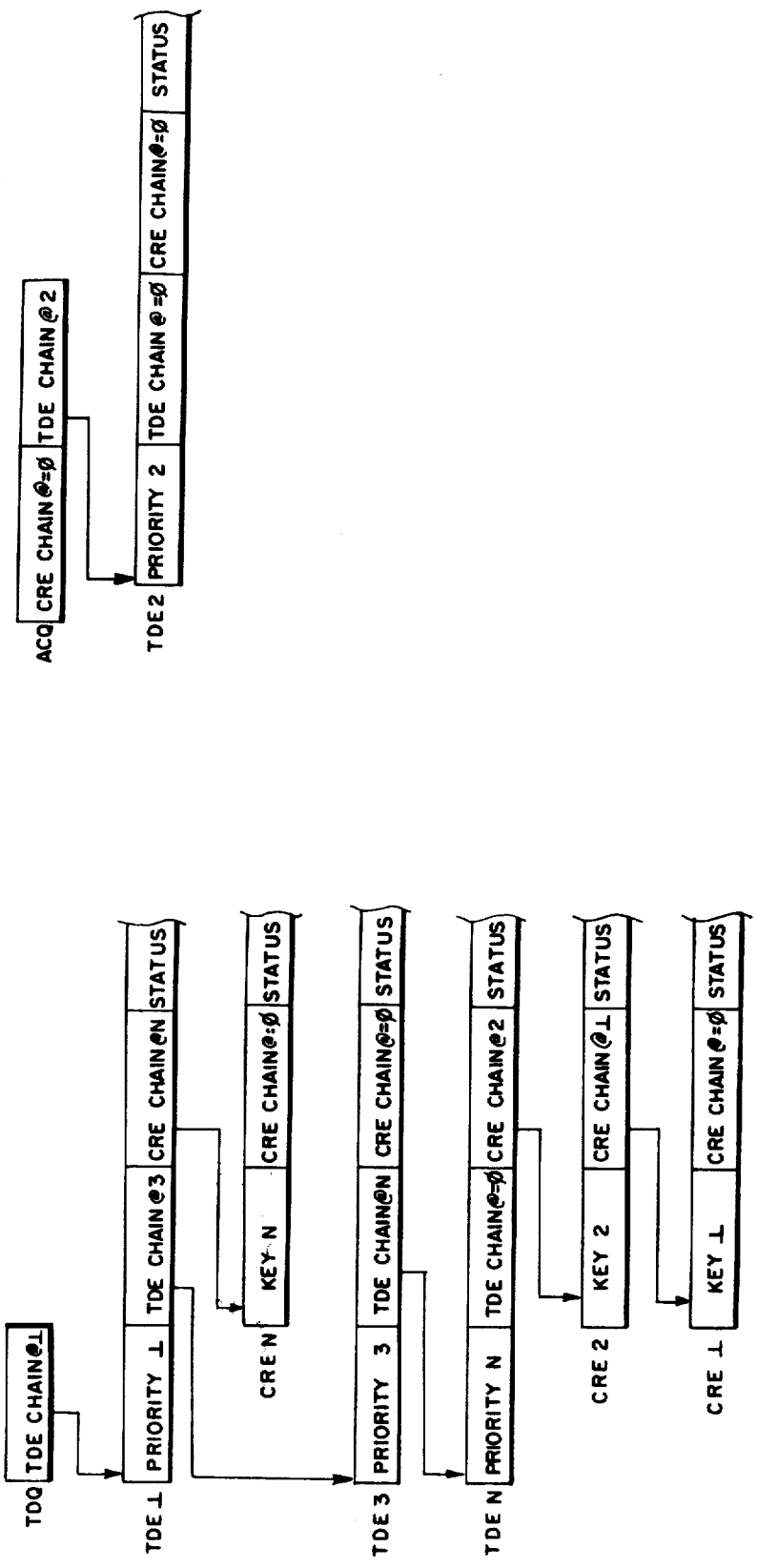

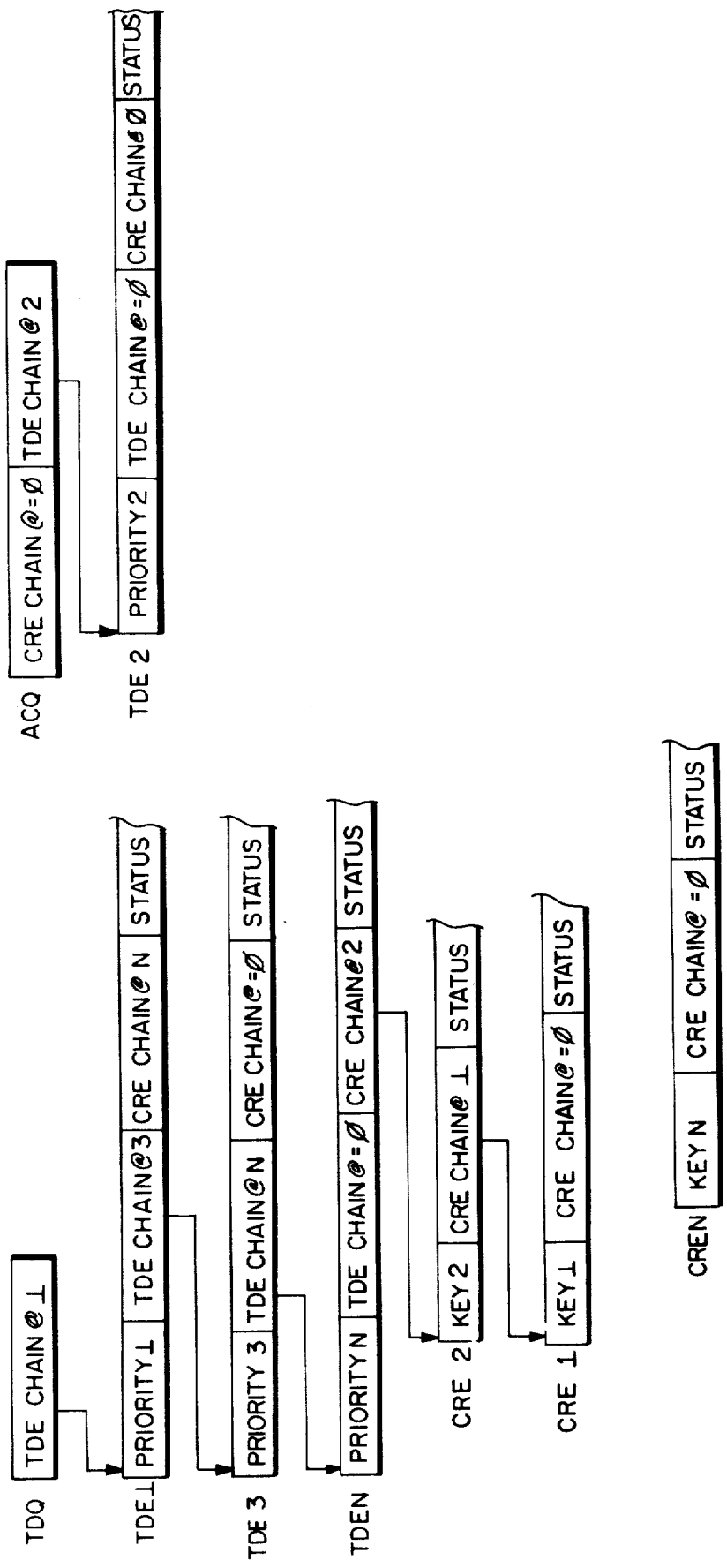

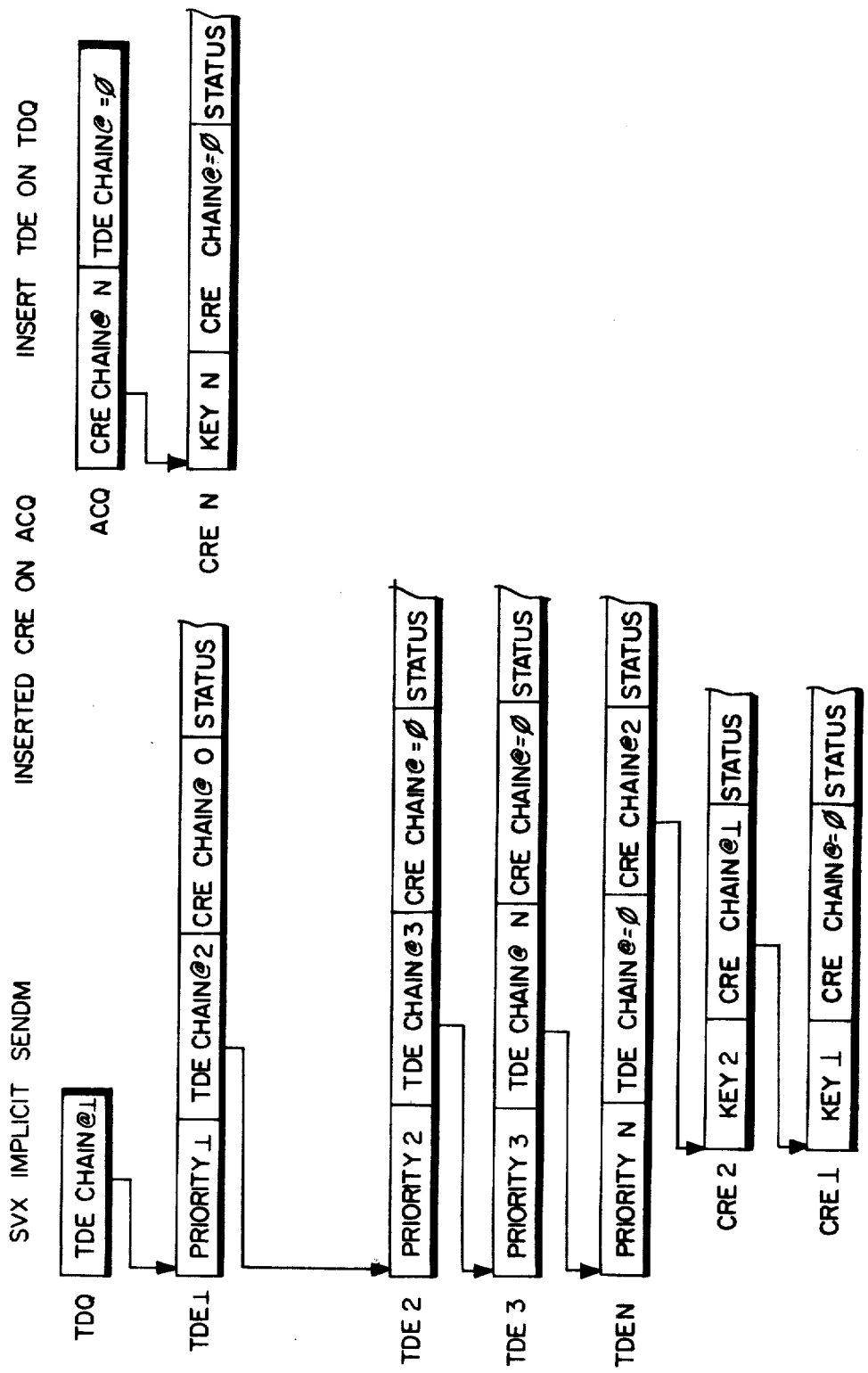

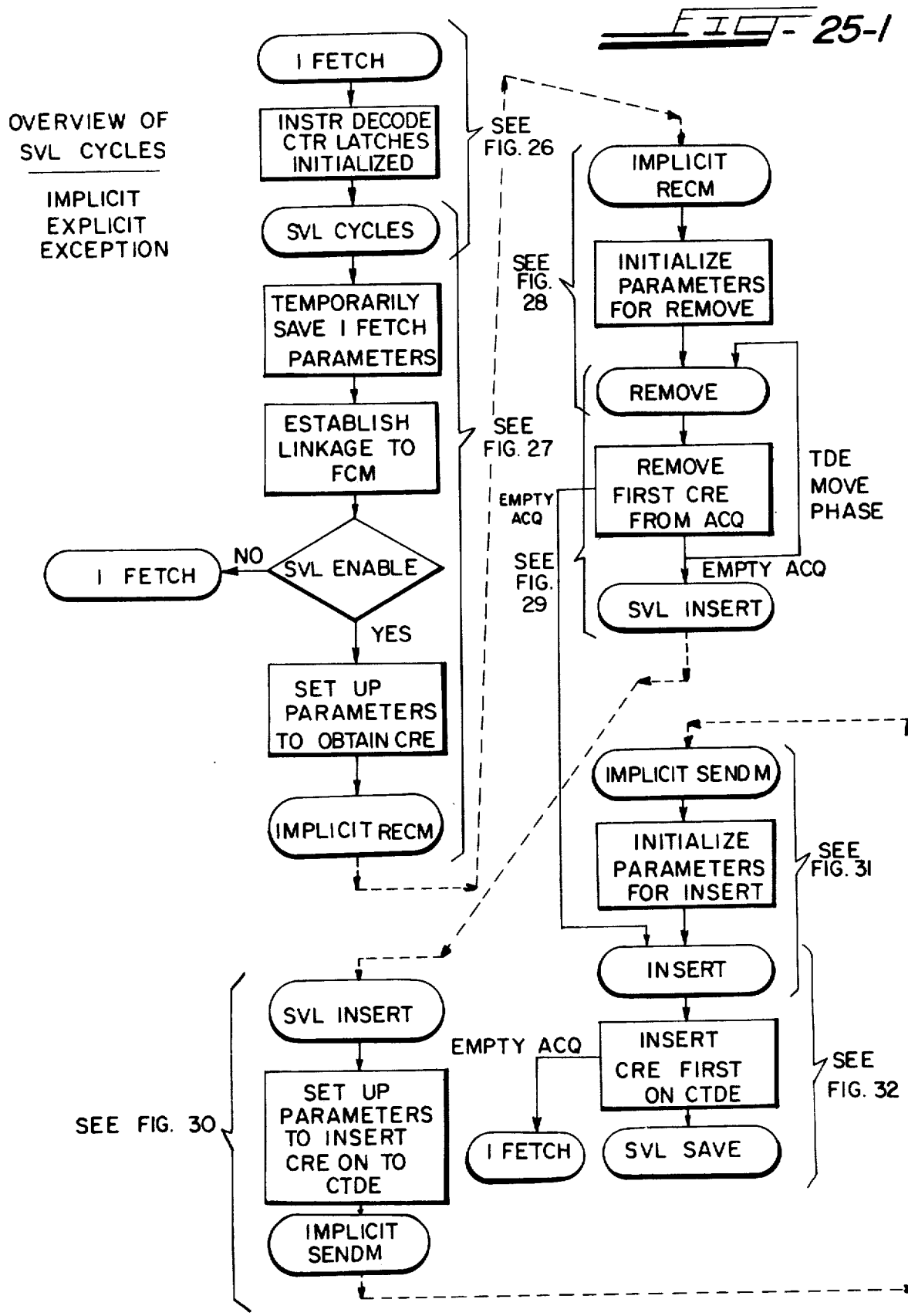

OVERVIEW OF SVL CYCLES

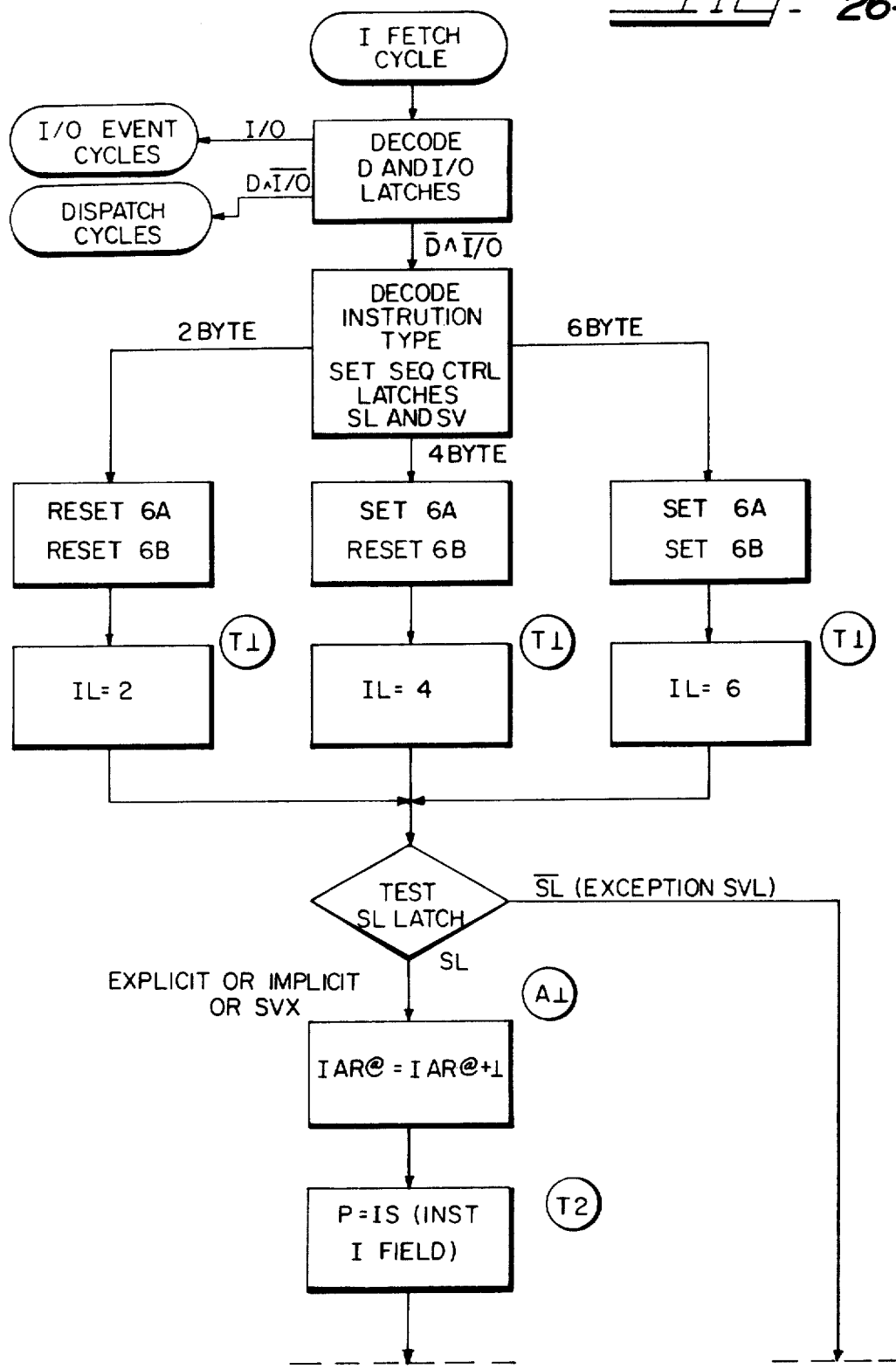

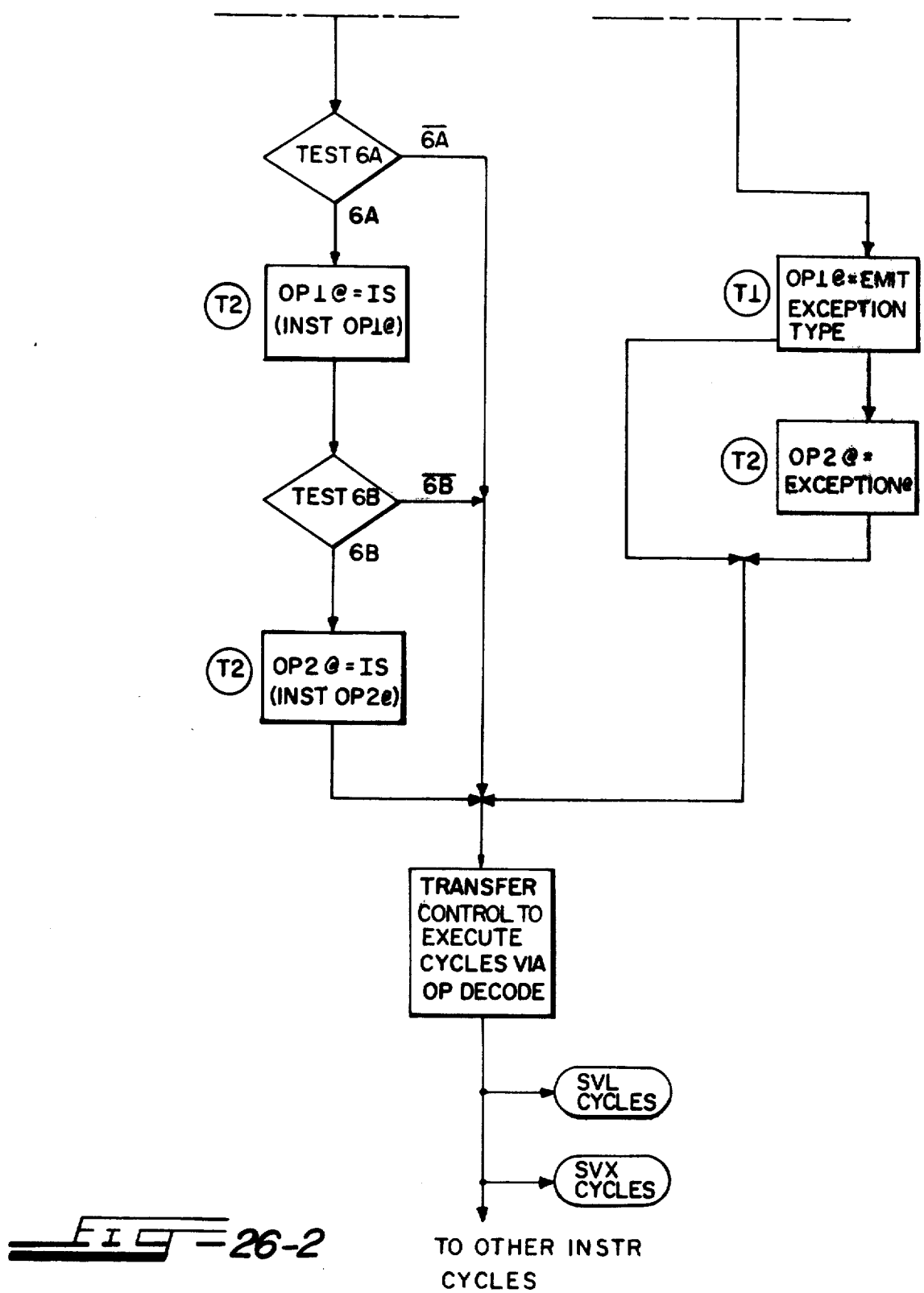

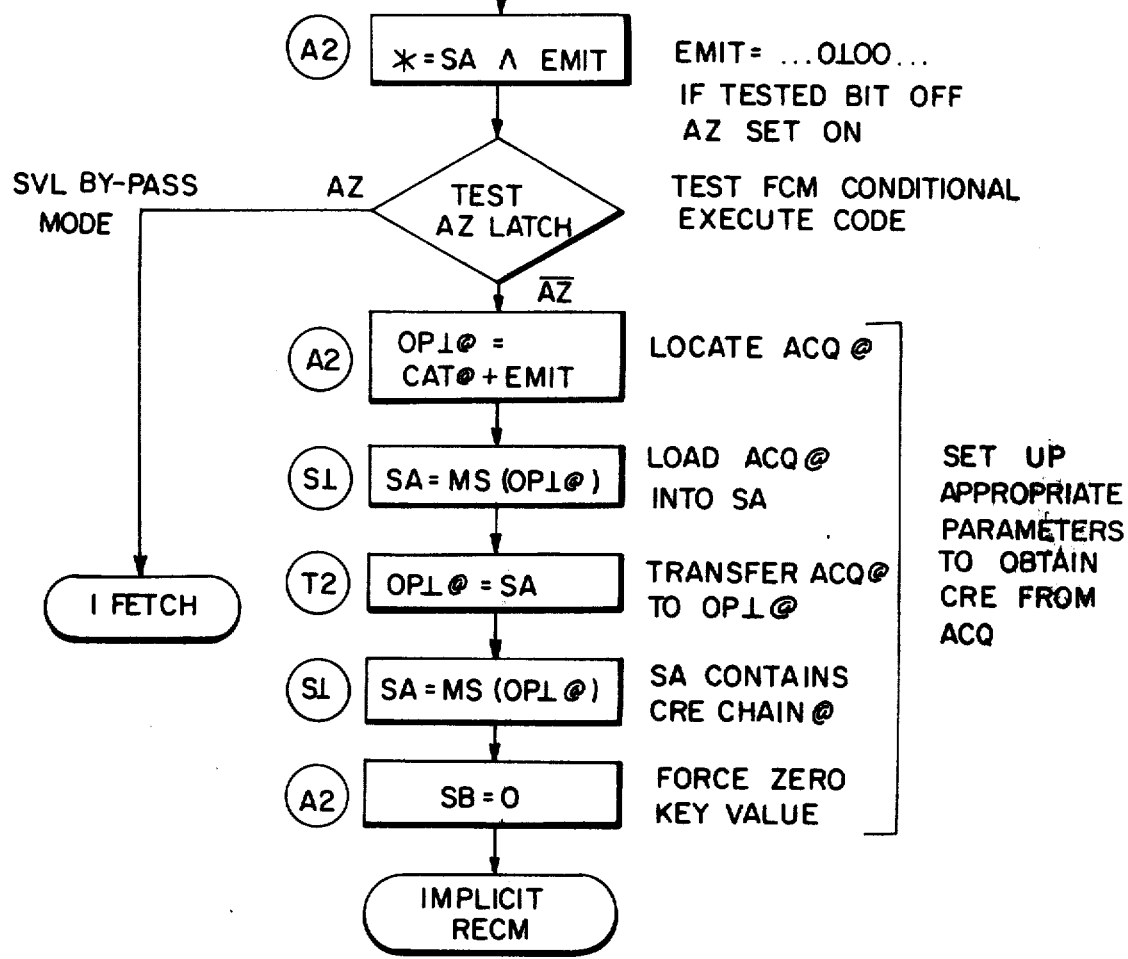

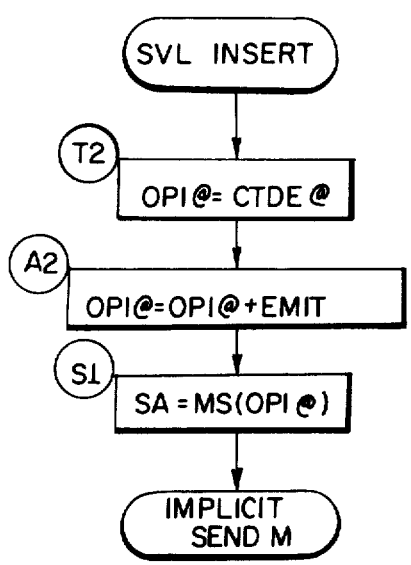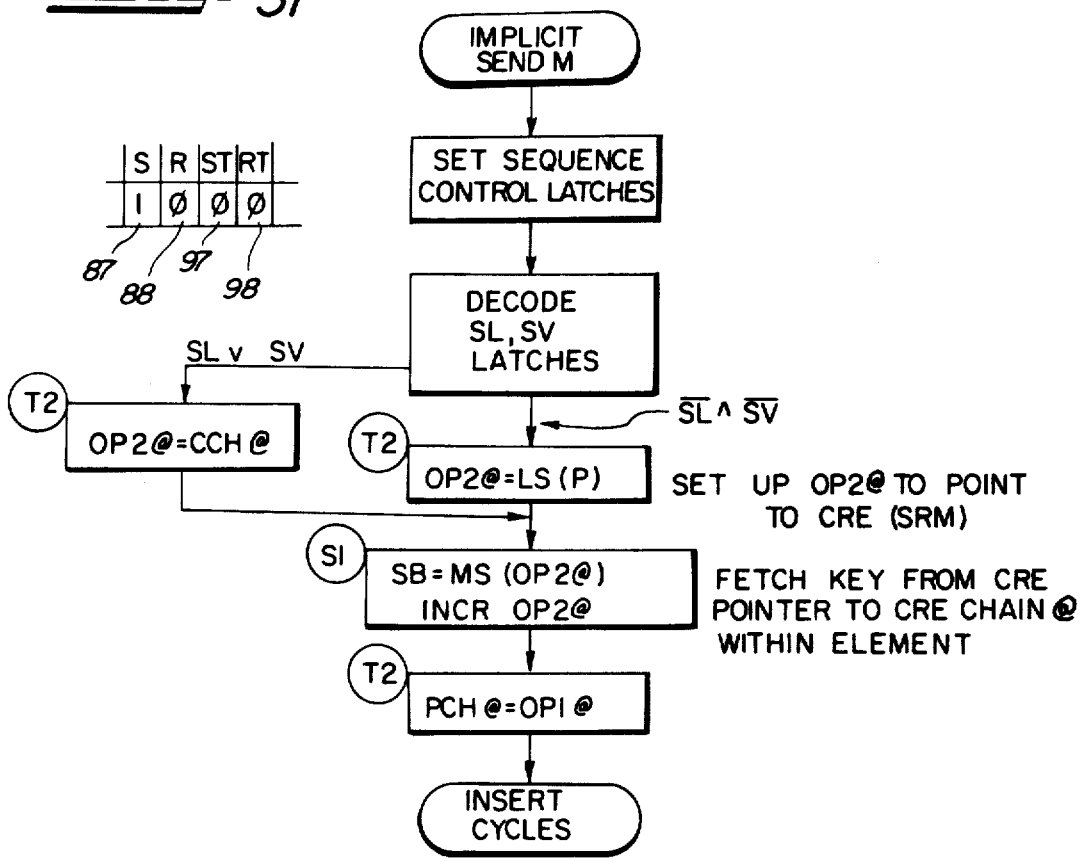

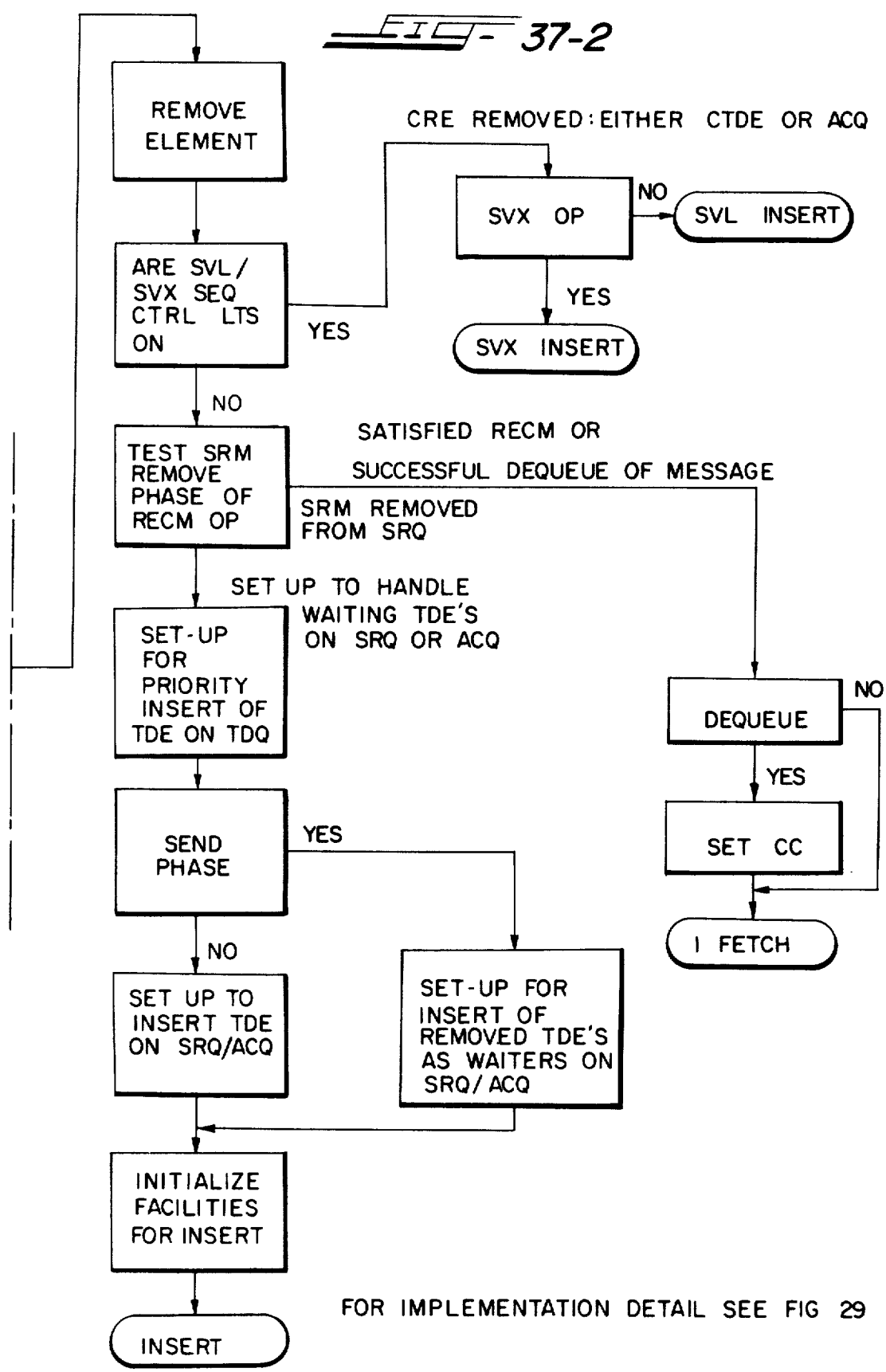

FOR IMPLEMENTATION DETAIL SEE FIG. 32

SYNCHRONOUS AND CONDITIONAL INTER-PROGRAM CONTROL APPARATUS FOR A COMPUTER SYSTEM

DESCRIPTION

1. Technical Field

This invention relates to a task handling apparatus in a computer system and more particularly to an apparatus for synchronous and conditional control of programs within one or more tasks.

The invention finds particular utility in stored program computer systems configured to operate interactively with terminal operators and in stored program computer systems having need to execute a large number of jobs operating in a batch mode such as in a large multi-programming environment.

2. Background Art

All computer systems require the ability to pass the control of the central processor from one program to another in a synchronous fashion. This ability permits one or more programs to which processor control is passed to execute functions commonly required in many programming operations.

In order to pass control of the processor from one program to another in a synchronous fashion, the computer system must have the ability to perform a number of functions relative to program identification, processor control routing, passage of input parameters from one program to another, restoration of processor control to the program which was interrupted, etc. Further, to assure that the transfer of processor control occurs in a synchronous fashion, it is advantageous to provide both a means for identifying the program to which control is to be transferred (hereinafter referred to as the "invoked" program) and a means to support return of the processor from the invoked program to the program which initiated the transfer control sequence (hereinafter referred to as the "invoking" program).

Transfer of processor control from the invoking to the invoked program requires a means to route such control and a means for passing certain parameters of the invoking program to the invoked program. The passage of such parameters further requires a means specifically adapted for the storage of address locations of the invoking program in order to support return of the processor thereto at the completion of the invoked program. Once the invoked program has been identified, it is also necessary to load the processor with certain parameters associated with the invoked program and to calculate effective addresses for the invoked program operands. Both of these operations may be provided by one or more hardware implemented status saving mechanisms.

In certain situations, however, it may be advantageous to bypass the invoked program and return processor control to the invoking program without execution of the invoked program. Accordingly, apparatus is provided to render the synchronous transfer of processor control conditional on the happening of certain predictable events.

Lastly, after execution of the invoked program, return of processor control to the invoking program should occur in a manner such that the execution of the invoking program commences at the next sequential instruction of the invoking program occurring after the suspension.

In prior art computer systems, the above functions and features were performed in part by hardware and in part by software instructions included in the invoking and invoked programs and in intermediate supervisory programs. For example, the IBM S/370 computer system permits identification of the invoked program and storage of certain parameters of the invoking program via certain express software instructions, such as, for example, the supervisor call (SVC) instruction. However, that computer system does not provide, through hardware apparatus, the set of above-described functions required to pass processor control from one program to another in a single non-interrupted machine operation. In particular, the prior art IBM S/370 computer system requires additional software program support to perform these functions, as well as additional hardware apparatus to mask certain external interruptions, such as, for example, I/O completion, timer expiration, and machine checks, among others, that may occur while the invoked program is executing.

In the present invention, an apparatus for synchronous and conditional control of programs within one or more tasks is provided entirely in hardware, with a common mechanism being used for the central processor unit ("CPU") and the input/output tasks. By this arrangement, synchronous and conditional processor transfers are obtainable with a lower performance CPU, and program implementation in modular form is allowed. Additionally, the present invention permits common subroutine collection and thereby reduces the size, complexity, and cost of high level programming functions.

DESCRIPTION OF THE INVENTION

The present invention relates to a task handling apparatus in a computer system and more particularly to an apparatus for synchronous and conditional control of programs within one or more tasks. During execution of a set of sequential instructions or programs, it may be desirable to temporarily suspend execution of the instructions in order to perform one or ore operations on the data field of the then-executing (i.e., the "invoking") program. In such a situation, it is necessary to transfer processor control from the invoking program to one or more other instruction sets or programs, which other sets or programs are hereinafter referred to as the "invoked program." Since this suspension is, by design, temporary in nature, it is advisable to provide a means for readily locating the point at which the invoking program was suspended, so that that point can be located when processor control is transferred back to the invoking program. The invention disclosed herein provides a means for accomplishing this result through synchronous and conditional inter-program linkage. In order to accomplish this result, the invoking program is provided with an instruction which implements one or more hardware-related operations. The implemented operations sequentially store the location of the invoking program instruction, locate the invoked program, transfer processor control from the invoking program to the invoked program, and return processor control to the invoking program at the completion of the invoked program.

Importantly, the present invention permits the control transfer from the invoking program to occur in a synchronous and conditional manner; i.e., the transfer occurs as a result of the execution of a specific instruction and the operation which results from the transfer is predictable. However, in some instances although a control transfer is predictable, and predicted, it may be advantageous to bypass the transfer. In order to accomplish this bypass, the transfer is conditional on the happening of one or more events, of either synchronous or asynchronous nature.

Thus, it is a principal object of the present invention to provide an apparatus for synchronous and conditional control of programs within one or more tasks in hardware, with a common mechanism being used for the CPU and the input/output tasks. By this arrangement, synchronous and conditional processor transfers are obtainable with a lower performance central processing unit and program implementation in modular form is allowed. Additionally, the present invention permits common subroutine collection and thereby reduces the size, complexity, and cost of high level programming functions.

It is a further object of the present invention to provide implicit support for the signaling of exceptions by hardware components and to provide implicit support for machine instructions not implemented in hardware.

It is yet a further object of the present invention to provide multiple levels of hardware implemented status saving functions which permit the computer system to allocate and de-allocate status save elements on an as-needed basis.

It is another object of the present invention to provide a means for the symbolic identification of the invoked program; i.e., the invoking program does not explicitly define the address of the invoked program but accesses it indirectly through pre-defined hardware operations.

And yet another object of the invention is to increase the computer system efficiency by using the symbolic identification of the invoked program coupled with the as-needed allocation and/or de-allocation of the status save elements.

As a further object of the present invention, the control apparatus is provided with a status save means for storing the state of the invoking program during the execution of the invoked program thereby permitting the results of the invoked program to be loaded onto the invoking program at the completion of the invoked program.

It is still yet another object to provide a means to return processor control to the invoking program at the completion of the invoked program in a manner which permits the invoking program to recommence execution at its next sequential instruction.

The above and other objects are achieved by providing a synchronous and conditional inter-program control apparatus of a computer system which is structured to temporarily suspend exeuction of an executing, i.e., invoking, program and to transfer processor control to a second, i.e., invoked program. Such transfer is initiated by a transfer initiation means which interacts with a function control means of a function control array to provide symbolic identification of an entry point in the invoked program. The function control means addresses call return elements (CRE's) when it is in an execute mode but transfers processor control back to the invoking program when it is in a by-pass mode. CRE's that are in an active, data-receivable state are chained on an available call return queue (ACQ) and may be removed therefrom on an as-needed basis through a receive message mechanism. Active CRE's contain a status save means for storing the state of the invoking program during execution of the invoked program. In the event there are no active CRE's available for such storage, a task switch occurs and the address of the invoking program is inserted on a wait list of the ACQ where it remains until a CRE becomes available. At that time the invoking program is enqueued in priority sequence as a task dispatching element (TDE) on a task dispatching queue (TDQ). Once an active CRE is available, the state of the invoked program is initialized to the state of the invoking program and the invoked program executes. At the termination of the execution of the invoked program, a transfer return means transfers processor control back to the invoking program and inserts the CRE onto the ACQ through a send message mechanism. The invoking program then commences execution at the next sequential instruction.

These and other objects, advantages, and features will hereinafter appear, and, for purposes of illustration, but not for limitation, exemplary embodiments of the present invention are illustrated in the accompanying drawings.

BRIEF DESCRIPTION OF THE DRAWINGS

FIG. 2A is a diagram showing the transfer control means of FIG. 1 and its relation to the function control array of the present invention.

FIG. 2B is a diagram illustrating the format of representative SVL instructions.

FIG. 5-1 and FIG. 5-2, with FIG. 5-1 disposed above FIG. 5-2, taken together are a block diagram of a representative computer system embodying the invention.

FIG. 6 a format of a TDE.

FIG. 7-1 and FIG. 7-2, with FIG. 7-1 disposed above FIG. 7-2, taken together are a block diagram similar to FIGS. 5-1 and 5-2, but illustrating the signal paths for a T1 CPU cycle.

FIG. 8-1 and FIG. 8-2, with FIG. 8-1 disposed above FIG. 8-2, taken together are a block diagram similar to FIGS. 7-1 and 7-2, but illustrating the signal paths for a T2 CPU cycle.

FIG. 9-1 and FIG. 9-2, with FIG. 9-1 disposed above FIG. 9-2, taken together are a block diagram similar to FIGS. 7-1 and 7-2, but illustrating the signal paths for a T3 CPU cycle.

FIG. 10-1 and FIG. 10-2, with FIG. 10-1 disposed above FIG. 10-2, taken together are a block diagram similar to FIGS. 7-1 and 7-2, but illustrating the signal paths for an A1 CPU cycle.

FIG. 11-1 and FIG. 11-2, with FIG. 11-1 disposed above FIG. 11-2, taken together are a block diagram similar to FIGS. 7-1 and 7-2, but illustrating the signal paths for an A2 CPU cycle.

FIG. 12-1 and FIG. 12-2, with FIG. 12-1 disposed above FIG. 12-2, taken together are a block diagram similar to FIGS. 7-1 and 7-2, but illustrating the signal paths for an S1 CPU cycle.

FIG. 13-1 and FIG. 13-2, with FIG. 13-1 disposed above FIG. 13-2, taken together are a block diagram similar to FIGS. 7-1 and 7-2, but illustrating the signal paths for an S2 CPU cycle.

FIG. 14 is a series of decode tables showing the various SVL, SVX Sequence Control Latches settings, the Instruction Length Control Latches and a final table showing Parameters Passed to Invoking Program. FIG. 14A is the SL/SV sequence control latch settings table; FIG. 14B is the instruction length sequence control latch settings table; FIG. 14C shows the parameters passed to invoked program BPR registers as a function of SVL type.

FIG. 20 is a diagram illustrating an SVX-IMPLICIT RECM cycle in which the CRE is removed from the current TDE.

FIG. 21 is a diagram illustrating an SVX-IMPLICIT SENDM cycle with no TDE's on the ACQ WAIT LIST resulting in the insertion of the CRE on the ACQ.

FIG. 22 is a diagram illustrating the initial state of an SVX cycle which occurs when the ACQ contains no available CRE's with a task suspended on the ACQ WAIT LIST.

FIG. 23 is a diagram illustrating an SVX-IMPLICIT RECM cycle in which a CRE is removed from the current TDE.

FIG. 24 is a diagram illustrating an IMPLICIT SENDM cycle in which a CRE is inserted on the ACQ and a TDE is inserted on the TDQ.

FIG. 25-1 and FIG. 25-2, with FIG. 25-1 disposed above FIG. 25-2, taken together are a block diagram providing an overview of SVL cycles.

FIG. 26-1 and FIG. 26-2, with FIG. 26-1 disposed above FIG. 26-2, taken together are flow diagram representing the I-fetch cycle.

FIG. 27-1 and FIG. 27-2, with FIG. 27-1 disposed above FIG. 27-2, taken together are a flow diagram representing SVL cycles.

FIG. 28 is a flow diagram illustrating IMPLICIT RECM cycles and summarizing the settings of certain latches.

FIG. 29-1 and FIG. 29-2, with FIG. 29-1 disposed to the left of FIG. 29-2, taken together are a flow diagram representing REMOVE cycles of the present invention.

FIG. 30 is a flow diagram representing SVL INSERT cycles.

FIG. 31 is a flow diagram representing IMPLICIT SENDM cycles and including a summary of the setting of certain latches.

FIG. 32-1 and FIG. 32-2, with FIG. 32-1 disposed to the left of FIG. 32-2, taken together are a flow diagram representing INSERT cycles of the present invention.

FIG. 33-1 and FIG. 33-2, with FIG. 33-1 disposed above FIG. 33-2, taken together are a flow diagram illustrating SVL save cycles.

FIG. 35-1 and FIG. 35-2, with FIG. 35-1 disposed above FIG. 35-2, illustrates SVX cycles to restore invoking program parameters and set up the parameters to remove CRE's.

FIG. 37-1 and FIG. 37-2, with FIG. 37-1 disposed to the left of FIG. 37-2, are overview flow diagrams illustrating the general function of REMOVE and can be used to facilitate understanding FIGS. 29-1 and 29-2.

DETAILED DESCRIPTION

This invention relates to a task handling apparatus in a computer system and more particularly to an apparatus for synchronous and conditional control of programs within one or more tasks. As one skilled in the art will appreciate, a task may be considered as a unit of executable work which may comprise a set of sequential instructions grouped together as a program and may also comprise a set of programs grouped together for synchronous execution. As often is the case during execution of a set of sequential instructions or programs within a given task, it may be desirable to temporarily suspend execution of the instructions or programs in order to perform one or more operations on the data field of the then-executing instruction set or program. In such a situation, it is necessary to transfer processor control from the executing instruction set or program, the "invoking program," to one or more other instruction sets or programs, the "invoked program." Since this suspension is, by design, temporary in nature, it is advisable to provide a means for readily locating the point at which the then-executing program was suspended so that such point can be located once processor control is transferred back to this program. The invention disclosed herein provides a means for accomplishing this result through synchronous and conditional inter-program linkage. In order to further accomplish this result, the invoking program is provided with an instruction which implements one or more hardware-related operations. The implemented operations sequentially store the location of the invoking program instruction, locate the invoked program, transfer processor control from the invoking program to the invoked program, and return processor control to the invoking program at the completion of the invoked program.

The present invention permits the control transfer from the invoking program to occur in a synchronous and conditional manner. In this regard, and as used herein, the term "synchronous" includes any predictable event that occurs with respect to a specific instruction and further includes program exceptions. As also used herein, the term "asynchronous" refers to those events which occur at unpredictable points within the current operation of the computer system; such events being unpredictable with respect to time, location, or both. Thus, the phrase "synchronous program control" means the ability to transfer control from the invoking program to an invoked program in a predictable manner; i.e., the transfer occurs as a result of the execution of a specific instruction, and the operation which results from the transfer is predictable. However, in some instances, although a control transfer is predictable, and predicted, it may be advantageous to bypass the transfer. In order to accomplish this bypass, the present invention provides that the transfer is conditional on the happening of one or more events, of either synchronous or asynchronous nature.

Figure 1:
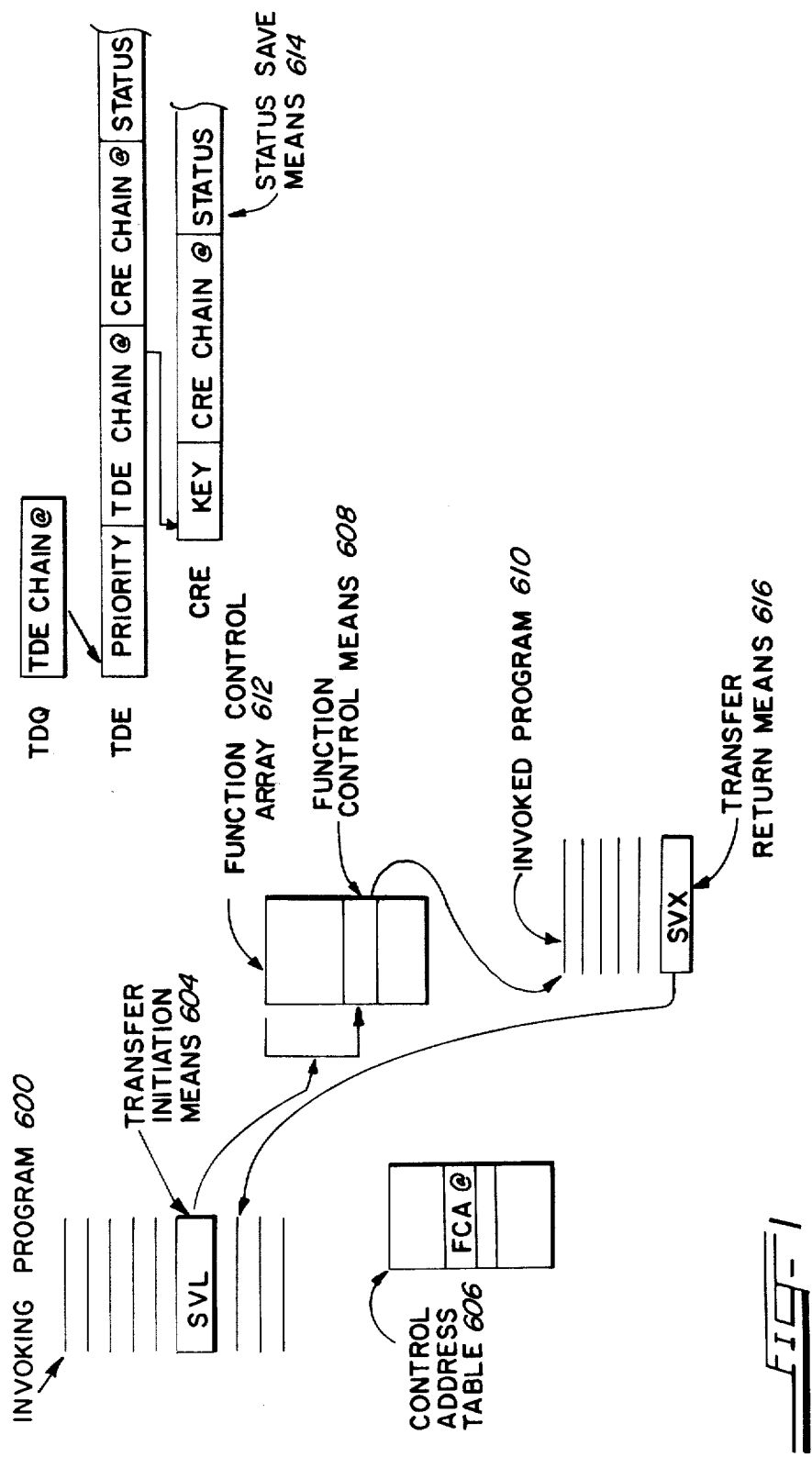
FIG. 1 is a block diagram of the invention showing the relationship of the various elements thereof.

Referring now to FIG. 1, a block diagram is presented which depicts the synchronous and conditional control transfer function of the present invention. An invoking program 600 has associated therewith a transfer initiation means 604. The transfer initiation means 604 may be software or hardware related. For example, the transfer initiation means 604 may be of an instruction-type that is provided within the program 600 and may also be of a hard-wire type. The transfer initiation means 604 may also include certain hereinafter enumerated features such as, for example, a control address table 606 which is addressable at a fixed location in the memory storage of the computer system. In any event, when the invoking program 600 encounters the transfer initiation means 604, a transfer of processor control is initiated. It should be remembered that this control transfer is synchronous; i.e., predictable, and, accordingly, associated with the transfer initiation means 604 is a function control means 608, which identifies an invoked program 610 which is to be executed. It should be understood that such identification is symbolic in nature; i.e. the invoking program does not directly define the invoked program but instead identifies a means (the function control means 608, discussed hereinafter) which locates the invoked program 610. The function control means 608, which is associated with a function control array 612, also stores on a status save means 614, described hereinafter, the state of the invoking program 600 for future use. The status save means 614 may be, for example, an addressable fixed location in the memory storage of the computer system. With the invoked program 610 located, the processor completes the transfer by executing the invoked program based on its initial status, e.g., instruction address, base register addresses, instruction length, condition code, and the information stored in the status save means. Upon completion of the invoked program 610, a transfer return means 616 is activated which transfers control from the invoked program 610 back to the invoking program 600 and releases the status save means 614 for use in another transfer operation. With processor control again in the invoking program 600, this program resumes at the next sequential instruction in the invoking program instruction set.

The transfer initiation means 604 is more specifically described by reference to FIG. 2A in which the transfer initiation means 604 includes an instruction contained within the instruction set of the currently-executing, i.e., the invoking, program. This instruction, hereinafter referred to as the "supervisor link" (SVL), addresses via a storage address register array containing a CAT@ SAR 58A (see FIG. 5-1 and FIG. 5-2) a control address table (CAT) 606. The CAT 606 includes the location addresses of numerous operational functions within the computer system. One such function, or entry level, is the address of the location of the function control array (FCA) 612.

As will be appreciated by one skilled in the art, whenever an SVL is encountered in an instruction sequence, the CAT 606 is queried by the processor to determine the location of the FCA 612. In order to accomplish this result, one level of the CAT 606 includes an address location of the FCA 612. For example, in FIG. 2A, the information contained within one level of the CAT 606 includes the address location of the FCA 612. Accordingly, whenever an SVL is encountered, access is gained to the FCA.

As previously mentioned, the FCA 612 comprises one or more function control means (FCM), one of which is illustrated in FIG. 2A as FCM 608. The purpose of each FCM is to locate the invoked program and to provide to that program access to the status of the invoking program and parameters relative to the function to be executed by the invoked program.

Figure 3:
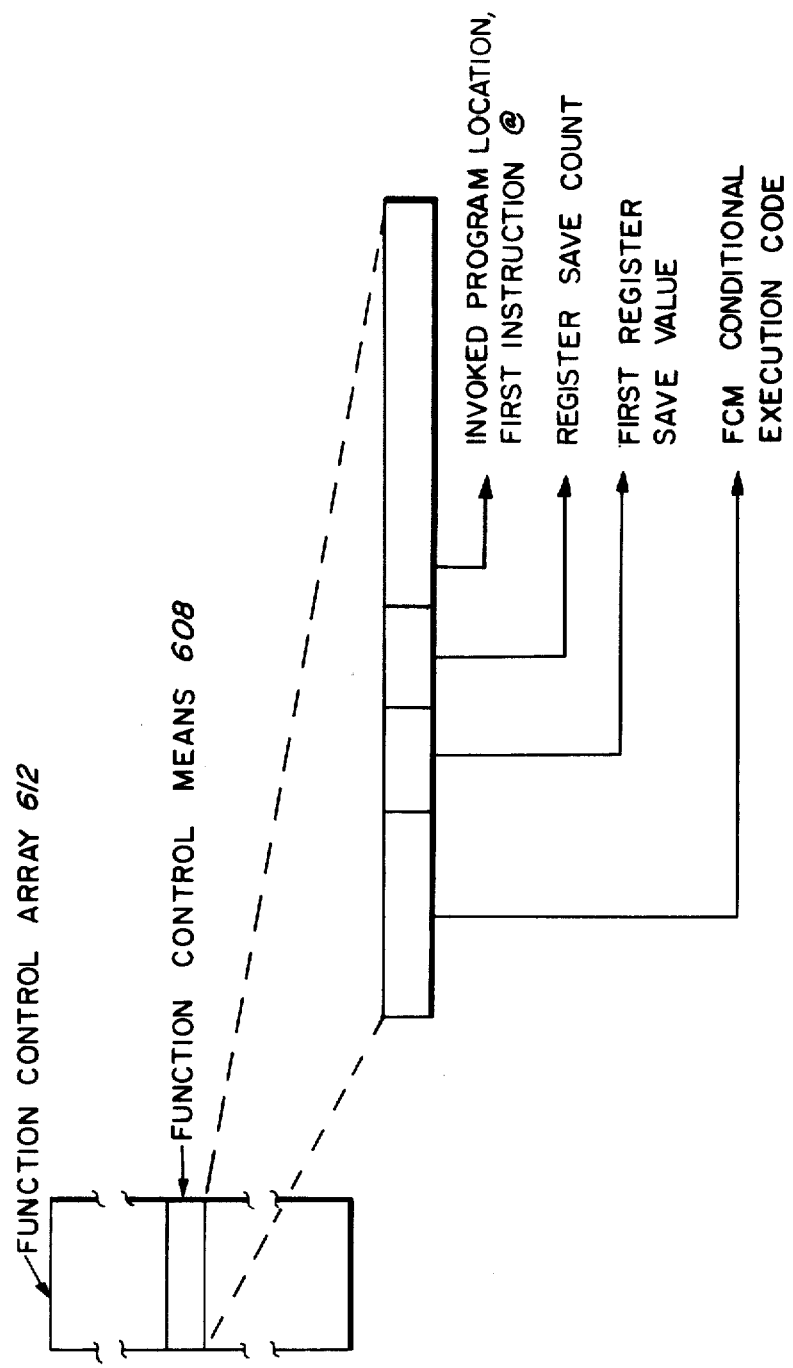
FIG. 3 is a diagram illustrating the function control means (FCM) of the function control array (FCA) and showing the format of an FCM.

The format of the FCM 608 is important to the present invention since the format data field includes information directly relating to the SVL encountered during execution of the invoking program 600. Referring now to FIG. 3, a representative format of an FCM 608 is shown. In viewing the figure, it should be understood that the FCA may be considered as a table and the FCM as levels within that table. Each FCM format includes a conditional execution code, a first register save value, a register save count, and an invoked program location address, which is the instruction address for the first instruction to be executed in the invoked program.

More particularly, the conditional execution code is used to either execute or bypass the invoked program and provides the conditional implementation of the present invention. That is, if the FCM conditional code is in the bypass mode, transfer of the processor control to the invoked program is bypassed and the execution of the invoking program continues at the next sequential instruction after the SVL. If the FCM conditional code is in the execute mode, the invoked program is executed.

The first register save value indicates the first register of the invoking program and the register save count indicates how many of the invoking program registers should be saved. For purposes of example only, if the state vector of the invoking program, at the time the SVL is encountered, is contained in 16 registers and the invoked program is to operate on five of these registers, the first register save value may be register 7, which means that data contained in registers 7 through 11 (i.e., a total of five registers) will be presented to the invoked program.

The FCM also includes information relative to the location of the invoked program. The "invoked program location" field directs the CPU to the invoked program, such as to memory storage or control storage and also locates the first instruction to be implemented in the invoked program. For example, the invoked program may include numerous operational functions, only a sequential number of which are to be executed. The FCM instruction address of the invoked program location causes the non-desired functions to be bypassed without destroying the sequential integrity of the invoked program.

In order to more fully understand the interrelation between the SVL, the FCA 612, and the FCM 608, FIG. 2B presents a representative format of an SVL instruction. As depicted, an SVL instruction may be 2-bytes, 4-bytes, or 6-bytes in length although it should be appreciated that the length of any particular SVL instruction is not critical to the operation of the present invention. Accordingly, the byte lengths of the representative SVL instructions shown in FIG. 2B are non-limiting in nature.

As noted in FIG. 2B, each SVL instruction contains an operation code, or "op code", generally located in the first byte thereof and additionally includes a I-field for purposes fully described hereafter. The SVL may also include one or more operand address specifications, such as one operand of a 4-byte SVL or two operands of a 6-byte SVL. These operands provide methods for specifying effective addresses for the operation to be executed by the invoked program.

As previously mentioned, the location of the FCM within the FCA 612 is a function of the data field contained within the SVL instruction. In this regard, the present invention provides three different sets, or types, of SVL instructions; i.e., an EXCEPTION SVL, an EXPLICIT SVL, and an IMPLICIT SVL. The difference between these types of SVL instructions is important to the present invention since the method of locating a particular FCM 608 within the FCA 612 depends upon the type of SVL instruction encountered during the execution of the instruction set.

The EXCEPTION SVL, as used in the present invention, includes those program exceptions typically generated as a result of the execution of instructions such as, for example, an address translation exception (page fault), an address exception (alignment fault or non-implemented address), zero divide exception, significance exception, and the like. It should be appreciated that an EXCEPTION SVL, of whatever type, is not a specific instruction presented within the invoking program but is an SVL that is generated by executing the instructions of the invoking program. As such, an EXCEPTION SVL is a synchronous event, i.e., predictable. In order to deal with such events, the FCA 612 is provided with specific FCM's 608 which implement pre-determined operational functions. The FCM's 608 associated with EXCEPTION SVL's are assigned specific locations within the FCA 612. Thus, whenever an EXCEPTION SVL is encountered, processor control is directed to the appropriate FCM 608 via adding INDEX 605, FIG. 2B, to FCA@ 612 which results in transfer to an invoked program associated with the encountered EXCEPTION SVL.

A second type of SVL which may be encountered is an EXPLICIT SVL which is defined by the manner in which it is located within the FCA 612. Further, there may be one or more types of EXPLICIT SVL's depending upon the information contained within the format data field of the EXPLICIT SVL. The format of three representative EXPLICIT SVL's is presented in FIG. 2B. As there noted, a 2-byte EXPLICIT SVL (which is hereinafter referenced as "SVL-0") contains an op code and an I-field. A 4-byte SVL ("SVL-1") contains an op code, an I-field and one operand. A 6-byte SVL ("SVL-2") contains an op code, an I-field, and two operands.

Whenever an EXPLICIT SVL is encountered, the INDEX 605 of that SVL is utilized to locate the FCM 608 within the FCA 612; that is, an EXPLICIT SVL has associated therewith a pre-assigned FCM 608. As will be appreciated, the EXPLICIT SVL I FIELD essentially determines which, if any, invoked program will be utilized in implementing the processor control transfer.

The third type of SVL included within the present invention is an IMPLICIT SVL, of which there may be one or more types. The format of IMPLICIT SVL's is identical to that shown for EXPLICIT SVL's in FIG. 2B, except that the I-field either contains no information or contains values which do not relate to specific FCM's in the FCA. Thus, whenever it is desired to enter the FCA via an IMPLICIT SVL, the op code of the IMPLICIT SVL is utilized to INDEX 605 and thus locate the appropriate FCM 608. For example, assuming that there are 256 FCM's within the FCA, and that they are arranged sequentially from "FCM-0" through "FCM-255", it is possible to locate any particular FCM, e.g., "FCM-167", by coding the op code field of an IMPLICIT SVL with 167 and thus forming the address of FCM-167 by adding the INDEX value '167' to the FCA @. The use of the op code for IMPLICIT SVL's is in contradistinction to the use of the I-field of the EXPLICIT SVL, where the op code is effectively ignored in locating the appropriate FCM.

In order to recognize an EXPLICIT SVL when one is encountered, the op code field of the EXPLICIT SVL is assigned a selected value, with the assigned value further identifying the specific EXPLICIT SVL encountered. For example, the op code of EXPLICIT SVL-0 may arbitrarily be assigned a value of zero such that, whenever an EXPLICIT SVL-0 is encountered, the processor recognizes that this SVL has an associated I FIELD but no operands, such as shown in the 2-byte SVL of FIG. 2B. Similarly, the op code of an EXPLICIT SVL-1 may be assigned a value of one thereby recognizing the one operand associated with the SVL-1, etc.

Implicit within the foregoing discussion is the fact that the values of the IMPLICIT SVL op codes are different from those values assigned to EXPLICIT SVL's. However, it should be realized that an IMPLICIT SVL and an EXPLICIT SVL may address the same FCM. This may be understood by recalling that, in the EXPLICIT I FIELD case, the SVL is used as the appropriate index value to address the appropirate FCM, whereas, in the IMPLICIT SVL case, the OP CODE is used as the appropriate index value to address the appropriate FCM. Thus, it is possible that, in a given situation, an EXPLICIT SVL (via its I FIELD) will address a specific FCM and in another given situation an IMPLICIT SVL (via its OP CODE) will address the same FCM. This coincidence is not unusual and further provides additional freedom to access the FCM's through either EXPLICIT or IMPLICIT SVL's. Also, the exception SVL value that is preassigned can equal either the explicit SVL I-FILED or the implicit SVL OP CODE giving even further freedom to access the FCM's.

As mentioned, the FCM cooperates with a status save means to store the state vector of the invoking program. As used herein, the phrase "state vector", which is hereafter referred to as the STATE, means the instruction address, condition code, instruction length, address registers, and operand registers of the invoking or invoked program.

Figure 4:
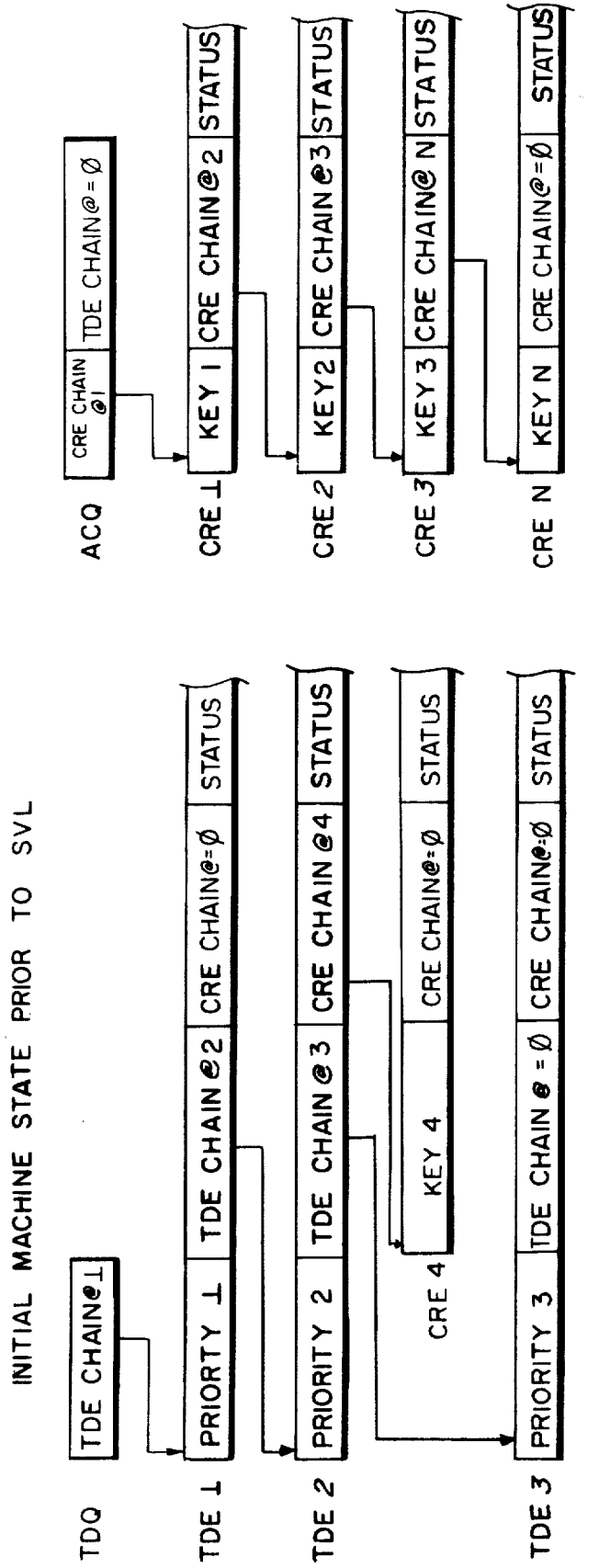
FIG. 4 is a diagram illustrating interrelationships between the TDQ, TDE's, ACQ, ACQ WAIT LIST, and CRE's.

The status save means is depicted in FIG. 4 and comprises an available call-return element queue (ACQ) and one or more call-return elements (CRE's). Both the ACQ and the CRE's may be registers included within the computer system and may also be fixed location storage elements within the memory storage of the computer system. The CRE's are chained to the ACQ such that the computing system may allocate and deallocate CRE's on an as-needed basis via access to the ACQ. Also associated with the ACQ is an ACQ WAIT LIST, which will be more fully described hereinafter. The ACQ may be viewed as a control element which makes a CRE available to the invoking program. Thus, when a CRE is available, the STATE of the invoking program, including that information contained in the FCM, is stored on the CRE. The CRE loaded with such information is hereinafter referred to as an "active CRE". It will be remembered that the FCM format field includes the first register save value and register save count. Accordingly, the active CRE contains the address and contents of the registers of the invoking program and thus provides a means of modifying the STATE of the invoking program during execution of the invoked program; i.e., the data contained in the registers which were saved during the SVL in an appropriate CRE may be operated on by the invoked program, and the results of that operation then presented to the invoking program, via reloading the invoking program parameters from the CRE's, at the termination of the invoked program. The sequence of events that take place to dequeue a CRE from the ACQ and enqueue the CRE on the current TDE are depicted in FIG. 5, which represents the initial state of the machine just prior to the SVL, in FIG. 15 which shows the CRE 1 dequeued from the ACQ, and in FIG. 16 which shows CRE 1 enqueued to TDE 1, which is the active TDE.

After completion of the invoked program, it is necessary to transfer processor control from the invoked program back to the invoking program. Such transfer is accomplished by a transfer return means. The transfer return means (TRM) 616 is initiated by a supervisor link exit (SVX) instruction contained in the instruction stream of the invoked program 610, see FIG. 1. Whenever an SVX is encountered, the STATE of the invoking program is loaded into processor status registers, and the active CRE is removed from the invoking program task and inserted as an available CRE on the ACQ. With the loading of the processor status registers, the processor is set to execute the next sequential instruction of the invoking program after the SVL.

The foregoing overview of the present invention has assumed that a CRE is available on the ACQ chain for storage of the STATE of the invoking program. In the event, however, that a CRE is not available, the ACQ WAIT LIST is accessed and a task switch occurs. Implementation of such task switch is fully described in U.S. patent application, entitled "Task Handling Apparatus for a Computer System," Ser. No. 813,901, filed on July 8, 1977, which is assigned to the same assignee as the present invention and which is specifically incorporated by reference herein, for all purposes.

As noted in the above-referenced patent application, a task dispatching queue (TDQ) is provided which contains task dispatching elements (TDE's) arranged in priority sequence, see FIG. 4. In the event that a task switch is desired, the currently executing task which is contained on the active TDE of the TDQ is dequeued from the TDQ and put into an inactive waiting state by a receive message mechanism. A task switch occurs to the next highest priority task TDE, and this task is executed.

In the present invention, the invoking program is the currently executing task contained as the active TDE of the TDQ. In this regard, reference should be made to FIG. 4, herein, which depicts the current TDE (which is hereinafter referred to as either CTDE or TDE-1) as being the invoking program. Since it is advantageous not to suspend operation of the processor while awaiting for an available CRE, the present invention provides for the eventuality that no CRE's are available when the SVL is encountered. In this situation as is further depicted in FIG. 17, the current task, i.e., TDE-1, is removed from the TDQ, and the address of such TDE is inserted on the ACQ WAIT LIST as in FIG. 18. A task switch occurs to the next TDE on the TDQ, i.e. TDE 2 becomes the active task. Whenever a CRE becomes available on the ACQ, the addresses of all tasks on the ACQ WAIT LIST are dequeued therefrom and enqueued on the TDQ. The highest priority task then obtains the available CRE and the remaining tasks (TDE's) remain on the TDQ. Thus, the present invention provides for the continuous operation of the processor in intra-task situations.

Figures 2, 7:
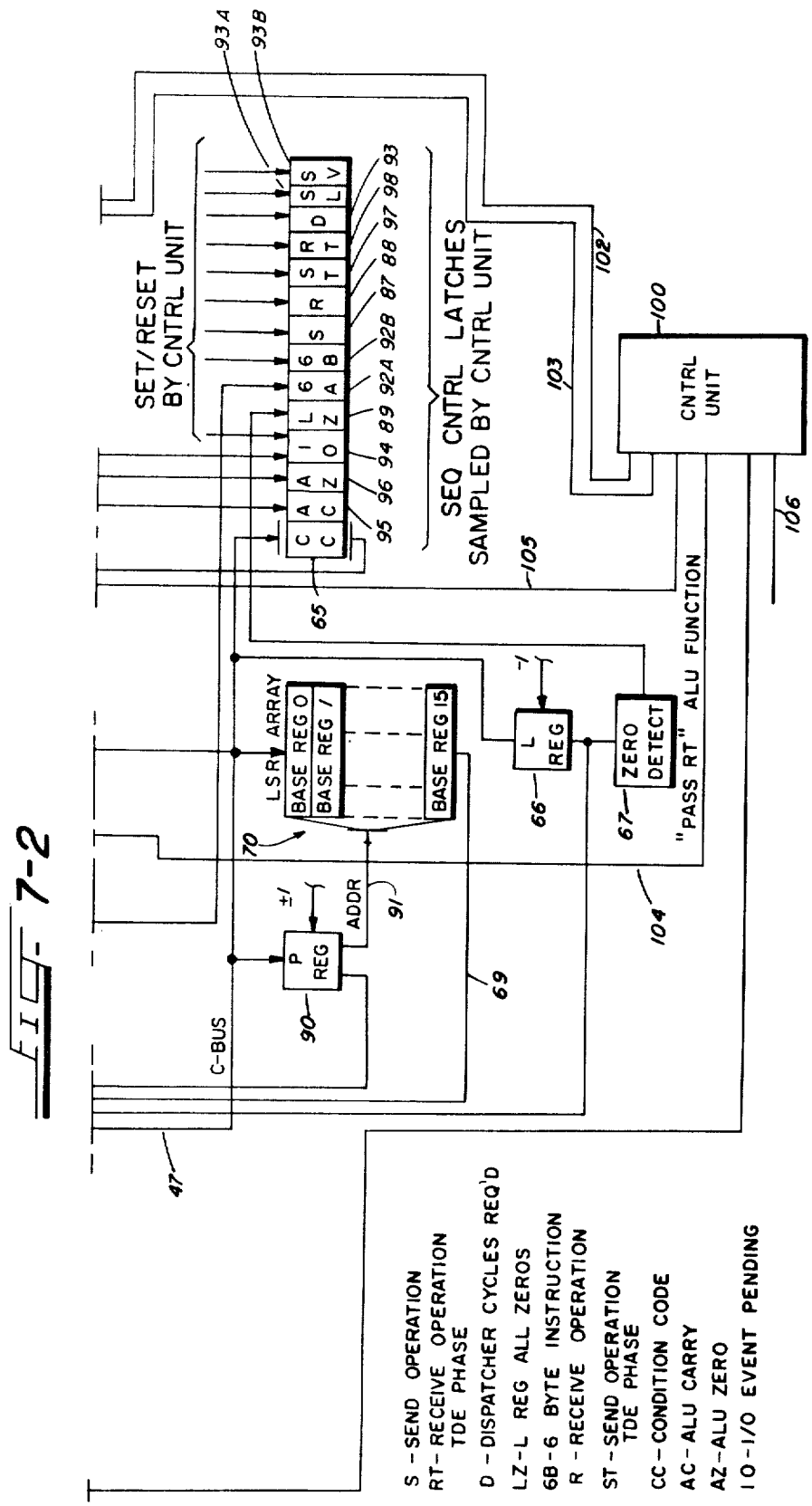

In order to more fully set forth the present invention and particularly the synchronous and conditional control of programs thereof, the invention, by way of example, is illustrated in FIG. 5-1 and FIG. 5-2 as being incorporated into a stored program computer system which includes main storage 10. Main storage 10 is conventional and is structured to be selectively addressable under control of storage control 15. Main storage 10 contains both instructions and data which are oriented on a byte basis. A byte consists of eight binary bits, excluding a parity bit. The data and address paths to and from storage are on a word basis, which in this example consists of four bytes. The organization of main storage 10 is not critical with respect to the present invention.

Main storage 10 is selectively addressable by storage control 15 which presents an address on bus 16. If a read operation is to take place, the data from the addressed location is available on bus 11 and entered into data register 17 of storage control 15. During a write operation, storage control 15 makes data available on bus 12, and this data is written into the addressed location in storage 10. The read and write operations are conventional.

Storage control 15 is connected to receive data and addresses from both central processing unit (CPU) 30 and I/O channel 500. CPU 30 provides data to register 17 on bus 31, and provides addresses to register 18 on bus 32. Register 17 is connected to provide data to CPU 30 via bus 19. I/O channel 500 provides data and addresses to registers 17 and 18 over buses 501 and 502, respectively. Data is provided to the channel from register 17 via bus 20. I/O channel 500 connects to I/O devices 510 and 511 via I/O adapter 505 and I/O controller 506, respecitvely. The number and type of I/O devices connected to the I/O channel and the manner of connection is not pertinent to the present invention. The I/O channel 500, however, must be able to communicate a need for I/O event cycles. Whenever I/O event cycles are required, channel 500 provides a signal on line 512, which is connected to set an I/O latch 94 in CPU 30.

The computer system incorporating the invention is initialized by loading main storage 10 with a task queque (TDQ), consisting of one or more task dispatching elements (TDE's). A full description of this loading operation is found in U.S. patent application entitled "Task Handling Apparatus For A Computer System,"

Ser. No. 813,901, filed on July 8, 1977, which is assigned to the same assignee as the present invention and which is incorporated herein by reference for all purposes. As noted in the above-referenced application, the TDQ is a system object which means that the TDQ is a unit of data having particular significance; i.e., control data. The TDQ is a chained list of objects containing CPU status information of executable tasks, where one task (in this example, the top task) is the active task, and all other tasks in the list are inactive dispatchable tasks. During the initial operation of the system, the TDQ object is located by transferring an address from TDQ SAR register 52 in SAR array registers 50 to address register 18. The TDQ SAR register 52 is selected by an address from control unit 100 on bus 101. The SAR array registers 50 include all the specific registers containing storage addresses necessary for pointing to objects and instructions involved in the present invention and specifically includes the address of the control address table register (CAT@ SAR) 58A, as well as the normal instruction address register (IAR) 51. IAR 51 contains the address of the next instruction to be feteched and executed at the time the current instruction of the invoking program is being executed; i.e., it is the program location counter. As will be seen later herein, each of the SAR array registers 50 can be incremented or decremented under control of control unit 100 without having the contents of the register pass through arithmetic and logic unit (ALU) 45. In this particular instance, all address increment/decrement operations; i.e., +1/−1, provide a 4-byte or one word increment/decrement.

The TDE address contained in the TDQ object is passed from storage 10 into the data register 17 during a read storage cycle, and from register 17 via bus 19 into SA register 36. SA register 36 is a main storage operand buffer. The contents of register 36 are passed to ALU 45 via A-bus assembler 39 and A-bus 40. ALU 45 receives a signal from control unit 100, which causes ALU 45 to pass the left side input into O register 46. ALU 45 is of the type well known in the art for performing two's complement binary add and subtract arithmetic operations and AND, OR and Exclusive OR (XOR) logical operations. Arithmetic and logical operations set AZ latch 96 if all bits of the result are zeroes. During an arithmetic add operation, the setting of the AC latch 95 indicates that there was a carry out of the high order bit position. On a subtract operation, the setting of AC latch 95 indicates that there was no borrow into the high order bit position. Pass left and pass right operations are used for register-to-register transfers, and occur without any setting of the ALU 45 condition latches AC 95 and AZ 96. The O REG 46 functions as the ALU 45 output register for latching the ALU result prior to gating the result to C bus 47. The output of O register 46 is connected by C-bus 47 to D-bus assembler 48. The D-bus assembler 48 feeds SAR array 50 via D-bus 49. In this instance, control unit 100 provides a signal to D-bus assembler 48 to cause it to select bus 47 as a source, and control unit 100 provides an address via bus 101 for addressing the current TDE address (CTDE@) SAR register 53, whereby the current TDE address is entered into CTDE@ SAR 53.

The operation just described is accomplished durig a T2 CPU cycle, which is described in the above-referenced U.S. patent application entitled "Task Handling Apparatus For A Computer System", Ser. No. 813,901, filed July 8, 1977 and incorporated herein by reference. The function of a T2 CPU cycle is to transfer the contents of any A-bus 40 source register to any C-bus 47 destination register.

The CTDE@ SAR 53, which contains the current TDE address, is used to hold this address during the entire duration of the associated task. Thus, it is necessary to also load a working register such as, for example, WR1@ SAR 58B, with the CTDE@, which can be incremented or decremented so as to load the CPU registers with address and status information of that TDE. It should be understood that when the current TDE address is transferred from CTDE@ SAR 53 into this work register (e.g. WR1@ SAR 58B), which will be described in detail below, the current TDE address also remains in CTDE@ SAR 53. It should also be understood that CTDE@ SAR 53 contains the address of the TDE that is active at the start of the current instruction; i.e., the invoking program. If dispatch latch (D latch) 93 is set during execution of the current instruction, then, at the start of the execution of the next instruction, the contents of register 53 are compared with the address of the top TDE on the TDQ to determine if a task switch is required. As will be seen later herein, a task switch may or may not occur, depending upon whether or not a CRE is available on the ACQ. Further, if the address of the current TDE does not compare with the address of the top TDE, a task switch is required. The top TDE on the TDQ is pointed to by the TDQ object, as previously mentioned. Therefore, another T2 CPU cycle will be taken to transfer the CTDE@ from register 53 into the OP1@ SAR 54. The TDE address in OP1@ SAR 54 is then incremented by three words, so as to point to the instruction address field (IA) contained in the current TDE.

The incrementing of the current TDE address by three words is accomplished by an A2 CPU cycle, which is described in the above-referenced U.S. patent application entitled "Task Handling Apparatus For A Computer System". It is sufficient to note at this time, that, during an A2 CPU cycle, the SAR array 50 is addressed via control unit 100 whereby the contents of OP1 SAR register 54 are placed on bus 32, which feeds address register 18, and A-bus assembler 39. Control unit 100 provides a selection signal to A-bus assembler 39 to cause the same to select bus 32 as the source. Thus, the current TDE address is presented to the left side of ALU 45 via A-bus 40. Control unit 100 also causes emit encoder 60 to present a value of two over bus 61 to B-bus assembler 62, whereby the value two is presented to the right side of ALU 45 via B-bus 63. ALU 45 then performs an add operation in response to a control signal from control unit 100, and the result is entered into O register 46. The address then passes from O register 46 via C-bus 47, D-bus assembler 48 and D-bus 49 into OP1@ SAR 54.

The incremented address now residing in OP1@ SAR 54 is then transferred into address register 18 as part of an S1 cycle, which is described in detail in the above-referenced U.S. patent application entitled "Task Handling Apparatus For A Computer System". The address in register 18 is passed by storage control 15 over bus 16 to main storage 10. The word appearing on bus 11, in response to the read operation of main storage 10, is entered into register 17 and placed on bus 19. The word on bus 19 is then entered into SA REG 36. During this S1 cycle, the address taken from OP1@ SAR 54 is also passed to incrementer 59, which increments the address by one and passes the address to D-bus assembler 48, whereby it is returned into OP1@ SAR 54 via the D-bus 49, so as to point to the next word of the current TDE, which, in this instance, contains the instruction length code (IL) field and the condition code (CC) field of the first instruction associated with the current task.

SA REG 36 contains the address of the first instruction associated with the task. This address is entered into instruction address register (IAR@) SAR 51 by means of a T2 CPU cycle. Before retrieving the first instruction associated with the task, it is necessary to fetch the remaining words of the TDE. Thus, the incremented address in OP1@ SAR 54 is entered into address register 18, and the next word of the TDE is read from main storage 10. The IL and CC contained in this next word are entered into IL REG 38 and CC REG 65, respectively. During this S1 CPU cycle, the address in OP1@ SAR 54 is again incremented by incrementer 59 and returned into OP1@ SAR 54. The address from OP1@ SAR 54 is then again transferred into address register 18, whereby storage 10 is again addressed and the word at the addressed location is transferred from storage over bus 11 into register 17. The contents of register 17 are then entered into SA REG 36. During this S1 cycle, the address in OP1@ SAR 54 is again incremented and returned into OP1@ SAR 54, as previously described. The contents of the SA REG 36 will be transferred into a work register in the LSR array of registers 70. The work register selected depends upon an address provided by P REG 90. P REG 90 is a counting register used for indirect addressing of LSR array 70, and can be incremented or decremented by one without the contents thereof passing through ALU 45. In this instance, P REG 90 is loaded with an address by means of a T1 CPU cycle, which will be described in greater detail later herein. During a T1 CPU cycle, control unit 100 provides a signal to emit encoder 60, which emits a value to B-bus assembler 62. This value will be zero, so as to address base register 0 of LSR array 70. Hence, the value of zero passed to B-bus assembler 62 passes via B-bus 63 into ALU 45 and then into O REG 46. The value zero then leaves O REG 46 via bus 47 into P REG 90, where it is available to address LSR array 70 via bus 91. With the address in P REG 90, a T2 CPU cycle is taken and executed to transfer the contents of SA REG 36 into the addressed base register 0 of LSR array 70. The operation just described repeats until all fields of the current TDE have been retrieved from main storage 10. The remaining fields in the TDE are fields which are loaded into base registers 1 through 15, inclusive, of LSR array 70.

The next operation is to fetch the first instruction of the active task, now that all the fields of the TDE have been fetched and loaded into the appropriate registers. Althrough the invention does not require it, in this particular example, an instruction is pre-fetched into instruction register 35, and then an instruction fetch cycle follows. The present invention is not dependent upon having instructions pre-fetched. Pre-fetching of instructions is well known in the art, and is used to enhance performance of the computer system. The pre-fetch operation involves two S1 cycles whereby a first S1 cycle is taken and executed to load the high half of the IS register 35 via S0 bus 19. The second S1 cycle loads the low half of IS register 35 via bus 19. Instruction register 35 is two words wide and buffers the next instruction of the instruction stream being executed. It should be noted at this time that instructions have different lengths. The computer system of FIG. 1 and FIG. 5 can process instructions having a length of one-half words, a full word or a word-and-one-half; i.e., instructions having a length of two bytes, four bytes or six bytes.

The I-fetch cycle for these instructions is shown in FIG. 26-1 and FIG. 26-2. Each instruction, of course, has an op code and, in this instance, the op code also includes bits indicating the length of the instruction. During the I-fetch operation, control unit 100 first samples the status of a dispatch cycle latch 93 and an IO latch 94. At the start of the initial task, both of these latches will be in the reset state. The op code is decoded by decoder 41, and the instruction length is decoded by decoder 42. The signals resulting from decoding the op code are passed to control unit 100, and the signal indicating the instruction length is passed from instruction length decoder 42 to set a 6A latch 92A and 6B latch 92B if the instruction is six bytes, to set 6A latch 92A and reset 6B latch 92B if the instruction is four bytes, and to reset 6A latch 92A and reset 6B latch 92B if the instruction is two bytes, see FIG. 14B. The control unit 100 samples the latches 92A and 92B and a T1 cycle is taken and executed, whereby control unit 100 provides a signal to emit encoder 60, which then emits a value indicating the instruction length. This emitted value will then be entered into IL register 38 during the T1 cycle.

The I-fetch cycle continues where the contents of IL REG 38 are added to the current contents of IAR@ SAR 51 by means of an A1 CPU cycle, and the result is returned to IAR@ SAR 51. It should be noted that a byte add operation is performed, and the sum entered into IAR@ SAR 51. Thus, by adding an IL register value of two, four or six to the contents of IAR@ SAR 51, the storage word address is increased by one half word one word or one-and-one-half words, respectively. This provides the IAR@ SAR 51 with an address to point to the next instruction of the task. The IL REG 38 holds the length of the instruction that is currently being executed. The length is held as an unsigned binary number. A T2 CPU cycle is taken where the instruction I-field is put into P REG 90 for later use. This is followed by another T2 CPU cycle, where the instruction OP 1 field is placed into the OP1@ SAR 54. Then, an S1 cycle is taken and executed for reading data from main storage 10 and transferring it onto bus 19 and from there into SA register 36, whereby the first operand of the instruction is fetched. Latch 92 is then tested, and, if the instruction is a six-byte instruction, a T2 cycle is taken for loading OP2@ SAR 55 with the contents of the OP 2 field in the instruction. This T2 cycle is then followed by an S1 cycle, where data is read from main storage 10 and transferred onto bus 19 to be loaded into SB register 37. SB register 37, like SA register 36, is a main storage 10 operand buffer. Operands 1 and 2 have now been fetched from main storage 10 and placed into registers 36 and 37, respectively. If the instruction had been a four-byte instruction, there would have been no operand 2 to be fetched from main storage 10. If the instruction had been a two-byte instruction, there is no operand to be fetched.

Control then transfers to execute cycles, the type of execute cycles being indicated by the decoding of the op code by the op-code decoder 41. The execute cycles for send message, recieve message, SVL, and SVX will be described in detail later herein. If the instruction were other than one of the instructions for the execute cycles just mentioned; i.e., conventional instructions such as load, store, branch, etc., the execute cycles for these other instructions would then follow. Since these other instructions are very conventional instructions, their execute cycles are not shown.

In order to achieve a more detailed understanding of the present invention, and particularly the synchronous and conditional control transfer thereof, the T1, T2, A1, S1, T3, A2, and S2 cycles will be described in detail. Reference should be made at this point to FIGS. 7-1, 7-2, 8-1, 8-2, 9-1, 9-2, 10-1, 10-2, 11-1, 11-2, 12-1, 12-2, 13-1, 13-2 of this application and to FIGS. 14, 15, 17, 19, 16, 18, and 20 of the above-referenced U.S. Patent Application entitled "Task Handling Apparatus For A Computer System," for the timing diagrams of the T1, T2, A1, S1, T3, A2, and S2 cycles, respectively.

The control signals and those elements of the computer system which are involved during a T1 CPU cycle are shown in detail in FIG. 7. The function of a T1 CPU cycle is to load an immediate operand from emit encoder 60 into a register of the CPU. As seen in FIG. 7, control unit 100 places signals on bus 102, which activates emit encoder 60 to emit a binary value. Emit encoder 60, which is a conventional encoder, in turn places the binary value on bus 61, which feeds B-bus assembler 62. In order for the B-bus assembler 62 to select emit encoder 60 as a source, control unit 100 provides signals on bus 103. The output of the B-bus assembler 62 is applied over bus 63 to ALU 45. ALU 45 is controlled by a signal from control unit 100 on line 104 to pass the input on bus 63, i.e., the right-hand input, to O register 46, which is loaded under control of a signal from control unit 100 on line 105.

C-bus 47 presents the output of O register 46 to destination registers described below, and the destination register selected by control unit 100 is loaded when control unit 100 provides a load pulse, such as on line 106, which is representative of the load line to the selected destination register. (Although not shown, there is a load line to each destination register.) The destination registers are any register fed by the C-bus 47, and include IS REG 35, SA REG 36, SB REG 37, IL REG 38, SAR array registers 50, condition code register 64, L REG 66, LSR array registers 70 and P REG 90. Only single load lines are connected to SAR array registers 50 and LSR array registers 70.

The units of the computer system involved in the T2 CPU cycle are shown in FIG. 8. The function of a T2 CPU cycle is to transfer the contents of any data source register feeding A-bus assembler 39 to any destination register connected to receive data from C-bus 47. A-bus assembler 39 receives inputs from IS register 35, SA register 36, L register 66, P register 90, SAR array registers 50 via D-bus assembler 48 and LSR array registers 70. Control unit 100 can select a SAR array register 50, by placing an address on bus 101. The data from the selected register of the SAR array registers 50 is then read when control unit 100 provides a read signal on line 114. The data read from the selected register then passes over bus 32 to the A-bus assembler 39.

The LSR array registers 70 are always selected by an address in P REG 90. Data, however, is only read from the selected register when control unit 100 provides a read signal on line 107. Data from the selected register transfers over bus 69 to A-bus assembler 39. All other registers feeding A-bus assembler 39 do not require a read pulse, because their outputs are present without one.

The source into A-bus assembler 39 is selected when control unit 100 provides a signal on encoded bus 108. It should be noted that control unit 100 can select one of two sources with a single line. If the source to be selected is from more than two sources, then, depending upon the desired implementation, control unit 100 could send signals over an encoded bus or over a separate line to each source to make selections. The selection of data destinations can also be done in the same manner unless specified differently hereinafter. The data passed by the A-bus assembler 39 enters the ALU 45 via bus 40. ALU 45 is controlled by a signal from control unit 100 over line 109 to pass the data on A-bus 40, i.e., the left-hand input, to O REG 46. The data passed by ALU 45 is loaded into O REG 46 under control of a signal from control unit 100 on line 105.

The data residing in O REG 46 is then passed to the destination registers. One of the destination registers will be selected by a signal from control unit 100. If one of the SAR array registers 50 is the destination register, control unit 100 provides a signal on line 110 to D-bus assembler 48 which then selects C-bus 47 as a source. Control unit 100 will also provide an address on bus 101 for selecting one of the SAR array registers 50. If one register of the SAR registers 50 is selected, the data is entered into the selected SAR register from D-bus assembler 48 via bus 49 under control of a load pulse which control unit 100 provides on line 111.

If one of the LSR array registers 70 is selected as the destination register, control unit 100 would provide a load pulse on line 112. The register selected, of course, is the one addressed by the contents of P register 90. If the destination register is other than an SAR array register 50 or an LSR array register 70, control unit 100 provides a load pulse on line 106 which is a representative load line.

The A1 CPU cycle is shown in FIG. 10. The function of the A1 CPU cycle is to transfer the contents of two selected registers to the ALU 45, perform an ALU operation and transfer the result either to the left source register or drop the result. Also, during the A1 CPU cycle, the condition latches AC 95 and AZ 96 are appropriately put in states determined by the result of the ALU operation. In FIG. 10, control unit 100 will provide an address on bus 101 and a read signal on line 114 if one of the SAR array registers 50 is to be the source register for the left-hand input into ALU 45. If the input into the left-hand side of ALU 45 is to come from one of the LSR array registers 70, control unit 100 provides a read signal on line 107. The source for the left-hand input into ALU 45 is selected by control unit 100 as it provides a selection signal to A-bus assembler 39 on line 108.

The right-hand input is passed to the ALU 45 by B-bus assembler 62. It will be recalled that B-bus assembler 62 can select the SB REG 37, the IL register 38, the emit encoder 60 or the condition code register 65. The selection is made by signals which control unit 100 provides on encoded bus 103. The function performed by ALU 45 is determined by the signal provided by control unit 100 on line 104. For example, the signal on line 104 might cause ALU 45 to add the contents of the SA REG 36 with the contents of SB register 37 and return the result to register 36 via the O register 46 and C-bus 47. Another example would be for the ALU 45 to subtract the contents of the SB REG 37 from the contents of the SA REG 36. The result can be dropped or passed to the O REG 46. Control unit 100 provides a load signal on line 105 to load the result into O REG 46. The result is then available to C-bus 47 for transfer to a destination register. If the destination of the result is one of the SAR array registers 50, control unit 100 provides a signal on line 110 to D-bus assembler 48 for causing the same to select C-bus 47 as a source, and provides a signal on line 111 for loading one of the SAR array registers 50, selected by the address on bus 101 from control unit 100, with the result passed by D-bus assembler 48 via D-bus 49. If the result is to be placed in one of the LSR array registers 70, control unit 100 provides a signal on line 112 for loading the selected register where the selection is made by the address in P-register 90 via bus 91. If the destination register is other than those mentioned, control unit 100 provides a signal on line 106 which is a representative load line. Condition latches 95 and 96 are set or reset by signals from ALU 45 over lines 43 and 44, respectively.

Figures 2, 12:
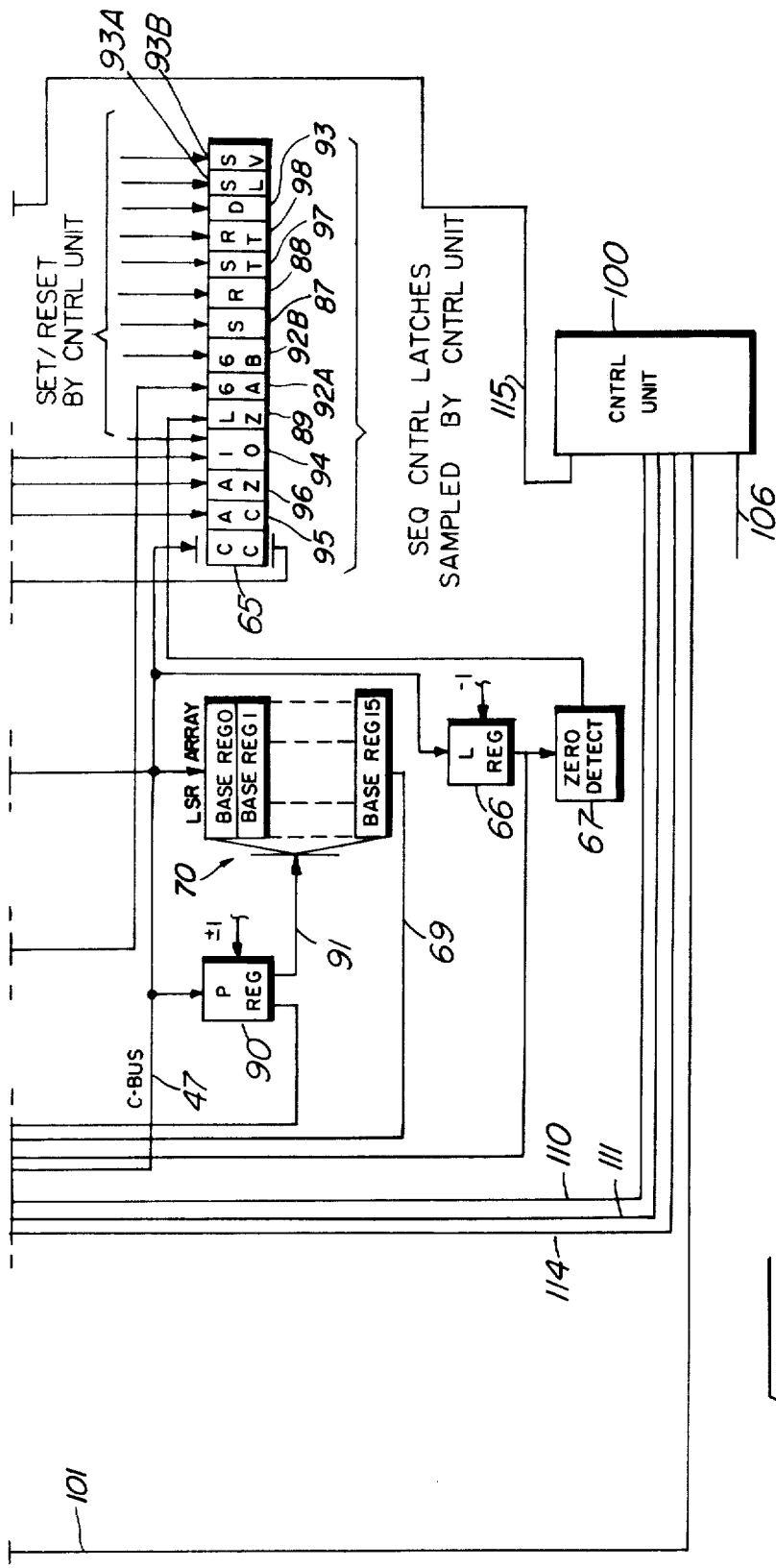

Durin an S1 CPU cycle, data is read from main storage 10 and loaded into a register connected to SO-bus 19. The source of the storage address is in one of the SAR array registers 50, and this address can be optionally incremented or decremented and returned into the souce SAR array register 50. Those units of the computer system involved in a S1 CPU cycle are shown in FIG. 12. Control unit 100 provides an address on bus 101 for addressing SAR array registers 50. The contents of the selected SAR array register are read by a signal which control unit 100 provides on line 114. The contents from the selected SAR array register 50 are placed on bus 32 and entered into register 18, and are also applied to incrementer 59. The output of incrementer 59 is passed to D-bus assembler 48. If the incremented or decremented address is to be returned to the selected SAR array register, control unit 100 provides a signal on line 110 to D-bus assembler 48 and the incremented or decremented address is entered into the selected SAR array register 50 when control unit 100 provides a load signal on line 111. Control unit 100 then provides a storage read pulse on line 115 to storage control 15. Data is read from storage 10 at the location addressed by the address in register 18. This data passes from main storage 10 via bus 11 to storage control 15 and into data register 17. Whether or not register 17 is actually a register is a matter of choice, and depends upon the particular type of storage used; i.e., in some storage units, the data is latched at the output of storage. The data then passes from data register 17 onto SO bus 19. The data on SO bus 19 enters an appropriate destination register, as determined by a load signal on representative load line 106 furnished by control unit 100.

Those elements of the computer involved in the T3 CPU cycle are shown in FIG. 9. The function of the T3 CPU cycle is to transfer the contents of any source register feeding B-bus assembler 62 except emit encoder 60 to any register connected to receive data via C-bus 47. The inputs into B-bus assembler 62 are SB REG 37, IL REG 38 and CC REG 65 and are selected by signals from control unit 100 over bus 103. The data fed into B-bus assembler 62 from the selected source then passes over B-bus 63 to ALU 45. ALU 45 is controlled by a signal from control unit 100 over line 104, to pass the data on B-bus 63 to O register 46. O register 46 is loaded with the data from ALU 45 by a load signal from control unit 100 on line 105. C-bus 47 receives the data from O register 46 and passes it to destination registers previously described. If one of the SAR array registers 50 is to be the destination register, control unit 100 provides an address on bus 101, a selection signal to D-bus assembler 48 on line 110 and a load pulse on line 111. If the destination register is to be one of the LSR array registers 70, P register 90 contains the address for selecting the LSR array register, and control unit 100 provides a load signal on line 112. If the selected register is other than the registers just described, control unit 100 provides a load pulse on representative load line 106. The other destination registers, of course, are IS register 35, SA register 36, SB register 37, IL register 38, condition code register 65, L register 66 and P register 90. From the foregoing, it is seen that the T3 CPU cycle is like a T2 CPU cycle, except that the source data comes from sources feeding the B-bus assembler 62 exept the emit encoder 60 rather than sources feeding A-bus assembler 39.

The A2 CPU cycle, as shown in FIG. 11-1 and FIG. 11-2, is similar to the A1 CPU cycle, but functions to control ALU 45 and inputs thereto from sources feeding A-bus assembler 39, and feeding ALU 45 vai A-bus 40, and also to control an immediate operand applied to B-bus assembler 62 and feeding ALU 45 via B-bus 63. ALU 45, controlled by control unit 100, performs the appropriate function, and the result is returned to either the source register or dropped. ALU 45 appropriately places AC and AZ latches 95 and 96 in their proper states via lines 43 and 44, respectively, as a consequence of the ALU operation. In FIG. 11-1 and FIG. 11-2, if the source of the data having an input into ALU 45 via A-bus 40, is to be one of the SAR array registers 50, control unit 100 provides an address on bus 101 and a read signal on line 114. The data then transfers to A-bus assembler via bus 32. If the source is to be one of the LSR array registers 70, control unit 100 provides a read pulse on line 107 and data is read from the register selected by the address in P REG 90. The data passes from the selected LSR array register 70 to the A-bus assembler 39 via bus 69. All other sources feeding A-bus assembler 39 do not require a read signal.

The particular source into A-bus assembler 39 is selected by control unit 100, which provides selection signals on bus 108. The immediate operand comes from emit encoder 60, which is rendered active by control unit 100 via line 102. B-bus assembler 62 selects the emit encoder 60 as an input source in response to control signals from control unit 100 via bus 103. ALU 45 performs the desired operation under control of a signal from control unit 100 via line 104. The result is entered into O register 46 when control unit 100 provides a load signal on line 105. The result in register 46 is then available to C-bus 47, by which it is fed to a destination register.

If the destination register is to be one of the SAR array registers 50, control unit 100 again provides an address on bus 101, a load signal on line 111 and a D-bus assembler selection signal on line 110, whereby bus 47 is selected as the source into D-bus assembler 48, and the data enters the selected SAR array register 50 via D-bus 49. If the destination register is one of the LSR array registers 70 control unit 100 provides a load pulse on line 112, and the data on bus 47 enters the register selected by an address provided from P register 90. If the destination of the result is for registers other than SAR array registers 50 or LSR array registers 70, control unit 100 provides a load pulse on line 106 which is representative of load lines leading to the other destination registers.

Figures 2, 13:
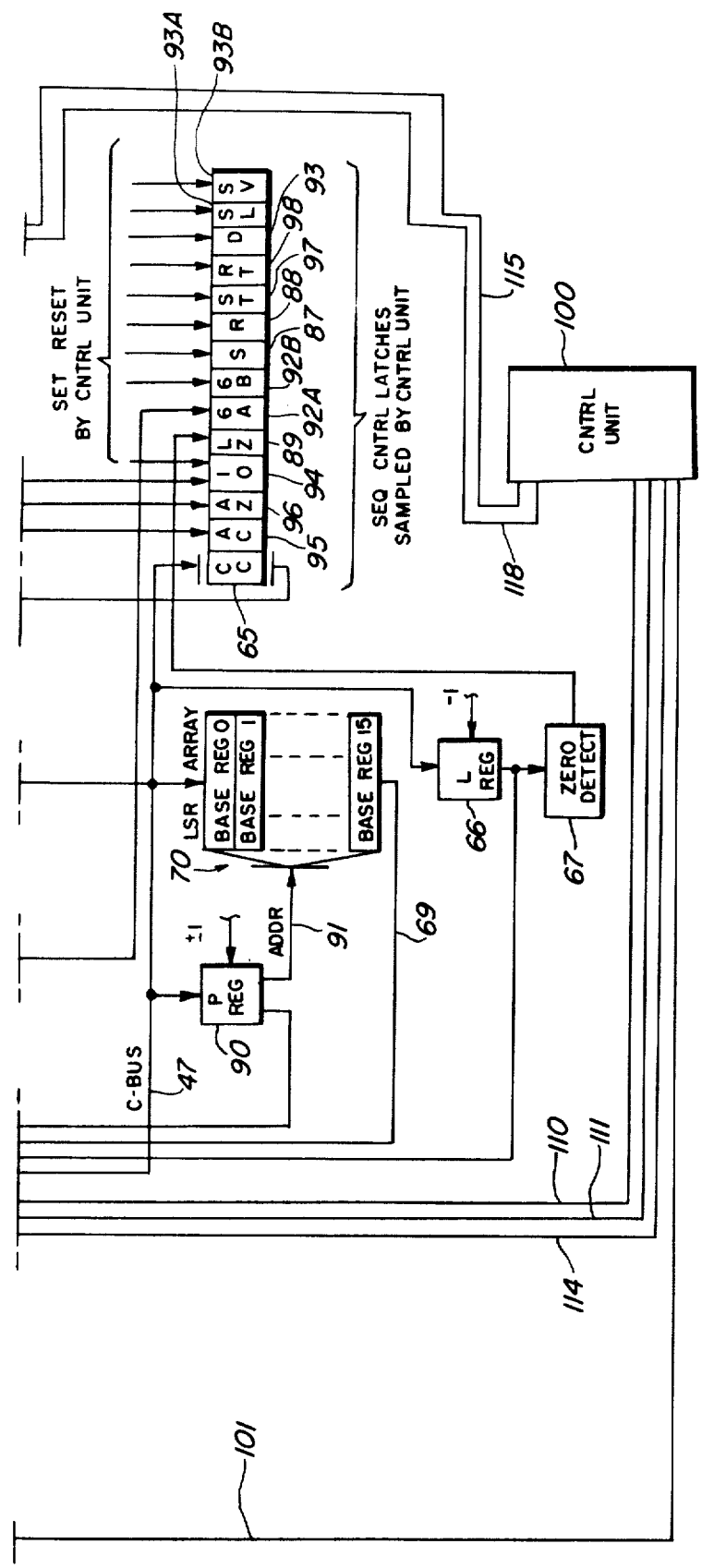

The details of the S2 CPU cycle are illustrated in FIG. 13-1 and FIG. 13-2. The S2 CPU cycle differs from the S1 CPU cycle in that data is written into main storage 10 from either SA REG 36 or SB REG 37 via buses 28 and 29, respectively, which feed SI bus assembler 34, which in turn feeds data register 17 via bus 31. The data then is passed to main storage 10 from storage control 15 over bus 12 and written into a storage location designated by the address in address register 18. The address placed into register 18 comes from one of the SAR array registers 50. Specifically, control unit 100 provides an address on bus 101 to address SAR array 50 registers. The address data is read from the selected SAR array register 50 in response to a read signal from control unit 100 via line 114. The address data then passes from the selected SAR array register 50 over bus 32 to address register 18. The address in register 18 is then presented by storage control 15 to main storage 10 over address bus 16 when control unit 100 provides a signal on line 115.

The data which is to be written into main storage is selected from either SA register 36 or SB register 37 by a signal from control unit 100 via line 118 which is applied to SI bus assembler 34. The data passed by SI bus assembler 34 enters data register 17 via bus 31, and is then presented by storage control unit 15 to main storage 10 via bus 12. The data also is available to main storage 10 prior to the storage write pulse on line 115 as seen in FIG. 13-2. Additionally, the address provided from the selected SAR array register 50 can be incremented or decremented by incrementer 59 and then loaded back into the selected SAR array register 50. During the incrementing or decrementing operation, control unit 100 maintains the address for the selected register of the SAR array registers 50 on bus 101. Control unit 100 provides a source selection signal to D-bus assembler 48 via line 110, and a load pulse on line 111, whereby the incremented or decremented address is then loaded back into the selected SAR array register 50.

Figures 2, 25:
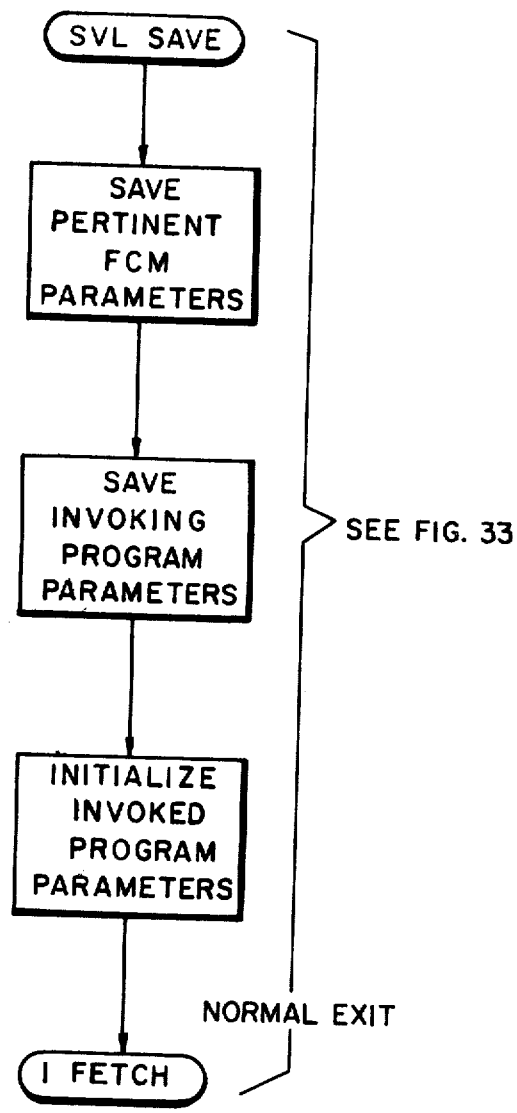

All CPU involved in the present invention have now been described in the foregoing description. Transfer of processor control from the invoking to the invoked program followed by return of control to the invoking program will now be described. The transfer mechanism, which is hereinafter detailed, is, as noted, diagramatically depicted in FIGS. 25-1 and 25-2. As there noted, the transfer occurs through a number of separate, but interrelated, cycles. These cycles which, in some instances, may be used to support additional functions of the apparatus of the present invention will now be described in detail.

I-FETCH Cycles

Referring now to FIG. 26-1, the I-FETCH cycle which sets up necessary parameters for subsequent execution of the invoked program is shown. Initially, D latch 93 and I/O latch 94 are decoded by the control unit 100 and in the event I/O latch 94 is ON, I/O event cycles are taken. If, however, D latch 93 is ON and I/O latch 94 is OFF, dispatch cycles are taken. I/O cycles and dispatch cycles are fully set forth in the above-referenced U.S. Patent Application entitled "Task Handling Apparatus For a Computer System."

If the decode operation establishes that both D latch 93 and I/O latch 94 are OFF, an instruction decode cycle commences and sequence control latches SL 93A and SV 93B are set according to FIG. 14A. Additionally, 64 latch 92A and 6B latch 92B are set or reset depending on the instruction length as shown in FIG. 14B. As will be appreciated, prior to setting the latches 92A and 92B their state is of no immediate concern. Accordingly, in setting these latches it is only necessary to set/reset, i.e., to force, the latches to an appropriate state depending upon the length of the instruction.

After the latches 92A and 92B are set/reset, a T1 CPU cycle is taken to sample the value of the latches 92A and 92B and to place their respective values in IL REG 38 via control unit 100 and emit encoder 60. A test of the SL latch 93A is then performed and if this test establishes that the latch 93A is ON; i.e., that the SVL is either explicit or implicit, an A1 cycle is taken. Through an A1 cycle, as previously described, the value of the IAR@ SAR 51 is placed in A-bus assembler 39 via bus 32 and the instruction length value is taken from the IL REG 38 and placed on the B-bus assembler 62. Alternatively, the value of the latches 92A and 92B may be loaded onto the emit encoder 60 through control of the control unit 100. In this alternative, an A2 cycle, as previously described, is taken which places the value of IAR@ SAR 51 onto A-bus assembler 39 and also places the value of the emit encoder 60 on the B-bus assembler 62 via bus 61.

In either of the above-described alternatives, the information contained in the A-bus assembler 39 and the B-bus assembler 62 is transferred via A-bus 40 and B-bus 63, respectively, to the ALU 45 where an add operation occurs. The result of the add operation in the ALU 45 is applied through O register 46 to IAR@ SAR 51 via C-bus 47, D-bus assembler 48, and D-bus 49. At the completion of this operation, the updated IAR@ SAR 51 points to the next sequential instruction of the invoking program. Thereafter, a T2 cycle is taken to load the instruction I-field value from the IS REG 35 onto the P REG 90. FIG. 2B shows the three possible instruction formats including the op-code field; I-field; Operand 1 address and Operand 2 address. A test is then performed on the 6A latch 92A. If the 6A latch 92A is in the OFF state (see FIG. 14B), execute cycles commence as established by the op-code decoder 41 and control unit 100. If 6A latch 92A is in the ON state (see FIG. 14B), a T2 cycle is taken to take the OP1 instruction address from the IS REG 35 and load it onto OP1@ SAR 54. This operation is followed by a test of 6B latch 92B, and if the latch 92B is ON (see FIG. 14B), a T2 cycle is taken to take the OP2 instruction address from the IS REG 35 and load it onto OP2@ SAR 55, and execute cycles commence as directed by op-code decoder 41 and control unit 100. In the instance where the 6B latch 92B is OFF (see FIG. 14B), execute cycles commence as dictated by the op-code decoder 41 and control unit 100.

The foregoing description assumes that the test performed on the SL latch 93 A establishes that the latch is ON (see FIG. 14A), i.e., that the SVL encountered in the invoking program is either an EXPLICIT SVL or an IMPLICIT SVL. However, in the event that this test establishes that the SL latch 93A is OFF (see FIG. 14A), the SVL encountered in the invoking program can only be an EXCEPTION SVL. As previously mentioned, an EXCEPTION SVL includes those exceptions typically generated as a result of the execution of instructions; i.e., the EXCEPTION SVL may be one of a number of machine exceptions well-recognized in the art. Whenever an EXCEPTION SVL is encountered, a T1 cycle is taken and the exception type is loaded into OP1@ SAR 54. The exception type is emitted during the T1 cycle via emit encoder 60 and under control of control unit 100. In certain instances it may be advantageous to also load a register with the address of the operation which created the exception. Thus, in this instance, a T2 cycle is then taken which loads this address into OP2@ SAR 55. In either situation, execute cycles such as, for example, SVL or SVX cycles, commence as indicated by the op-code decoder 41 and control unit 100. The appropriate exception address is selected during this T2 cycle by control unit 100 and transmitted via D-bus 49 to SAR array registers 50.

SVL Cycles

It will be appreciated that, upon completion of the I-FETCH cycles as shown in FIG. 26-1 and FIG. 26-2, SVL cycles shown in FIG. 27-1, FIG. 27-2, FIG. 25-1, and FIG. 25-2 may commence. The purpose of the SVL cycles is to obtain storage space to store the STATE of the invoking program and to pass parameters and processor control to the invoked program (see FIG. 1). Accordingly, the SVL cycles, which are hereinafter described, perform the following functions, (see FIGS. 25-1 and 25-2): (a) temporarily saving those parameters generated in the I-fetch cycle; (b) testing for the conditional execution of the invoked program by using a selected control field of the FCM; (c) generating appropriate control parameters to perform an implicit receive message (IMPLICIT RECM) operation thereby locating the ACQ, and, using an IMPLICIT RECM, accessing an available CRE on the ACQ, removing the CRE from the ACQ, and inserting the CRE on the current TDE (CTDE); (d) saving the STATE of the invoking program controlled by selected fields of the FCM; (e) initializing the invoked program by passing those parameters generated in the I-fetch cycle; and (f) initiating execution of the invoked program. The implementation of these functions will now be described.

Figures 1, 27:
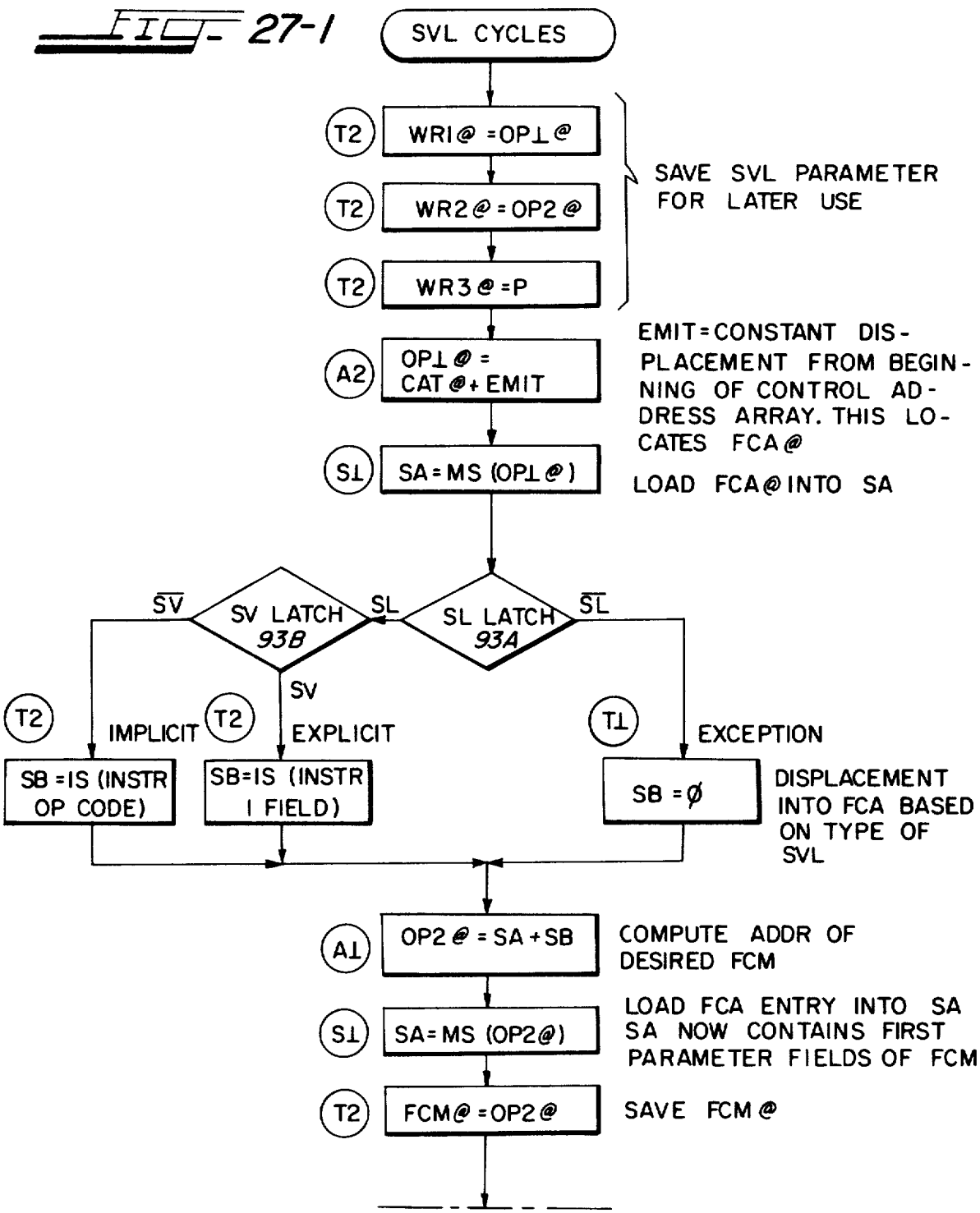

Referring now to FIG. 27-1, the SVL cycle commences by loading the information contained in OP1@ SAR 54, OP2@ SAR 55, and P REG 90 into WR1@ 58B, WR2@ SAR 58C, and WR3@ SAR 58D, respectively, via three separate T2 CPU cycles. The purpose of loading these values into the work registers is to free OP1@ SAR 54, OP2@ SAR 55, and P REG 90 so that they may be used to perform subsequent tests and operations in support of functions (b) through (d) above. Of course, it should be appreciated that if a 2-byte SVL is encountered, only P REG 90 will contain useful information; if a 4-byte SVL is encountered, OP1@ SAR 54 and P REG 90 will contain useful information; and if a 6-byte SVL is encountered, P REG 90, OP1@ SAR 54, and OP2@ SAR 55 will all contain useful information. In the case of an EXCEPTION SVL, OP1@ SAR 54 and, optionally, OP2@ SAR 55 will contain useful information.

The present invention next proceeds by accessing the FCA, locating an FCM within the FCA, and testing the FCM conditional execution code field for conditional continuation of the transfer. Therefore, in order to proceed, an A2 CPU cycle is taken to add the data in CAT@ SAR 58A to that emitted from the emit encoder 60 under control of control unit 100, the emitted field being a known constant displacement value within the CAT 606, said displacement thus used to locate the function control array address (FCA@ ). The result of this A2 cycle is loaded into OP1@ SAR 54. The FCA address within the CAT 606 has now been located. The CAT is accessed and the FCA address is loaded into SA REG 36 via an S1 CPU cycle; i.e., the address in OP1@ SAR 54 is passed along bus 32 to address register 18 and the contents of main storage 10 located at the OP1@ SAR 54 address located is loaded via S-O bus 19 into SA REG 36.

In order to address the appropriate FCM within the FCA, it is necessary to compute a displacement value based upon the type of SVL encountered in the invoking program. Such displacement value is computed by performing a test of the SL latch 93A. If the SL latch 93A is OFF, indicating an EXCEPTION SVL, a T1 cycle is taken which loads SB REG 37 with a pre-assigned displacement value. In this example, such value is arbitrarily set at zero. On the other hand, if the SL latch 93A is ON (indicating either an EXPLICIT or IMPLICIT SVL) then a test of the SV latch 93B is performed. If this test establishes that SV latch 93B is OFF (indicating an IMPLICIT SVL), a T2 cycle is taken which loads the instruction op-code field of the IMPLICIT SVL from IS REG 35 into SB REG 37. However, if the SV latch 93B is ON (indicating an EXPLICIT SVL), a T2 cycle is used to load the instruction I-field of the EXPLICIT SVL from IS REG 35 into SB REG 37. With the foregoing description, displacement into the FCA based upon the SVL type has been calculated.

The address of the desired FCM is determined by adding the contents of SA REG 36 and SB REG 37 and loading this sum into OP2@ SAR 55 via an A1 CPU cycle. The main storage data addressed by OP2@ SAR 55 is now transferred to SA REG 36 through an S1 cycle; at the completion of this operation SA REG 36 contains the first parameter fields of the FCM appropriate for the SVL encountered in the invoking program. Furthermore, the contents of OP2@ SAR 55 are also loaded into FCM@ SAR 58E in order to save the address of the FCM for future use.

As previously mentioned, the result of an A2 cycle can be returned to a source register or dropped. This feature is useful as a prelude to testing for the conditional execution of the present invention. Accordingly, an emit mask is created by emit encoder 60 with the mask being applied along B-bus 61 to B-bus assembler 62. As seen in FIG. 27-2, the emit mask is used in a logical AND operation against the FCM conditional execution code field located in SA REG 36. This operation, which is performed by an A2 cycle with no data destination specified, is used to set the AZ latch 96; a test of AZ latch 96 is performed next. If the latch 96 is ON, I-fetch cycles commence as illustrated in FIG. 26-1, i.e., the FCM is in the by-pass mode, and processor control is transferred back to I-fetch to access the next sequential instruction after the SVL. If, however, the latch 96 is OFF, the conditional execute function is satisfied, and processor control remains in the SVL cycle.

Assuming control remains in the SVL cycle, at the completion of the foregoing, it is now necessary to obtain an available CRE from the ACQ. In order to perform this step, it is necessary to first compute the address of the ACQ; the ACQ address is located in the CAT 606. This computation occurs through an A2 CPU cycle which adds the data in the CAT@ SAR 58A to data obtained from the emit encoder 60, the emit encoder 60 data being a known displacement from the beginning of CAT 606; an example of this arithmetic addition procedure has been previously described. The result of this addition, which is loaded in OP1@ SAR 54, points to the ACQ address (ACQ@) which is stored at a fixed location within the CAT 606. An S1 cycle is then taken to load the ACQ address into SA REG 36 and a T2 cycle follows thereafter to transfer the ACQ address from the SA REG 36 to OP1@ SAR 54. Next, an S1 cycle is performed to load SA REG 36 with the data contained in main storage 10 at the OP1@ SAR 54 address location. The SA REG 36 now contains the CRE chain address. Finally, an A2 CPU cycle is used to set SB REG 37 to zero. This completes the parameter initialization to remove the CRE from the ACQ. IMPLICIT RECM cycles are taken.

IMPLICIT RECM

The IMPLICIT RECM cycles are initiated by setting the sequence control latches R latch 88, S latch 87, RT latch 98, and ST latch 97, as summarized on FIG. 28. Thereafter, the contents of OP1@ SAR 54 are loaded into PCH@ SAR 56 via a T2 cycle. REMOVE cycles follow.

REMOVE CYCLES: SVL IMPLICIT RECM, CRE AVAILABLE ON ACQ, TO SVL INSERT

Figures 1, 29:
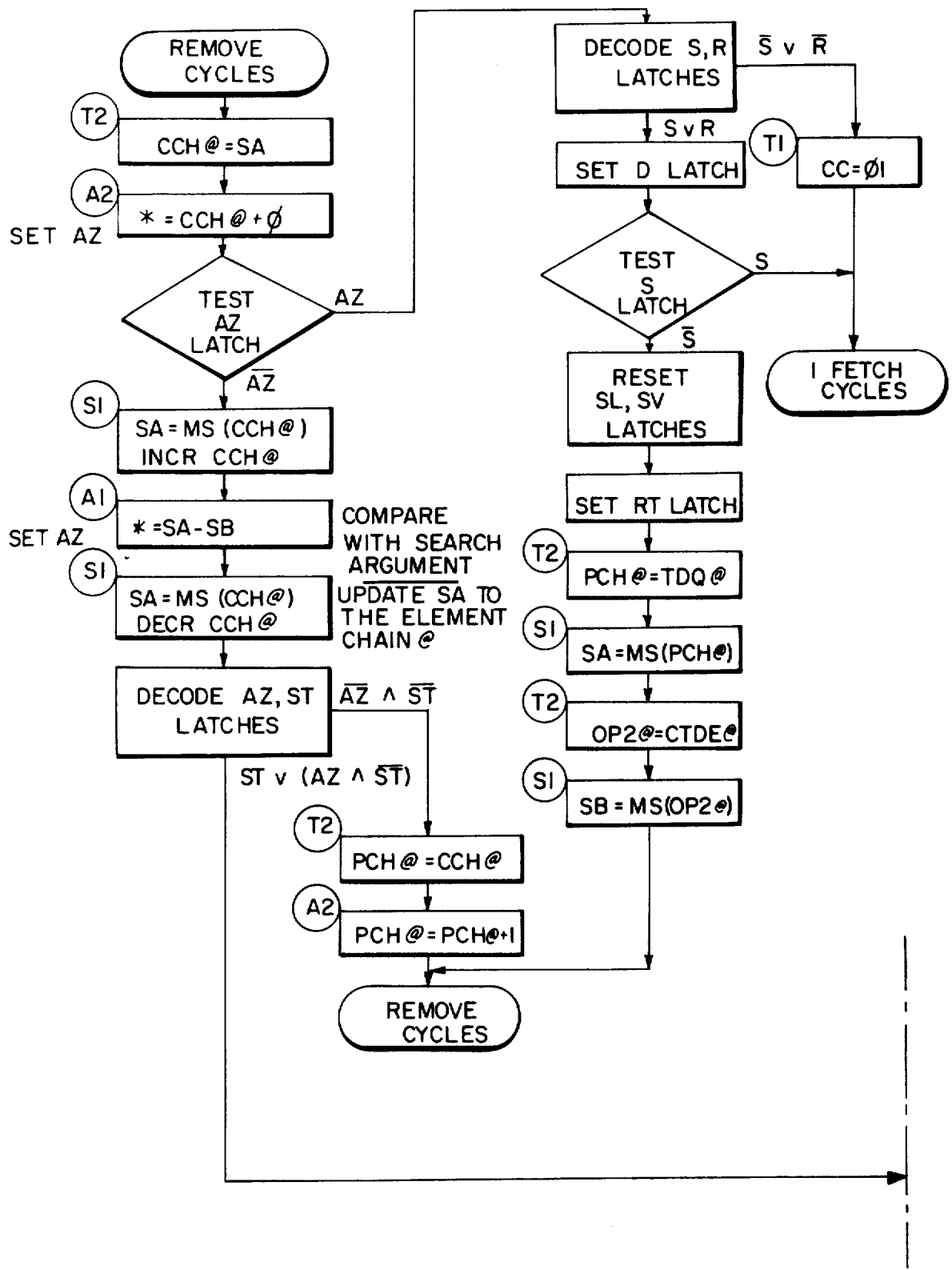
Figures 2, 29:
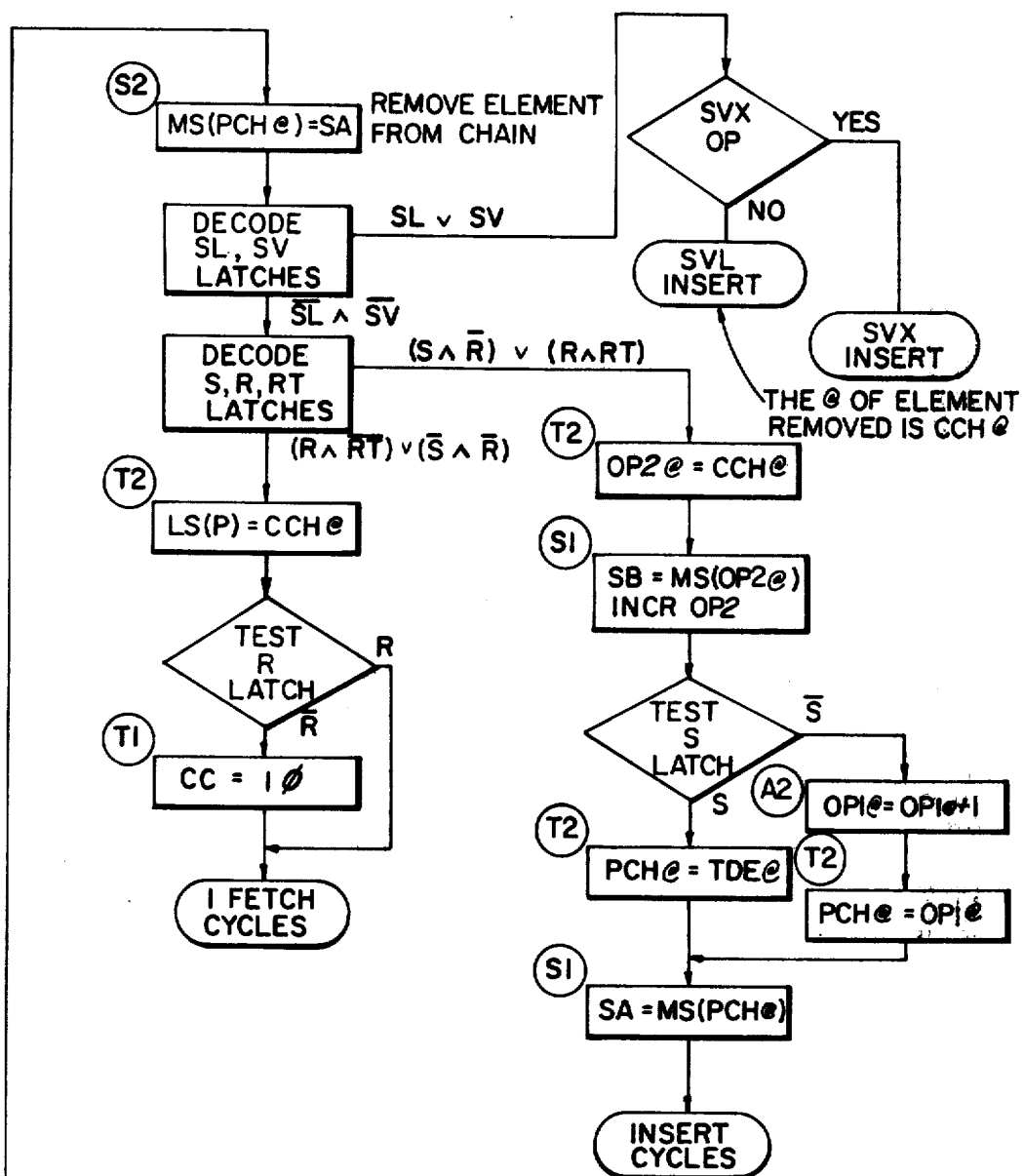
Figures 1, 37:
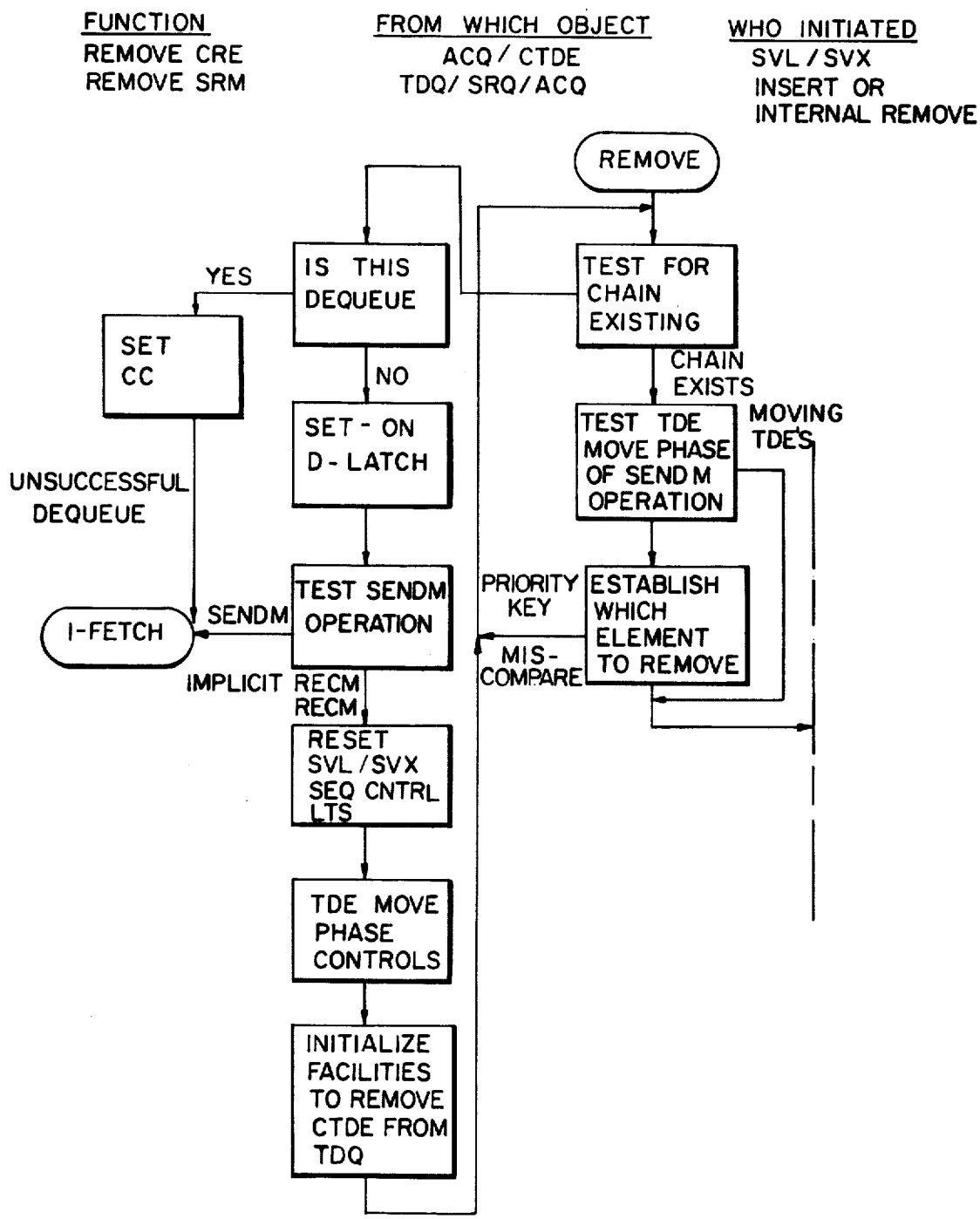

REMOVE cycles of the present invention are useful in removing an available CRE from the ACQ. In this instance, exit from REMOVE cycles allows entrance to SVL INSERT cycles. FIG. 4 is an example of the TDQ and ACQ prior to the removal of the CRE from the ACQ. FIG. 37-1 and FIG. 37-2 contain an overview of the steps involved in REMOVE cycles. The cycles commence as illustrated in FIG. 29-1 via a T2 CPU cycle in which the contents of the SA REG 36 are loaded into CCH@ SAR 57. A dropped-results operation next follows in which the contents of the CCH@ SAR 57 are added to zero and the AZ latch 96 is set according to the results of this operation. A test of the AZ latch 96 is performed. If this test establishes that the AZ latch 96 is in the OFF state; i.e., the dropped-results operation result is not zero, indicating that an available CRE is on the ACQ, an S1 cycle is taken wherein the contents of main storage located at the CCH@ SAR 57 address location are loaded into SA REG 36 and CCH@ SAR 57 is incremented by one word. An A1 cycle dropped-results CPU operation is then performed. This operation subtracts the value of SB REG 37 from SA REG 36, and the AZ latch 96 is set accordingly. An S1 cycle follows to update the SA REG 36 to the CRE chain address. In this cycle, the SA REG 36 is loaded with the contents of main storage 10 contained at the CCH@ SAR 57 address location, and the CCH@ SAR 57 is then decremented by one word.

Figure 15:
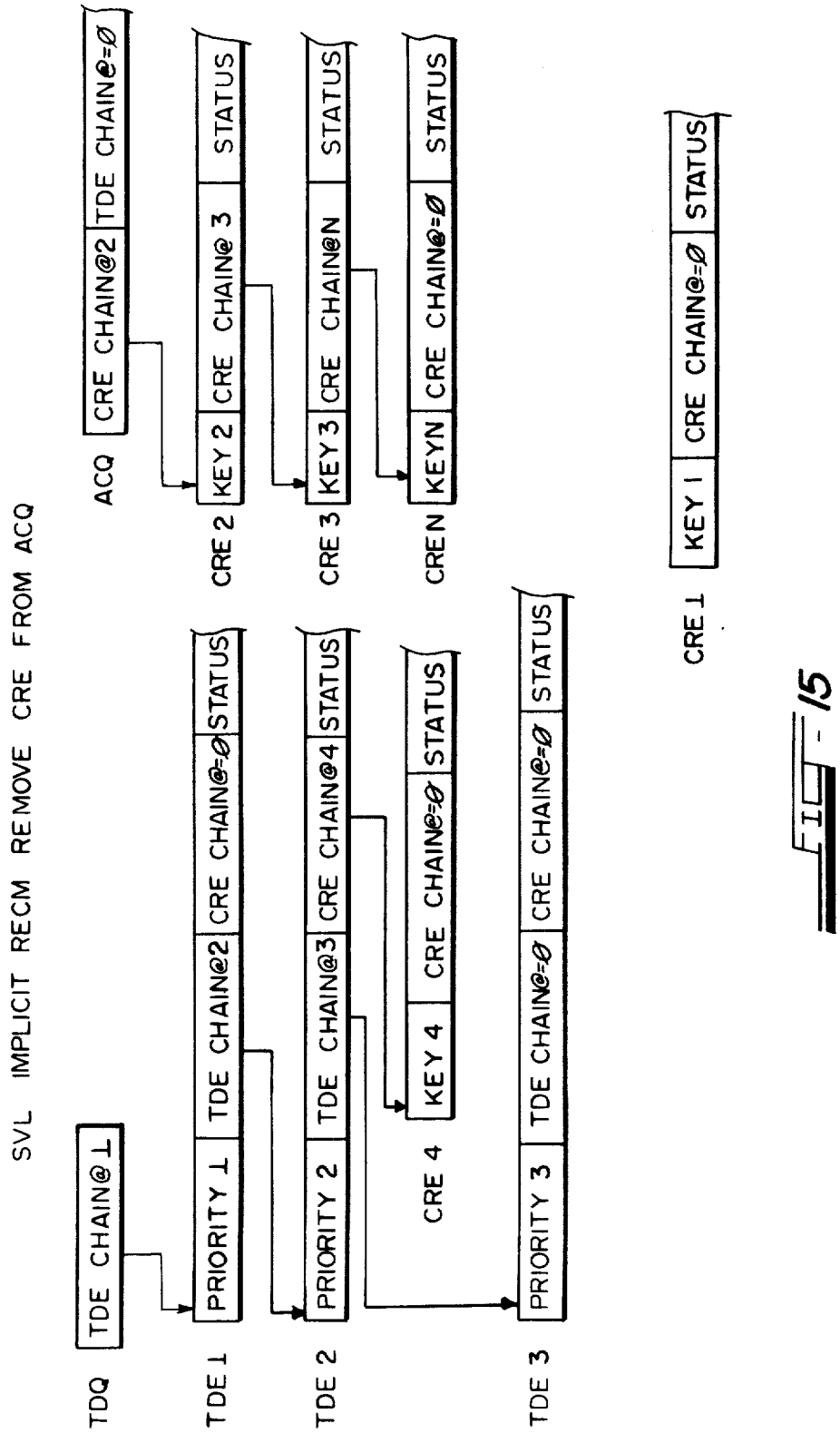
FIG. 15 is a diagram illustrating the effect of an IMPLICIT RECM cycle in which a CRE is removed from the ACQ.

A decode operation follows thereafter in which AZ latch 96 and ST latch 97 are decoded. If the results of this decode operation establish that the ST latch 97 is ON, or that the AZ latch 96 is ON and the ST latch is OFF, i.e., ST V (AZ ∧ S̄T̄), the operation is identified as CRE-remove (as opposed to TDE-send, which will be later described). An S2 cycle, as shown in FIG. 29-2, then stores the contents of SA REG 36 into main storage at the PCH@ SAR 56 address location. The result of this operation is to remove the CRE from the ACQ chain. FIG. 15 illustrates this operation by showing CRE1 removed from the ACQ.

A decode operation of the SL latch 93A and the SV latch 93B is performed. If the result of this operation establishes that either of these latches are ON; i.e., that SVL or SVX cycles are being run, a test is performed on the SVX op code contained within op-code decoder 41 as applied to the control unit 100. In the event this test establishes that there is no SVX op code in the op-code decoder 41, SVL INSERT cycles are taken, however, if an SVX op code is contained within the op-code decoder 41, SVX INSERT cycles occur. Both the SVL INSERT and SVX INSERT cycles will be fully described hereinafter.

REMOVE CYCLES: SVL IMPLICIT RECM; NO AVAILABLE CRE ON ACQ, TO INSERT AND TASK SWITCH OCCURS

Figure 17:
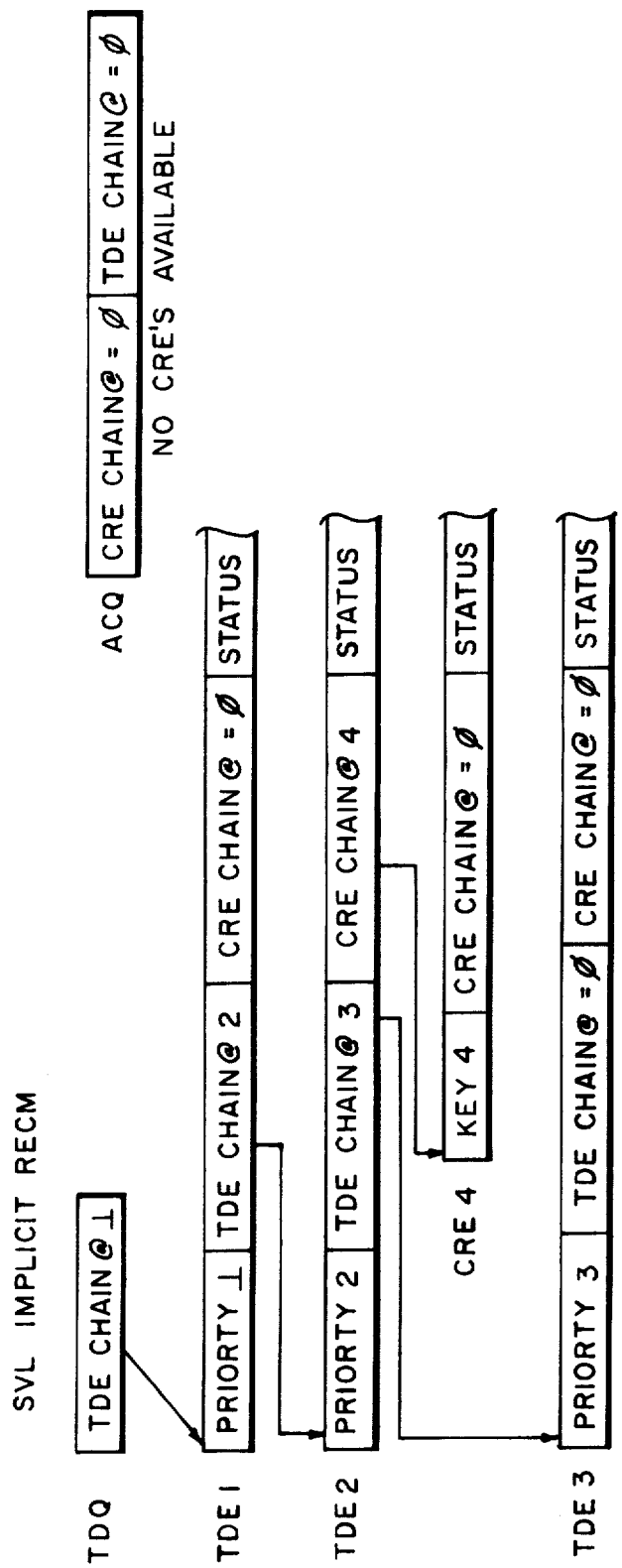
FIG. 17 is a diagram illustrating the conditions that exist for an IMPLICIT RECM cycle to be unsatisfied which will then cause a task switch to occur.
Figure 18:
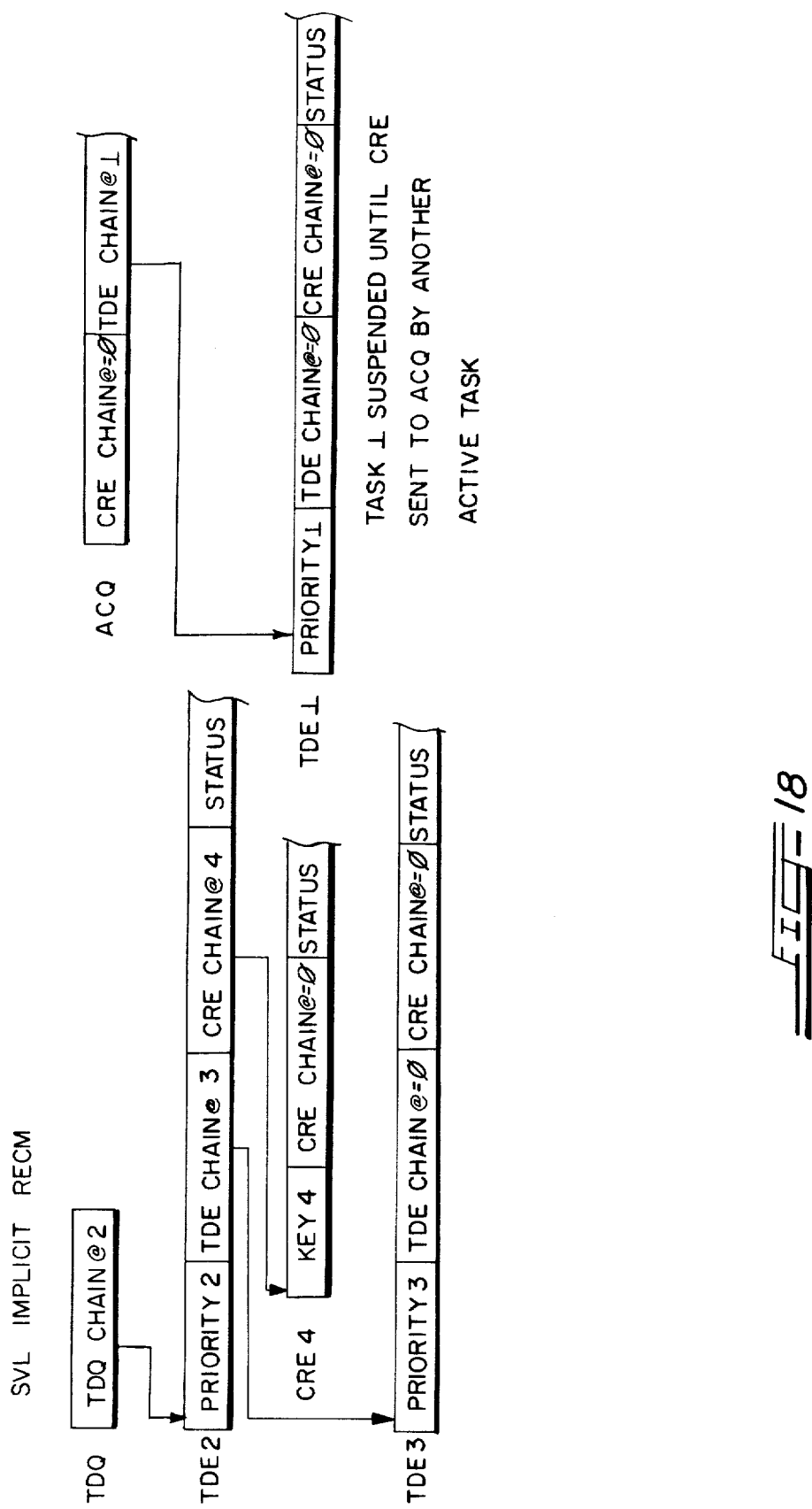
FIG. 18 is a diagram illustrating the results of an unsatisfied IMPLICIT RECM cycle in which the current TDE is removed from the TDQ chain and inserted on the ACQ wait list thus resulting in a task switch.

The general REMOVE cycles may also remove the CTDE from the TDQ if there are no available CRE's on the ACQ. FIG. 17 and FIG. 18 illustrate this condition, FIG. 17 showing the initial condition with no CRE's on the ACQ, and FIG. 18 showing the final condition after the TDE is moved. In this instance, exit from the REMOVE cycles allows entrance to INSERT cycles. The cycles commence, as seen in FIG. 29-1, via a T2 CPU cycle in which the contents of the SA REG 36 are loaded into CCH@ SAR 57. A dropped-results operation follows next in which the contents of the CCH@ SAR 57 are added to zero, and the AZ latch 96 is set according to the results of this operation. A test of the AZ latch 96 is performed. If this test establishes that the AZ latch in ON, a decode operation is performed on S latch 87 and R latch 88. In the event that either S latch 87 or the R latch 88 is on, the D latch 93 will be set.

Next, a test of the S latch 87 occurs, and, since this REMOVE cycle operation was initiated via an IMPLICIT RECM, the S latch 87 will be OFF. Accordingly, SL latch 93A and SV latch 93B are reset. Furthermore, since the AZ latch 96 test established that no CRE's were available on the ACQ, it is necessary to initiate a task switch operation. Thus, the RT latch 98 is set, and parameters are established to force the removal of the CTDE from the TDQ. In order to do this, a T2 cycle is taken and the TDQ@ SAR 52 is loaded into PCH@ SAR 56. An S1 cycle follows in which SA REG 36 is loaded with the contents of main storage 10 contained at the PCH@ SAR 56 address location. The CTDE@ SAR 53 is loaded into OP2@ SAR 55 via a T2 cycle, and SB REG 37 is given the contents of main storage 10 located at the OP2@ SAR 55 address location.

At the completion of this last described operation, machine parameters have then been established to force the removal of the CTDE from the TDQ chain. REMOVE cycles now commence with these forced parameters. The cycles commence via a T2 CPU cycle in which the contents of the SA REG 36 are loaded into CCH@ SAR 57. A dropped-results operation follows next in which the contents of the CCH@ SAR 57 are added to zero and the AZ latch 96 is set according to the results of this operation. A test of the Az latch 96 is performed. The latch 96 is now in the OFF state; i.e., the dropped-results operation result is not zero, and an S1 cycle is taken wherein the contents of main storage 10 located at the CCH@ SAR 57 address location are loaded into SA REG 36 and the CCH@ SAR 57 is incremented by one word. An A1 cycle dropped-results CPU operation is performed. this operation subtracts the value of SB have been forced into equality, the AZ latch 96 is set on.

An S1 cycle follows to update the SA REG 36 to the TDE chain address. In this cycle, the SA REG 36 is loaded with the contents of main storage 10 contained at the CCH@ SAR 57 address location, and the CCH@

SAR 57 is decremented by one word. A decode operation follows thereafter in which AZ latch 96 and ST latch 97 are decoded. The result of this decode operation is that the AZ latch 96 is ON and the ST latch 97 is OFF; i.e., ST V (AZ $\overline{ST}$) is satisfied by the AZ $\overline{ST}$ condition being true, and as seen in FIG. 29-2, an S2 cycle stores the contents of SA REG 36 into main storage 10 at the PCH@ SAR 56 address location. The result of this operation is to remove the TDE from the TDQ chain. A decode operation of the SL latch 93A and the SV latch 93B is performed and establishes that the SL latch 93A and the SV latch 93B are in the OFF state. A second decode operation is performed on S latch 87, latch 88, and RT latch 98. This decode operation establishes that the R and RT latches are both ON; i.e. (S $\wedge$ $\overline{R}$) V (R $\wedge$ RT), the R $\wedge$ RT condition thus being true, and a T2 CPU cycle is taken such that CCH@ SAR 57 is loaded into OP2@ SAR 55.

Next, an S1 cycle loads the SB REG 37 with the contents of main storage 10 located at the OP2@ SAR 55 address location, and the OP2@ SAR is incremented by one word. The S latch 87 is tested, and, if the S latch is OFF, i.e., a receive mode exits, an A2 cycle increments the OP1@ SAR 54 by one word and loads this value into OP1@ SAR 54. A T2 cycle places the contents of OP1@ SAR 54 into PCH@ SAR 56, and an S1 cycle is taken. This S1 cycle loads SA REG 36 with the contents of main storage 10 contained at the PCH@ SAR 56 address location. INSERT cycles follow to insert the TDE in priority sequence on the ACQ WAIT LIST. FIG. 18 shows the results of removing the CTDE (TDE1) from the TDQ and inserting TDE1 on the ACQ WAIT LIST.

REMOVE CYCLES: SVX IMPLICIT RECM, REMOVE CRE FROM CTDE, TO SVX INSERT

Figure 19:
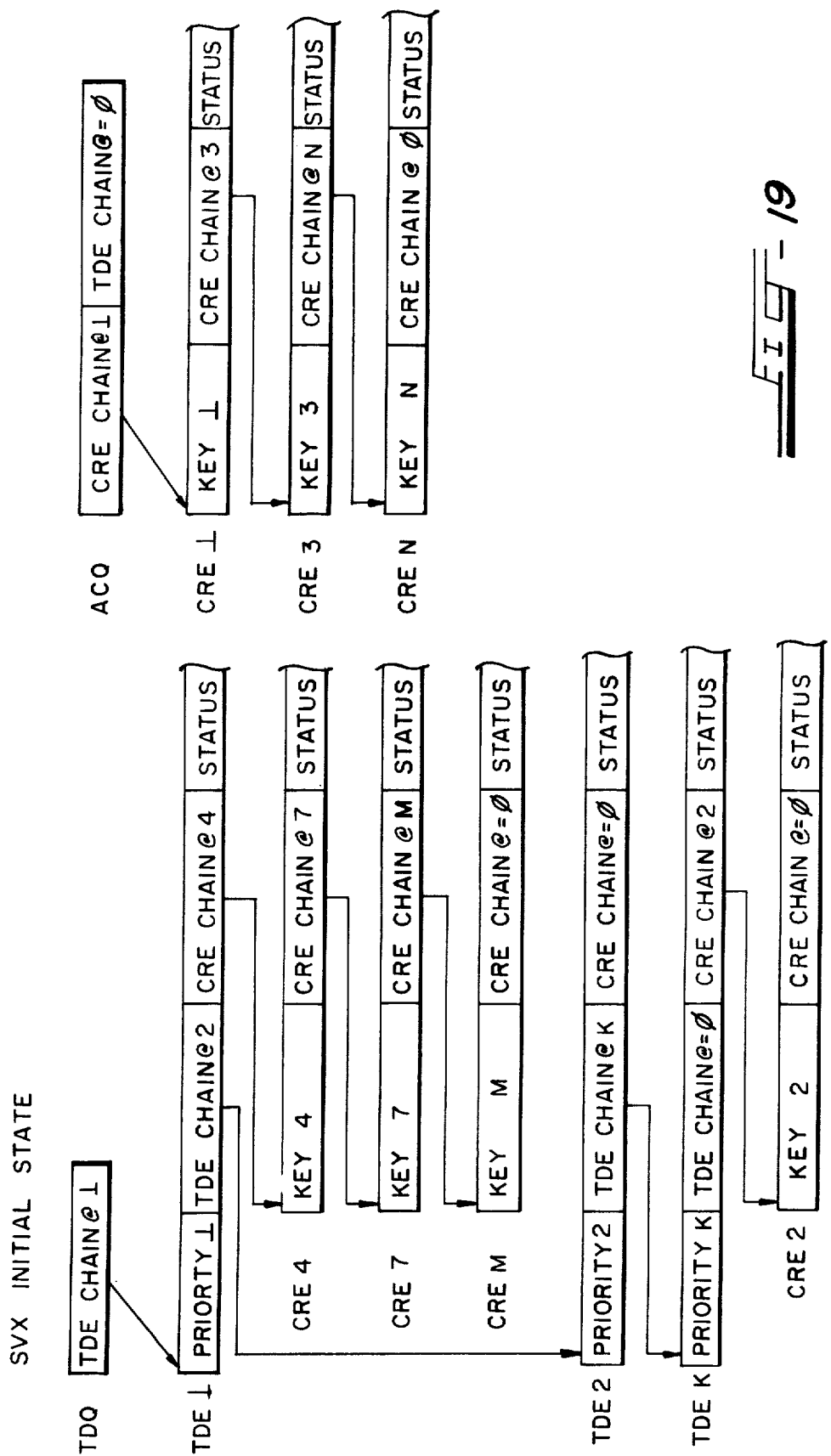
FIG. 19 is a diagram illustrating the machine state immediately prior to encountering an SVX.

REMOVE cycles of the present invention, as shown in FIG. 29, are used in removing a CRE from the CTDE. FIG. 19 illustrates an example of the initial machine state prior to the removal of the CRE from the CTDE. In the situation in which a CRE is being removed from the CTDE, exit from the REMOVE cycles allows entrance to SVX INSERT cycles. REMOVE. The cycles commence via a T2 CPU cycle in which the contents of the SA REG 36 are loaded into CCH@ SAR 57. A dropped-results operation next follows in which the contents of the CCH@ SAR 57 are added to zero and the AZ latch 96 is set according to the results of this operation. A test of the AZ latch 96 is performed. If this test establishes that the latch 96 is in the OFF state; i.e., the dropped-results operation result is not zero, indicating that an available CRE is on the CTDE, an S1 cycle is taken wherein the contents of main storage located at the CCH@ SAR 57 address location are loaded into SA REG 36, incrementing CCH@ SAR 57 by one word. An A1 cycle dropped-results CPU operation is performed. This operation subtracts the value of SB REG 37 from SA REG 36, and the AZ latch 96 is set accordingly. An S1 cycle follows to update the SA REG 36 to the CRE chain address. In this cycle, the SA REG 36 is loaded with the contents of main storage 10 contained at the CCH@ SAR 57 address location, and the CCH@ SAR 57 is decremented by one word.

A decode operation follows thereafter in which AZ latch 96 and ST latch 97 are decoded. In this situation, the results of this decode operation establish that the AZ latch 96 is ON and the ST latch 97 is OFF, i.e. ST V (AZ $\wedge$ $\overline{ST}$), the AZ $\wedge$ $\overline{ST}$ condition satisfied. This operation is identified as CRE-remove. An S2 cycle then stores the contents of SA REG 36 into main storage 10 at the PCH@ SAR 56 address location. The result of this operation is to remove the CRE from the CTDE. A decode operation of the SL latch 93A and the SV latch 93B is performed. The result of this operation establishes that the SL latch 93A is ON, the SVX cycles are beging run, and a test is performed on the SVX op code contained within op-code decoder 41 as applied to the control unit 100. This test indicates that there is an SVX op code in the op-code decoder 41, and SVX INSERT cycles occur. FIG. 20 illustrates CRE4 being removed from TDE1 and the chain list being updated.

REMOVE CYCLES: SVX IMPLICIT SENDM, TO I-FETCH FROM SVX VIA THE REMOVE EXIT OF INSERT; NO WAITING TDE'S

The general REMOVE cycles are also used to exit to I-FETCH when there are no waiting TDE's on the ACQ WAIT LIST. To accomplish this result the REMOVE cycles are entered from the REMOVE exit of INSERT. See FIGS. 29-1, 29-2, 32-1, and 32-2. The cycles commence via a T2 CPU cycle in which the contents of the SA REG 36 are loaded into CCH@ SAR 57. A dropped-results operation next follows in which the contents of the CCH@ SAR 57 are added to zero and the AZ latch 96 is set according to the results of this operation. A test of the AZ latch 96 is performed. This test establishes that the AZ latch in ON, i.e., there are no waiting TDE's, and a decode operation is performed on S latch 87 and R latch 88. Since either the S latch or the R latch is ON, the D latch will be set. Next, a test of the S latch 87 occurs and, since the S Latch 87 is OFF, I-FETCH cycles follow.

INSERT CYCLES: SVL IMPLICIT SENDM; EXIT VIA SVL SAVE

In the event an available CRE has been located on and removed from the ACQ, it is now necessary to load the address of this CRE on the current TDE (CTDE). This operation is performed through an implicit send message (IMPLICIT SENDM) cycle which is initiated by SVL INSERT Cycles.

The purpose of the SVL INSERT cycles is to initialize the parameters to enter the IMPLICIT SENDM which will insert the CRE to CTDE. Initially, a T2 CPU cycle, as shown in FIG. 30 is taken in order to pass the contents of CTDE@ SAR 53 to OP1@ SAR 54. The contents of OP1@ SAR 54 are then added to an emit of emit encoder 60 (through an A2 cycle), and the result is placed into OP1@ SAR 54. The OP1@ SAR 54 now points to the CRE chain address contained in the CTDE. An S1 cycle is performed, and the contents of OP1@ SAR 54 are fetched from main storage 10 location OP1@ SAR 54 and loaded into SA REG 36. As will be appreciated, this latter operation results in the loading of the CRE chain address from the CTDE into SA REG 36. Next, IMPLICIT SENDM cycles are taken, as described below.

IMPLICIT SENDM CYCLES

Prior to inserting the CRE into the current TDE through the SENDM sequence, it is necessary to set the state of certain latches within the computer system. Accordingly, sequence control latches S Latch 87, R latch 88, ST latch 97, and RT latch 98 are set by the control unit 100 to the states summarized in FIG. 31. That is, S latch 87 is set to the ON state, and latches 88, 97, and 98 are set to the OFF state. After the setting of the sequence control latches, the SL latch 93A and SV latch 93B are decoded. In the event that both latches 93A and 93B are in the OFF state, a T2 cycle is taken which sets OP2@ SAR 55 to point to the available CRE. This last function is required for the tasking instructions as described in the above-referenced U.S. Patent Application entitled "Task Handling Apparatus for a Computer System." However, if either of latches 93A or 93B are in the ON state, (SVL or SVX) a T2 cycle is taken in order to load the contents of the current chain address SAR (CCH@ SAR) 57 into OP2@ SAR 55.

In either event, an S1 cycle follows thereafter in which the contents of main storage 10 located at OP2@ SAR 55 are loaded into SB REG 37, and OP2@ SAR 55 is incremented by one word. The result of this S1 cycle is to fetch KEY from the available CRE and to locate the CRE chain address within the format of the available CRE. A T2 cycle then follows in which the contents of OP1@ SAR 54 are placed into PCH@ SAR 56. At this point, the synchronous and conditional program control apparatus of the present invention has been set up so that insertion of the available CRE onto the CTDE may occur.

INSERTION OF THE CRE ONTO THE CTDE

Figure 16:
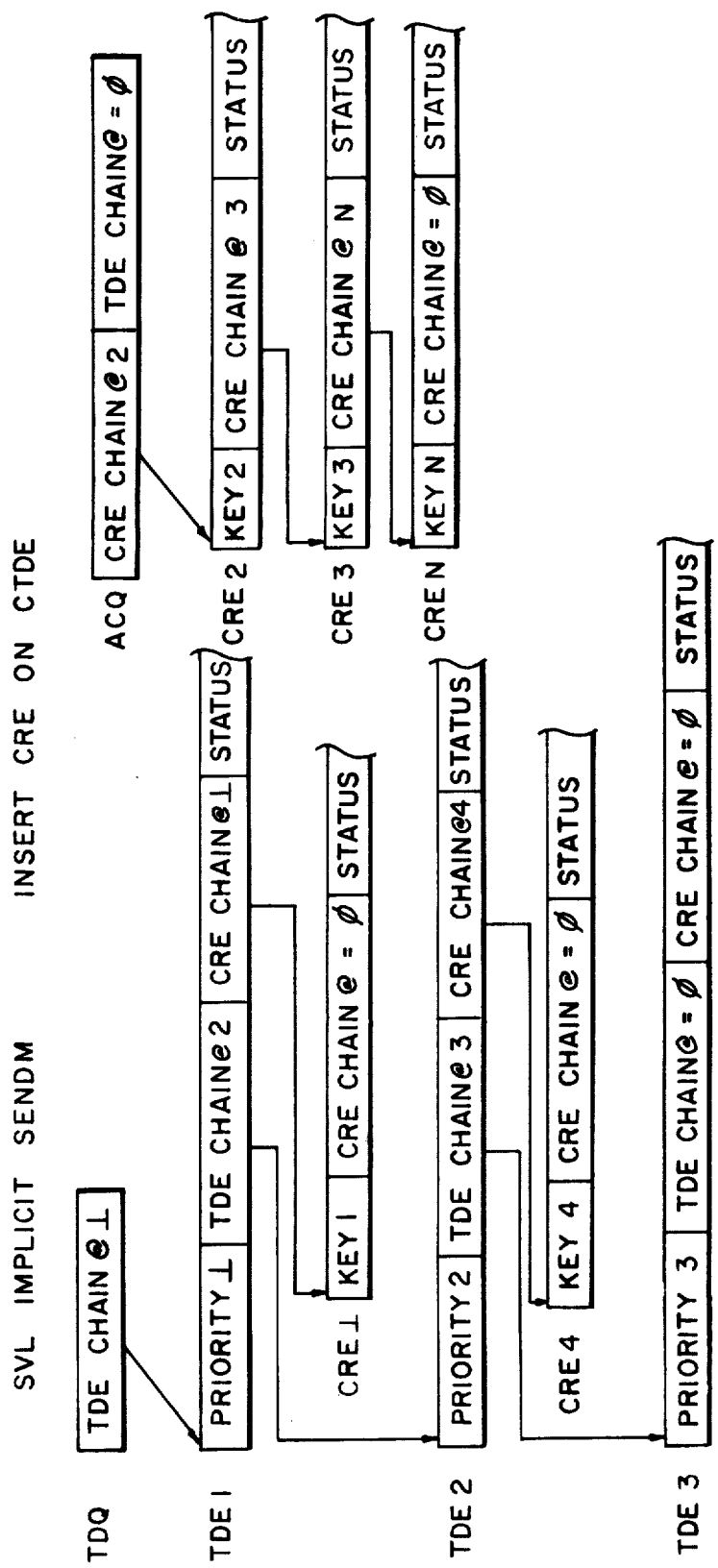
FIG. 16 is a diagram illustrating the results of an IMPLICIT SENDM cycle in which a CRE is inserted on the current TDE.
Figures 1, 32:
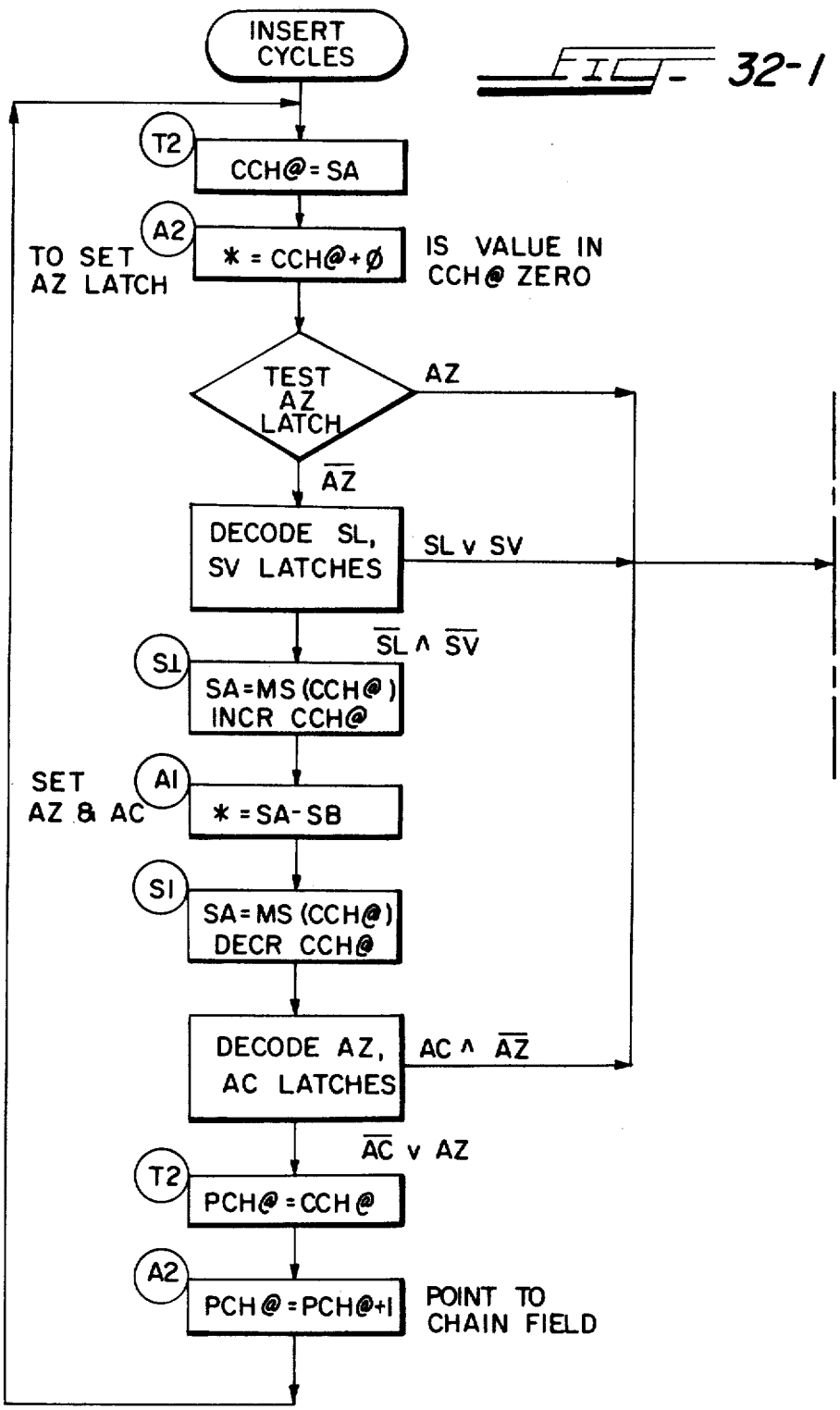
Figures 2, 32:
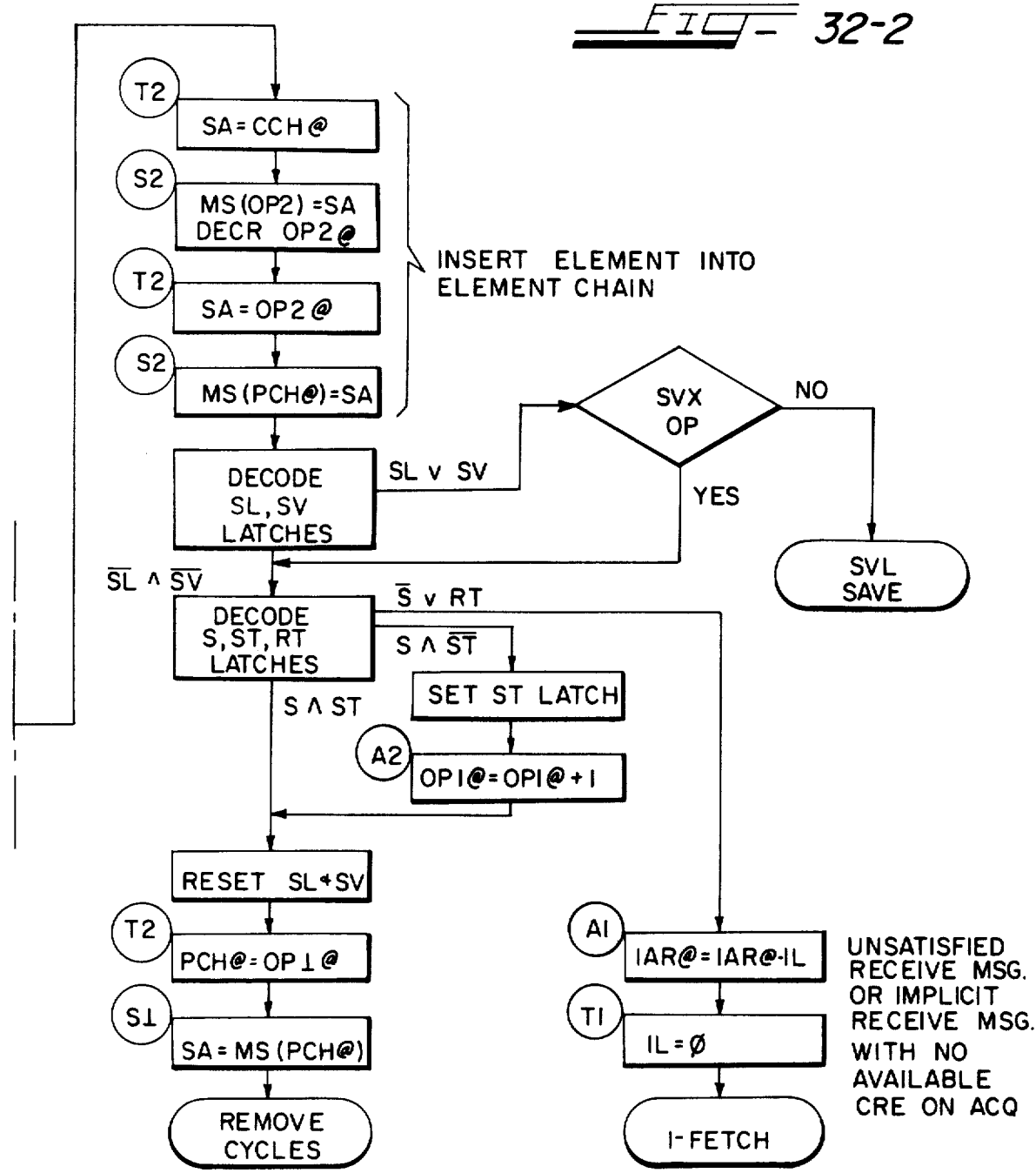
Figure 38:
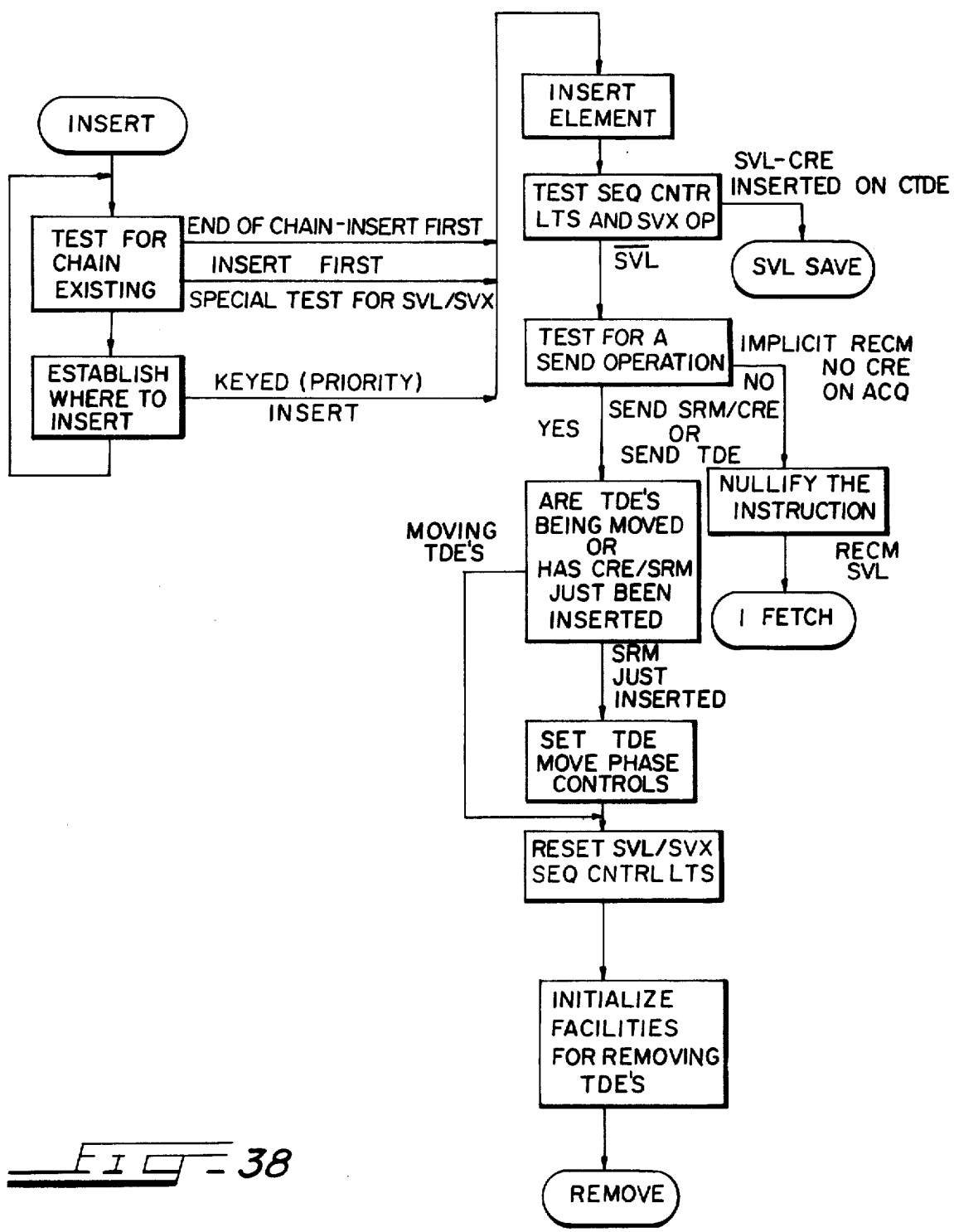
FIG. 38 is an overview flow diagram illustrating the general functions of INSERT and can be used to facilitate understanding FIG. 32-1 and 32-2.

FIG. 15 illustrates the initial state of the TDQ and ACQ, with CRE1 being removed from the ACQ and now available for insertion onto the CTDE. FIG. 16 shows the final state. FIG. 38 is an overview of the functional steps necessary to perform the INSERT function. Insertion of the CRE commences via a T2 cycle, as shown in FIG. 32-1, in which the contents of SA REG 36 (the CRE chain address location of the CTDE) are loaded into CCH@ SAR 57. A dropped-results A2 cycle is performed to add zero to the contents of CCH@ SAR 57 resulting in the setting of AZ latch 96. If the AZ latch was not set by the A2 cycle; i.e., the CCH@ SAR 57 value was zero, then there are no CRE's on the CTDE. If the A2 cycle resets AZ latch 96; i.e., the value of CCH@ SAR 57 is not zero, and SL latch 93A and SV latch 93B are then decoded. Either one or both of these latches are active in this phase of SVL. The decode operation establishes that the SL latch 93A or the SV latch 93B are in the ON state and a T2 cycle is taken wherein the contents of CCH@ SAR 57 are loaded into SA REG 36. Following this, an S2 cycle is performed wherein the contents of SA REG 36 are stored in main storage 10 at the OP2@ SAR 55 address location, and the OP2@ SAR 55 is decremented by one word. The OP2@ SAR 55 contents are then passed to SA REG 36 via a T2 cycle. The contents of SA REG 36 are then stored at the PCH@ SAR 56 address location via an S2 cycle. The sequence of T2, S2, T2, S2 has now inserted the CRE in the first position of the CRE chain on the CDTE. The decode of SL latch 93A and SV latch 93B is then performed. If either the SL 93A or SV 93B latches are in the ON state, the CRE chain@ has been inserted on the CTDE. SVL SAVE cycles are next performed. FIG. 16 shows CRE1 being inserted on the CTDE.

However, if either the SL latch 93A or the SV latch 93B are in the OFF state, S latch 87, ST latch 97, and RT latch 98 are then decoded. As previously mentioned, this decode operation may occur simultaneously with or immediately after the last discussed S2 CPU cycle. In the event that the decode operation establishes that the S latch 87 is in the OFF state or the RT latch 98 is in the ON state, the receive message is unsatisfied, i.e., there are no available CRE's in the ACQ. A task switch, which is fully described in the above-referenced U.S. Patent Application entitled, "Task Handling Apparatus For a Computer System", occurs. However, before this task switch takes place, it is necessary to assure that the SVL instruction of the invoking program can be located whenever the invoking program is task switched back into an execution mode. Accordingly, an A1 cycle is taken wherein IAR@ SAR 51 is loaded with the arithmetic difference of the contents contained in IAR@ SAR 51 and IL REG 38. After this A1 cycle, a T1 cycle is taken and IL REG 38 is forced to a zero value. I-FETCH cycles follow thereafter.

In the event that the last referred to decode operation establishes that both the S latch 87 and the ST latch 97 are in the ON state, a T2 cycle is performed such that the contents of OP1@ SAR 54 are loaded in PCH@ SAR 56. Thereafter, the contents of SA REG 36 are fetched from main storage 10 at the PCH@ SAR 56 address location. REMOVE cycles are now taken.

If, however, the last referred to decode operation establishes that the S latch 87 is in the ON state and the ST latch 97 is in the OFF state, the decode operation sets ST latch 97. Thereafter, an A2 cycle is taken which increments OP1@ SAR 54 by one word. A T2 cycle is performed such that the contents of OP1@ SAR 54 are loaded into PCH@ SAR 56. Thereafter, the contents of SA REG 36 are fetched from main storage at the PCH@ SAR 56 address location. REMOVE cycles are now taken.

As previously mentioned, CRE insert cycles commence through a T2 and an A2 CPU cycle and are followed by a test on AZ latch 96. The SL latch 93A and SV latch 93B are then decoded. Referring to this decode operation (see FIG. 32-1), if the results indicate that both the SL latch 93A and the SV latch 93B are in the OFF state, then the SA REG 36 is loaded with the contents of main storage 10 contained at the CCH@ SAR 57 address location, and the CCH@ SAR 57 is incremented by one word. Thereafter, a dropped-results operation is performed in which the contents of the SB REG 37 are subtracted from the contents of the SA REG 36. As will be appreciated, this operation, which occurs simultaneously with the AZ latch 96 test or immediately prior to the next sequential operation, acts to set the AZ latch 96 and the AC latch 95. The setting of these latches is performed via an A1 CPU cycle. Thereafter, an S1 cycle is taken wherein SA REG 36 is loaded with the information contained in main storage 10 at the CCH@ SAR 57 address location, and the CCH@ SAR 57 is decremented by one word. Simultaneously with this last described S1 cycle or immediately prior to the next operation, the AZ latch 96 and the AC latch 95 are decoded. If the AC latch 95 is in the OFF state, or the AZ latch 96 is in the ON state, then the contents of CCH@ SAR 57 are loaded into PCH@ SAR 56. The PCH@ SAR 56 is incremented by one word thereby causing the PCH@ SAR 56 to point to the CRE chain address field contained within the active CRE. A loop is entered as indicated on FIG. 32-1. The operations in this loop continue until one of three possible exit situations arise. The first and second possible exit situations have been previously described: the first exit occurs when a test of the AZ latch 96 establishes that this latch setting was zero, and the second exit situation occurs when the decode of the SL latch 93A or the SV latch 93B indicates that they are in the ON state. The third possible means for exiting this loop occurs when the decode of the AZ latch 96 and AC latch 95 establishes that the AC latch 95 is in the ON state and the AZ latch 96 is in the OFF state.

SVL SAVE CYCLES

At the completion of the above described cycles, the CRE@ is locatable in main storage 10 at the OP2@ SAR 55 address location. An A2 cycle (see FIGS. 33-1 and 33-2) is taken next which adds the contents of OP2@ SAR 55 to data from the emit encoder 60 and loads the result into OP2@ SAR 55 in order to generate the address of the status save means within the CRE. A T2 cycle follows during which the contents of IAR@ SAR 51 are loaded in SA REG 36 with the contents of this latter register thereafter stored, via an S2 cycle, in main storage 10 at the OP2@ SAR 55 address location to store the invoking program IAR in the CRE status save means. Simultaneously with accessing main storage 10 via the S2 cycle, the OP2@ SAR 55 is incremented by one through incrementer 59. An S1 cycle is performed next which addresses main storage 10 using the FCM@ SAR 58E, with the contents of this register applied to SB REG 37. Concurrently with this operation, the FCM@ SAR 58E is incremented by one through the incrementer 59.

Up to this point, the first three data field elements of the FCM (see FIG. 3) have been loaded into SB REG 37. A T3 cycle is taken next which places the contents of SB REG 37 into P REG 90 and L REG 66. As used in the exemplary processor control apparatus described herein, the P REG 90 contains the second data field of the FCM, i.e., the first register save value, and the L REG 66 contains the third data field of the FCM, i.e., the number of registers to be saved. It is advantageous in the practice of the present invention to assemble the condition code and instruction length of the invoking program and the second and third formatted data fields of the FCM on a one word register. Accordingly, a T2 cycle is taken where the contents of P REG 90 and L REG 66 are loaded in SA REG 36, and then a T3 cycle is performed to load the condition code and instruction length of the invoking program in the SA REG 36. The condition code is obtained from CC latch 65, and the instruction length is obtained from IL REG 38. Thereafter, an S2 CPU cycle is taken wherein the contents of SA REG 36 are loaded in main storage 10 at the OP2@ SAR 55 address location. The OP2@ SAR 55 is incremented by one through incrementer 59, and a T2 cycle is performed in which the contents of P REG 90 are used by the base pointer register ("BPR") to point to an identifiable base register of the base register array 70. The contents of the identified base register are loaded into SA REG 36, P REG 90 is incremented by one, L REG 66 is decremented by one, and an S2 cycle is taken which stores the contents of SA REG 36 into main storage at the OP2@ SAR 55 address location. OP2@ SAR 55 is then incremented by one word. A zero test is performed via zero detect 67 on the L REG 66. Successive T2 and S2 cycles are taken until the L REG 66 has been decremented to zero. It should be noted in this implementation that L REG 66 does not decrement through zero.

Figures 1, 33:
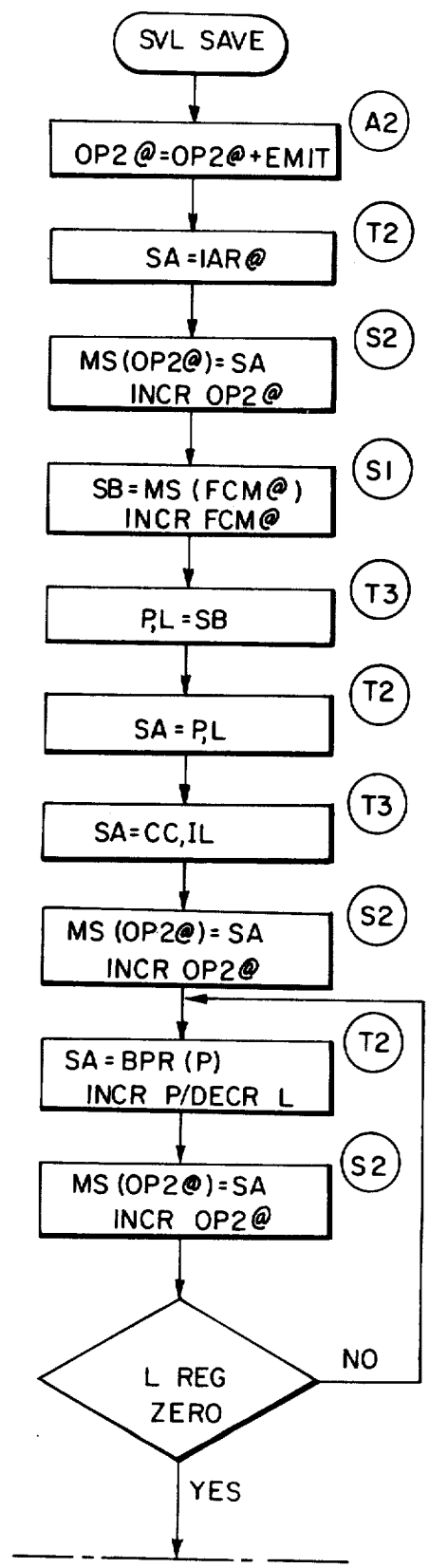
Figures 2, 33:
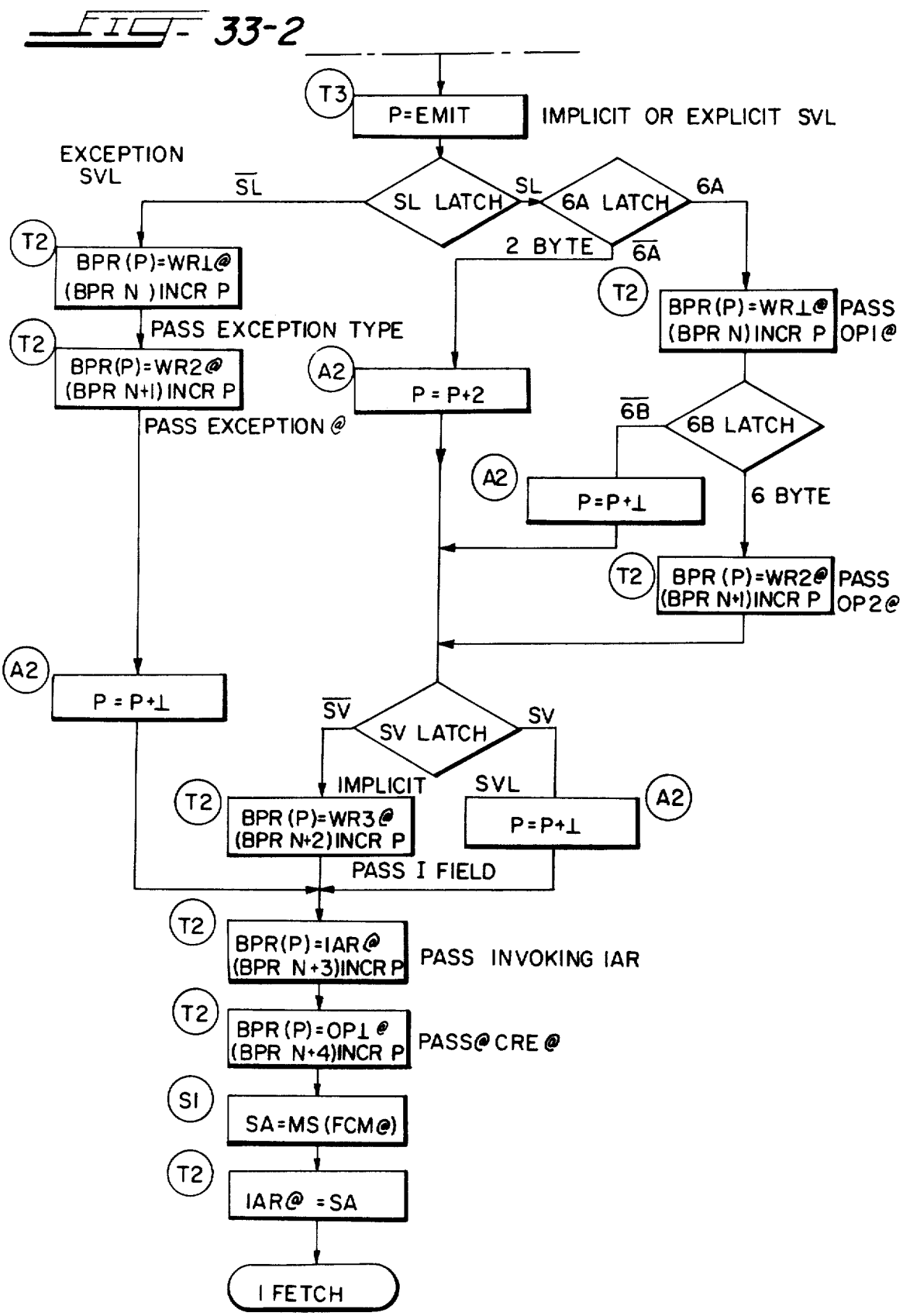

The SVL cycles continue by passing parameters generated in the I-FETCH cycle in order to initialize the invoked program (see FIG. 33). FIG. 14C summarizes the different types of parameters passed to the invoked program. In order to pass parameters to the base register array 70 the P REG 90 must again be set to a known value This is accomplished by a T3 cycle. A test on the SL latch 93A is then performed. If the SL latch 93A is ON, the SVL instruction encountered must be either an IMPLICIT SVL or an EXPLICIT SVL, as shown by the sequential control latch settings of FIG. 14A. With the SL latch 93A in the ON state, a test is performed on 6 A latch 92A to identify the length of the SVL instruction. A negative result of this test (i.e., 6 A latch 92A is OFF), indicates that the SVL instruction length is 2 bytes (see FIG. 14B). On the other hand, if the 6 A latch 92A is ON, a T2 cycle is taken wherein the WR1@ SAR is loaded onto a base point register, which register is identified herein as BPR(P)=BPRN. For this example, in FIG. 33, the BPR(P)=BPRN, and, as P REG 90 is incremented, the value of N is advanced one. It will be appreciated that the result of this T2 cycle is to pass the OP1@ SAR, which was previously stored in WR1@ SAR, to BPRN and to increment P REG 90 by one.

Following this cycle a test of 6 B latch 92B is performed. If the results of this test indicate that the 6 B latch 92B is in the OFF state (see FIG. 14B), an SVL instruction length of 4 bytes is indicated. With the 6 B latch 92B in the ON state, thereby indicating a 6-byte SVL, a T2 CPU cycle is taken. This cycle passes the OP2@ SAR, which had previously been stored in WR2@ SAR, to BPRN+1 and P REG 90 is incremented.

At the conclusion of the above-described tests on the 6 A latch 92A and the 6 B latch 92B, a test is performed on the SV latch 93B. If this test is negative (i.e., the SV latch 93 B is OFF), the SVL encountered in the invoking program must be an IMPLICIT SVL (see FIG. 14A). In this instance, a T2 cycle is taken wherein the I-field contained within WR3@ SAR 58D is loaded onto a base point register herein identified as BPRN+2 and P REG 90 is incremented.

In the event that the test performed on the SV latch 93B indicates that that latch is in the ON state, a T2 cycle is taken to load the contents of IAR@ SAR 51 into a base pointer register identified herein as BPRN+3. The result of this cycle is to pass the instruction address register address of the invoking program into a base point register accessible to the invoked program. Following this cycle, the CRE chain address is loaded into a base point register by passing the contents of OP1@ SAR 54 into BPRN+4 through a T2 cycle and P REG 90 is incremented. An S1 cycle is then taken to load SA REG 36 with the information contained from main storage 10 at the FMC@ location; i.e., the invoked program instruction address register address is loaded into SA REG 36. The contents of SA REG 36 are transferred to IAR@ SAR 51 via a T2 cycle, and I-FETCH cycles commence.

The alternative legs of the 6 A latch 92A being OFF, the 6 B latch 92B being OFF, and SV latch 93B being OFF indicate conditions where the corresponding parameters just described are passed as summarized in FIG. 14C. It will also be appreciated that the P REG 90 must be incremented to keep the corrected BPR correspondence to the aforementioned 6-byte example.

As previously mentioned, the test was performed on SL latch 93A in order to identify the type of SVL instruction encountered in the invoking program. The last-described operational flow results from the SL latch 93A being in ON state. However, in the event that the SL latch 93A test indicates that this latch is in the OFF state, the SVL encountered in the invoking program must be an EXCEPTION SVL (see FIG. 14A). Thus, for an EXCEPTION SVL, a T2 cycle is taken wherein the contents of WR1@ SAR 58B are loaded into a base point register identified herein as BPRN in order to pass the exception type and P REG 90 is incremented. Thereafter, WR2@ SAR 58C is loaded into BPRN+1 (and P REG 90 is incremented) in order to pass the exception address. The P REG 90 is again incremented to maintain correspondence with the non-EXCEPTION SVL case. The remaining parameters IAR SAR 51 and OP1@ SAR 54 are passed to the appropriate BPR's as previously described. Upon completion of the last T2 cycle, control is passed to I-FETCH, and the first instruction of the invoked program begins execution.

This completes the description of the SVL instruction implementation.

SVX OVERVIEW

The result of the SVX operation is to return processor control to the invoking program at the completion of the invoked program. The SVX operation utilizes cycles which are shared with those cycles previously described for SVL. SVX includes the following shared cycles: I-FETCH, which decodes the SVX instruction and sets up the appropriate parameters for SVX cycles (see FIGS. 26-1 and 26-2); IMPLICIT RECM (see FIG. 28) which sets up parameters for REMOVE cycles; REMOVE cycles (see FIGS. 29-1 and 29-2) which removes the CRE from the CTDE; and IMPLICIT SENDM (see FIG. 31) which sets up parameters for INSERT cycles; INSERT (see FIGS. 32-1 and 32-2) which inserts the CRE on the ACQ, sets up parameters to remove any TDE's from the ACQ WAIT LIST, removes the waiting TDE's in the sequence they are encountered on the ACQ WAIT LIST, and inserts the removed TDE's in priority sequence onto the TDQ.

Figures 1, 35:
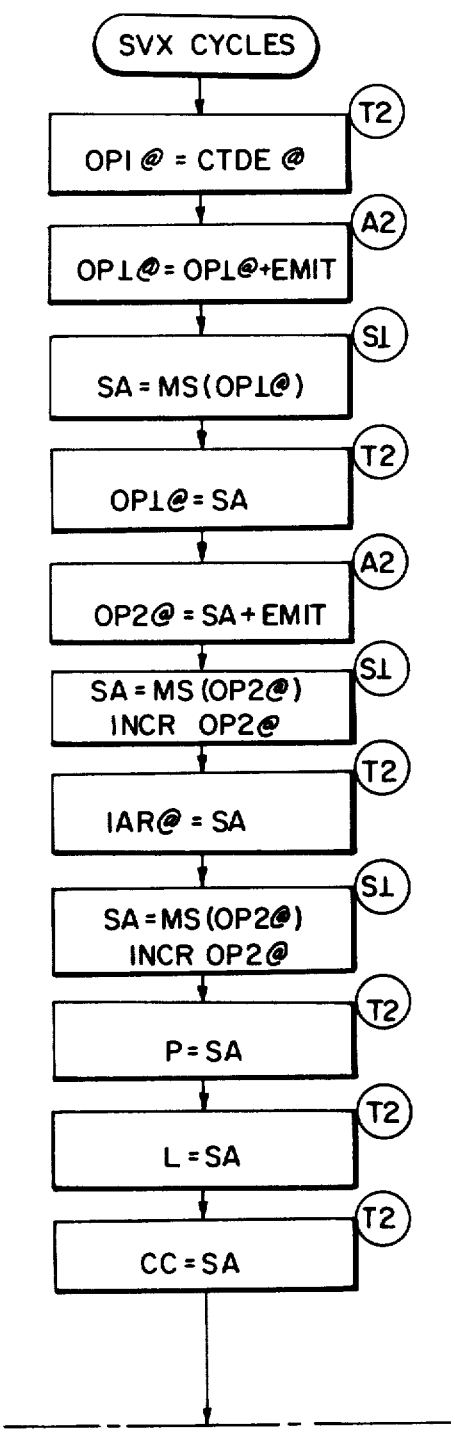
Figures 2, 35:
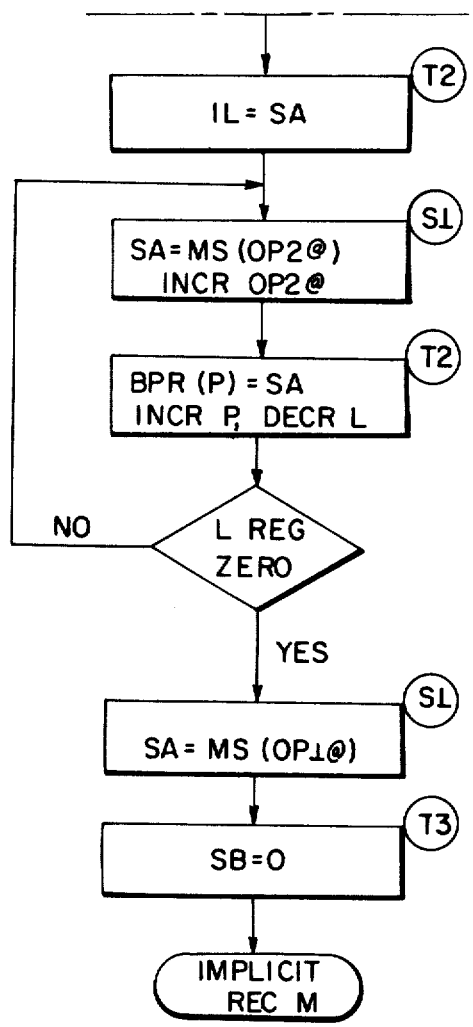
Figure 36:
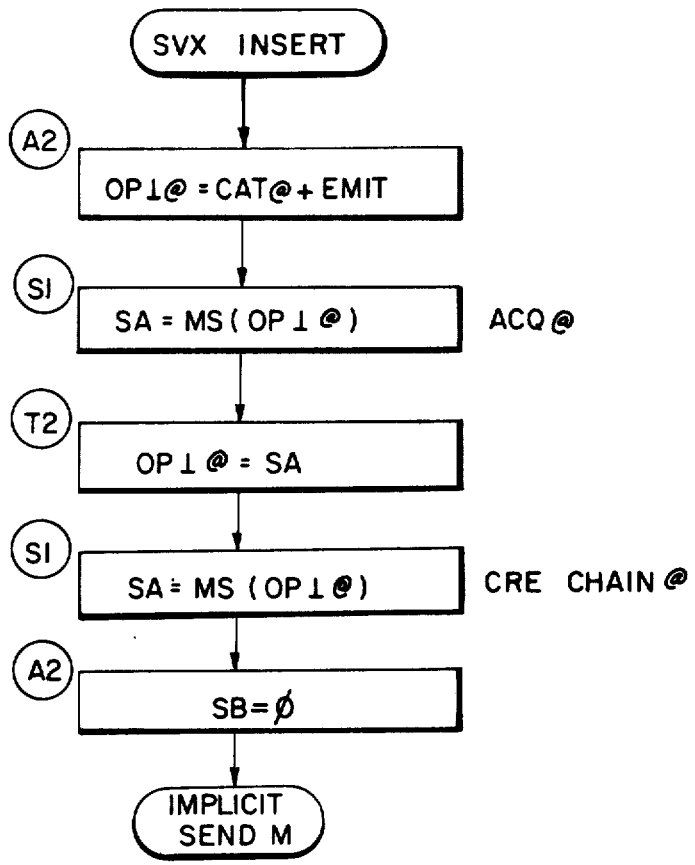
FIG. 36 is a flow diagram illustrating SVX INSERT cycles to set up parameters to send CRE to ACQ.

Cycles which are dedicated to SVX include: (a) SVX CYCLES (see FIG. 35-1 and V 35-2), which passes parameters back to the invoking program; and (b) SVX INSERT (see FIG. 36), which sets up parameters for insertion of the CRE on the ACQ.

Figure 34:
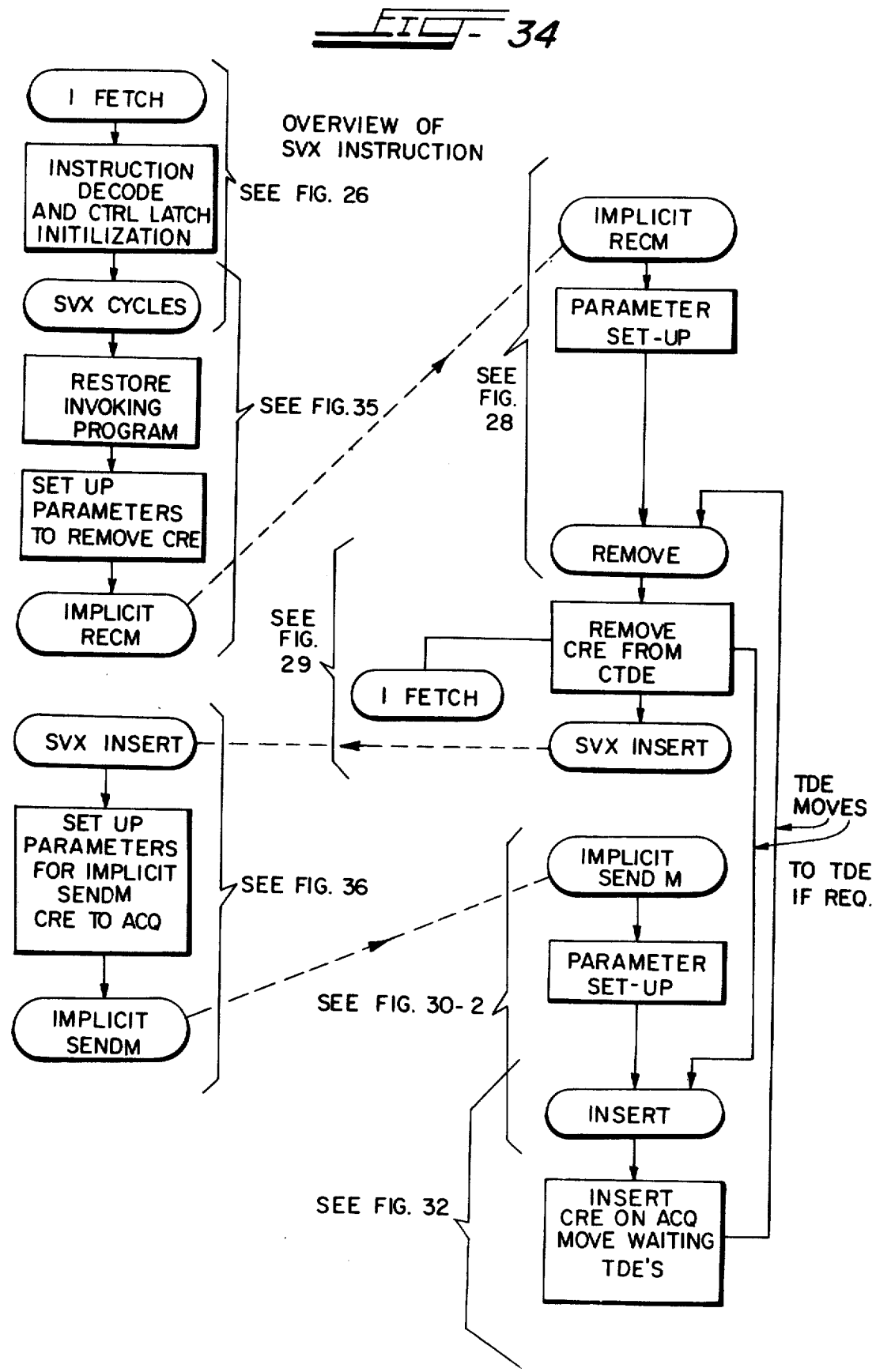
FIG. 34 depicts an overview of the SVX cycles of the present invention illustrating the signal flow of the various cycles to restore the invoking program, remove the CRE from the CTDE and insert the CRE on the ACQ; also shown is the relationship between INSERT and REMOVE to move any waiting TDE's to the TDQ.

As shown in FIG. 34, the SVX operation may be thought of as occurring in the following steps: (a) SVX INSTRUCTION encountered in the invoked program; (b) I-FETCH; (c) SVX CYCLES; (d) IMPLICIT RECM; (e) REMOVE; (f) SVX INSERT; (g) IMPLICIT SENDM; (h) INSERT; and (e) REMOVE where control is returned to I-FETCH. It will be appreciated that, in REMOVE step (e), if there are any TDE's on the ACQ WAIT LIST, REMOVE step (e) will remove the TDE's one at a time from the ACQ, and INSERT step (h) will insert them in priority sequence on the TDQ. REMOVE step (e) and INSERT step (h) are repeated until the ACQ WAIT LIST is empty. REMOVE step (e) then returns control to I-FETCH.

Since steps (b), (d), (e), (g), and (h), above, have been previously described either with specific reference to SVX cycles or in conjunction with SVL cycles, it is only necessary to describe SVX I-FETCH CYCLES, SVX CYCLES and SVX INSERT cycles.

SVX I-FETCH Cycles

Referring now to FIGS. 26-1 and 26-2, the SVX I-FETCH cycle, which sets parameters for subsequent execution, is shown. Initially, D latch 93 and I/O latch 94 are decoded by the control unit 100, and, in the event that I/O latch 94 is ON, I/O event cycles are taken. If, however, D latch 93 is ON and I/O latch 94 is OFF, dispatch cycles are taken. I/O cycles and dispatch cycles are fully set forth in the above-referenced U.S. Patent Application entitled "Task Handling Apparatus For a Computer System."

If the decode operation establishes that both D latch 93 and I/O latch 94 are OFF, an instruction decode cycle commences, and sequential control latches SL 93A and SV 93B are set according to FIG. 14A. Additionally, 6 A latch 92A and 6 B latch 92B are set or reset depending on the instruction length as shown in FIG. 14B. SVX is a two byte instruction, hence 6 A latch 92A and 6 B latch 92B will reset per FIG. 14B. As will be appreciated, prior to setting the latches 92A and 92B, their state is of no immediate concern. Accordingly, in setting these latches, it is only necessary to set/reset, i.e., to force, the latches to an appropriate state depending upon the length of the instruction.

After the latches 92A and 92B are set/reset, a T1 CPU cycle is taken to sample the value of the latches 92A and 92B and to place their respective values in IL REG 38. A test of the SL latch 93A is then performed, and, since the latch 93A has been set ON, an A1 cycle is taken. Through an A1 cycle, as previously described, the value of the IAR@ SAR 51 is placed in A-bus assembler 39 via bus 32, and the instruction length value is taken from the IL REG 38 and placed on the B-bus assembler 62. At the completion of this operation, the updated IAR@ SAR 51 points to the next sequential instruction of the invoking program. Thereafter, a T2 cycle is taken to load the instruction I-field value from the IS REG 35 onto the P REG 90. A test is again performed on the 6 A latch 92A. Since the 6 A latch 92A is in the OFF state (see FIG. 14B), SVX execution cycles commmence as established by the op-code decoder 41 and control unit 100.

SVX CYCLES

The purpose of the SVX instruction (refer to FIGS. 19 through 24) is (a) restoring processor control to the invoking program; (b) removing the active CRE from the CTDE chain; and (c) inserting the CRE on the ACQ and moving TDE's on the ACQ WAIT LIST to the TDQ. SVX CYCLES (see FIGS. 35-1 and 35-2) commence through a T2 CPU cycle which results in the CTDE@ SAR 53 being loaded in the OP1@ SAR 54. In order to move the pointer to the address of the CRE chain@ (see FIG. 19), an A2 cycle is taken in which the contents of OP1@ SAR 54 are added to an emitted value from emit encoder 60, which is operating under control of control unit 100. The result of this addition is loaded into OP1@ SAR 54. An S1 cycle is taken such that SA REG 36 is loaded with the contents of main storage 10 contained at the OP1@ SAR 54 address location. The contents of SA REG 36 are next loaded into OP1@ SAR 54 via a T2 cycle; OP1@ SAR 54 now points to the address of the CRE chain@. Through an A2 cycle, the contents of SA REG 36 are added to an emitted value from the emit encoder 60 causing the pointer to now point to the address of the beginning of the CRE status field. An S1 cycle loads SA REG 36 with the contents of main storage 10 found in the OP2@ SAR 55 address location, and the OP2@ SAR 55 is incremented by one word. The result of this operation is to fetch the first data field of the CRE, e.g., to fetch one or more data bytes of the CRE status field. In the example now under consideration, this information is the invoking instruction address register. After this S1 cycle, a T2 cycle loads IAR@ SAR 51 with the contents of SA REG 36 in order to restore the invoking program IAR. An S1 cycle follows in which the SA REG 36 is loaded with the contents of main storage contained in the OP2@ SAR 55 address location, and OP2@ SAR 55 is incremented by one word. As will be appreciated, control and/or status parameters (P, L, CC, IL) have now been fetched from main storage 10.

Four sequential T2 cycles are taken in which the contents of SA REG 36 are loaded into P REG 90, L REG 66, CC latch 65, and IL REG 38. The contents of the first BPR are fetched via an S1 cycle in which the SA REG 36 is loaded with the contents of main storage 10 located at the OP2@ SAR 55 address location; OP2@ SAR 55 is incremented by one word. A T2 cycle is performed wherein the contents of P REG 90 are used to locate a BPR within base register array 70, and the contents of SA REG 36 are loaded into this BPR. Additionally, in this T2 cycle, P REG 90 is incremented by one word, and L REG 66 is decremented by one word. As will be appreciated by one skilled in the art, during incrementation of P REG 90, the P REG 90 will wrap around zero, whereas, during decrementation, the L REG 66 will not wrap, i.e., once L REG 66 is decremented to zero it will remain at zero. Thus, if a zero test is performed on L REG 66 through zero detect 67, the L REG 66 will continue to be decremented until it has reached a zero value at which time an S1 cycle is performed. This cycle loads SA REG 36 with the contents of main storage 10 contained at the OP1@ SAR 54 address location. SA REG 36 now contains the CRE chain@. A T3 cycle thereafter follows, and SB REG 37 is set equal to zero.

At this point, parameters which are needed in order to remove the CRE from the CTDE have been established. The CRE is removed from the CTDE via an IMPLICIT RECM cycle and REMOVE cycle which have been fully described above (see FIG. 28 and FIGS. 29-1 and 29-2). As noted in FIGS. 29-1 and 29-2, and particularly FIG. 29-2, one branch of the REMOVE cycle exits to SVX INSERT whenever a test on the SVX OP CODE is positive.

SVX INSERT

The purpose of the SVX INSERT cycles is to establish parameters for an IMPLICIT SENDM and INSERT to place the CRE on the ACQ. This is accomplished by first taking an A2 cycle in which the OP1@ SAR 54 is loaded with the summed values of CAT@ SAR 58A and an emitted value from the emit encoder 60; i.e., OP1@ SAR 54 contains the address of the ACQ@ which is in a known location of the CAT 606. An S1 cycle is taken next, and the SA REG 36 is loaded with the contents of main storage 10 contained at the OP1@ SAR 54 address location. SA REG 36 is loaded into OP1@ SAR 54 through a T2 cycle. OP1@ SAR 54 now contains the ACQ@. Another S1 cycle is taken and the contents of main storage 10 contained at the OP1@ SAR 54 address location is loaded into the SA REG 36. Accordingly, SA REG 36 contains the CRE chain address. An A2 cycle follows in which SB REG 37 is forced to a value of zero. IMPLICIT SENDM cycles (see FIG. 30), as fully described above, are taken which, in the SVX cycle now under consideration, sets up the parameters to insert the CRE on the ACQ. INSERT cycles (see FIG. 32) are then taken to insert the CRE on the ACQ, at which time parameters are set to test for any waiting TDE's on the ACQ WAIT LIST. Control is transferred to REMOVE cycles, which exits to I-FETCH in one of two cases described below.

In case (a), when the REMOVE cycle is entered and the AZ latch 96 test establishes that the AZ latch 96 is ON, thus indicating no waiting TDE's on the ACQ WAIT LIST, the REMOVE cycle exits through I-FETCH. As previously mentioned, after I-FETCH is entered, D latch 93 is decoded. Since the D latch 93 has been set ON prior to exiting REMOVE, dispatch cycles are taken. The dispatch cycles compare the CTDE@ SAR 53 to the TDE chain@ of the TDQ. This comparison is equal, since there were no waiting TDE's on the ACQ WAIT LIST. Processor control transfers to the invoking program and execution commences at the next sequential instruction after the SVL.

In case (b), when the REMOVE cycle is entered and the AZ latch 96 test establishes that the AZ latch is OFF, this indicates there are one or more waiting TDE's on the ACQ WAIT LIST. These TDE's are removed from the ACQ WAIT LIST one at a time and inserted on the TDQ through a sequence of REMOVE and INSERT cycles. This sequence continues until such time as the AZ latch 96 test in REMOVE establishes that the AZ latch 96 is ON, indicating that the ACQ WAIT LIST is now empty. The REMOVE cycle is exited through I-FETCH. As previously mentioned, after I-FETCH is entered, D latch 93 is decoded. Since the D latch 93 has been set ON prior to exiting REMOVE, dispatch cycles are taken. The dispatch cycles compare the CTDE@ SAR 53 to the TDE chain@ of the TDQ. If this comparison is equal, the invoking program commences execution at the next sequential instruction after the SVL. If the comparison is not equal, a TDE of higher priority than the invoking program has been inserted on the TDQ and a task switch occurs. This task switch is fully described in the above-described U.S. Patent Application entitled "Task Handling Apparatus For A Computer System."

With the foregoing description, the present invention has been described in detail. In particular, the synchronous and conditional control of programs has been set forth with reference to an exemplary computer system and representative hardware components thereof. As one skilled in the art will appreciate, modifications and changes to the computer system and hardware components may be made while still falling within the scope and spirit of the present invention. Accordingly, all such modifications and changes are deemed to fall within the present invention.

Furthermore, while the present invention has been described with reference to one invoking program and one invoked program, it should be realized that the invoked program may itself contain an SVL instruction which transfers processor control from the first invoked program to a second invoked program. The second invoked program may also contain an SVL to transfer control to a third invoked program, etc. Return of processor control occurs, as expected, in the reverse order; that is, if, for example, when the third invoked program encounters an SVX instruction, processor control is transferred to the second invoked program. That program then executes until another SVL or an SVX instruction is encountered, at which time processor control is transferred according to the encountered instruction. All such possible situations fall within the intent and scope of the present invention.

We claim:

1. Synchronous program control apparatus for a processor of a computer system for transferring control of the processor from an invoking program to an entry point of an invoked program and back, comprising:

transfer initiation means for selectively locating a function control means of a function control array, with the entry point of the invoked program being determined by said function control means;

status save means conditionally obtainable by said transfer initiation means to save the status of the invoking program;

initialization means for initializing the invoked program to pre-selectable, locatable parameters of the invoking program; and transfer return means to return processor control from the invoked program to the invoking program at the completion of the invoked program, whereby the invoking program is modifiable to pre-selectable, locatable parameters of the invoked program and said status save means is conditionally releasable.

2. The program control apparatus of claim 1, wherein the invoking program is locatable on a prioritized task dispatching element of a task queue register means.

3. The program control apparatus of claim 2, wherein said transfer initiation means includes a receive means for removing a call return element from an available queue register means.

4. The program control apparatus of claim 3, further comprising a send means for inserting at least one call return element onto said prioritized task dispatching element.

5. The program control apparatus of claim 3, wherein said available queue register means is in main storage of said computer system.

6. The processor control apparatus of claim 2, wherein the transfer of the processor by said transfer initiation means is conditionally responsive to said function control means.

7. The program control apparatus of claim 1, wherein said status save means comprises:

available queue register means; and at least one call return element addressable by said available queue register means when said call return element is available, with said call return element being selectively insertable with pre-selectable, locatable data for identifying one or more parameters of the invoking program.

8. The program control apparatus of claim 7, wherein at least one call return element is rendered unavailable when said pre-selectable, locatable data is inserted thereon.

9. The program control apparatus of claim 7, wherein said available queue register means is in main storage of said computer system.

10. The processor control apparatus of claim 9, wherein the transfer of the processor by said transfer initiation means is conditionally responsive to said function control means.

11. The program control apparatus of claim 7, further including an available queue waiting register means for removing the status of the invoking program from said available queue register means and inserting the status of the invoking program onto said available queue waiting register means when said call return element is unavailable.

12. The processor control apparatus of claim 7, wherein the transfer of the processor by said transfer initiation means is conditionally responsive to said function control means.

13. The processor control apparatus of claim 1, wherein the transfer of the processor by said transfer initiation means is conditionally responsive to said function control means.

14. Synchronous program control apparatus for a processor of a computer system for transferring control of the processor from an invoking program to an entry point of an invoked program and back, comprising:

transfer initiation means for selectively locating a function control means of a function control array, with the entry point of the invoked program being determined by said function control means;

status save means conditionally obtainable by said transfer initiation means to save the status of the invoking program, said status save means including an available queue register means and at least one call return element addressable by said available queue register means when said call return element is available;

initialization means for initializing the invoked program to pre-selectable, locatable parameters of the invoking program;

available queue waiting register means for removing the status of the invoking program from said available queue register means and inserting the status of the invoking program onto said available queue waiting register means when said call return element is unavailable; and transfer return means to return processor control from the invoked program to the invoking program at the completion of the invoked program, whereby the invoking program is modifiable to pre-selectable, locatable parameters of the invoked program and said status save means is conditionally releasable.

15. The program control apparatus of claim 14, wherein said available queue waiting register means further includes means for removing the state of the invoking program from said available queue waiting register means and inserting said state onto said available queue register means when said call return element is available.

16. The program control apparatus of claim 14, wherein the invoking program is locatable on a prioritized task dispatching element of a task queue register means.

17. The program control apparatus of claim 14, wherein at least one call return element is rendered unavailable when said pre-selectable, locatable data is inserted thereon.

18. The program control apparatus of claim 14, wherein said available queue register means is in main storage of said computer system.

19. The program control apparatus of claim 18, wherein the initiation of transfer of processor control by said transfer initiation means is conditionally responsive to said function control means.

20. The program control apparatus of claim 14, wherein said transfer initiation means includes a receive means for removing a call return element from an available queue register means.

21. The program control apparatus of claim 20, further comprising a send means for inserting at least one call return element onto said prioritized task dispatching element.

22. The program control apparatus of claim 14, wherein initiation of the transfer of processor control by said transfer initiation means is conditionally responsive to said function control means.

23. The program control apparatus of claim 22, wherein the initiation of transfer of processor control by said transfer initiation means is conditionally responsive to said function control means.

24. In a processor of a computor system having main storage for storing data and instructions, a storage access control mechanism for accessing main storage, a central processing unit (CPU) interconnected with said main storage, and said storage access control mechanism providing signals to said storage access control mechanism and operable to execute said instructions accessed from said main storage, and to transfer data to and from said main storage, and input/output (I/O) devices connected to said CPU to perform I/O functions, the improvement being a synchronous program control apparatus for transferring processor control from an invoking program to an invoked program and back comprising:
 transfer initiation means for selectively locating a function control means of a function control array, with the entry point of the invoked program being determined by said function control means;
 status save means conditionally obtainable by said transfer initiation means to save the status of the invoking program, said status save means including an available queue register means and at least one call return element addressable by said available queue register means when said call return element is available;
 initiation means for initializing the status of the invoked program to pre-selectable, locatable parameters of the invoking program;
 available queue waiting register means for removing the invoking program from said queue register means and inserting the status of the invoking program onto said available queue waiting register means when said call return element is unavailable; and
 transfer return means to return processor control from the invoked program to the invoking program at the completion of the invoked program whereby the invoking program is modifiable to pre-selectable, locatable parameters of the invoked program and said status save means is conditionally releasable.

25. The program control apparatus of claim 24, wherein said available queue waiting register means further includes means for removing the state of the invoking program from said available queue waiting register means and inserting said state onto said available queue register means when said call return element is available.

26. The program control apparatus of claim 25, wherein at least one call return element is rendered unavailable when said pre-selectable locatable data is inserted thereon.

27. The program control apparatus of claim 24, wherein the invoking program is locatable on a prioritized task dispatching element of a task queue register means.

28. The program control apparatus of claim 24, wherein said queue register means is in main storage of said computer system.

29. The program control apparatus of claim 24, wherein said transfer initiation means includes a receive means removing a call return element from an available queue register means.

30. The program control apparatus of claim 29, wherein the initiation of transfer of processor control by said transfer initiation means is conditionally responsive to said function control means.

31. The program control apparatus of claim 24, further comprising a send means for inserting at least one call return element onto said prioritized task dispatching element.

32. The program control apparatus of claim 14, wherein the initiation of transfer of processor control by said transfer initiation means is conditionally responsive to said function control means.

33. The program control apparatus of claim 32, wherein the initiation of transfer of processor control by said transfer initiation means is conditionally responsive to said function control means.

34. The apparatus according to claim 1, 14, or 24, wherein said transfer initiation means includes a supervisor link element comprising an operation code field and at least one information field.

35. The apparatus according to claim 34 wherein transfer of processor control from the invoking program to the invoked program is selectively dependent upon the results of a decode of said operation code field.

36. The apparatus of claim 34 wherein transfer of processor control from the invoking program to the invoked program is selectively dependent upon results of a decode of said information field.

37. The apparatus of claim 34 wherein transfer of processor control from the invoking program to the invoked program is selectively dependent upon pre-assigned values being inserted in said information field.

38. The apparatus of claim 1, 14, or 24, wherein said transfer initiation means including a supervisor link element comprising an operation code field, at least one information field, and at least one operand field.

39. The apparatus according to claim 38 wherein transfer of processor control from the invoking program to the invoked program is selectively dependent upon the results of a decode of said operation code field.

40. The apparatus of claim 38 wherein transfer of processor control from the invoking program to the invoked program is selectively dependent upon results of a decode of said information field.

41. The apparatus of claim 38 wherein transfer of processor control from the invoking program to the invoked program is selectively dependent upon pre-assigned values being inserted in said information field.

42. Synchronous program control apparatus for a processor of a computer system for transferring control of the processor from an invoking program to an entry joint of an invoked program and back, comprising:
 first decode means for decoding a supervisor link element associated with the invoking program and generating signals for selectively locating a function control means of a function control array;
 first responsive means responsive to said signals generated by said first decode means for generating signals to conditionally obtain a status save means;

second responsive means responsive to signals generated by said first responsive means for initializing the invoked program to pre-selectable, locatable parameters of the invoking program;

third responsive means responsive to said second responsive means for executing the invoked program;

second decode means for decoding a supervisor link element associated with the invoked program and generating signals for locating the invoking program; and fourth responsive means responsive to signals generated by said second decode means for conditionally modifying the invoking program to pre-selectable, locatable parameters of the invoked program and conditionally releasing said status save means.

43. The apparatus of claim 42, wherein the invoking program is locatable on a prioritized task dispatching element of a task queue register means.

44. The program control apparatus of claim 43, wherein said status save means comprises:

available queue register means; and at least one call return element addressable by said available queue register means when said call return element is available, with said call return element being selectively insertable with pre-selectable, locatable data for identifying one or more parameters of the invoking program.

45. The program control apparatus of claim 44, further comprising a send means for inserting at least one call return element onto said prioritized task dispatching element.

46. The program control apparatus of claim 44, wherein at least one call return element is rendered unavailable when said pre-selectable, locatable data is inserted thereon.

47. The program control apparatus of claim 44, wherein said available queue register means is in main storage of said computer system.

48. The program control apparatus of claim 47, wherein the transfer of processor control initiated by said first decode means is conditionally responsive to said function control means.

49. The program control apparatus of claim 44, further including an available queue waiting register means for removing the invoking program from said available queue register means and inserting the status of the invoking program onto said available queue waiting register means when said call return element is unavailable.

50. The program control apparatus of claim 43, wherein said available queue register means is in main storage of said computer system.

51. The program control apparatus of claim 42, wherein said first decode means includes a receive means for removing a call return element from an available queue register means.

52. The program control apparatus of claim 42, wherein the transfer of processor control initiated by said first decode is conditionally responsive to said function control means.

* * * * *

UNITED STATES PATENT AND TRADEMARK OFFICE
CERTIFICATE OF CORRECTION

PATENT NO. : 4,257,096

DATED : March 17, 1981

INVENTOR(S) : J. Warren McCullough et al.

It is certified that error appears in the above—identified patent and that said Letters Patent is hereby corrected as shown below:

Column 39, line 40, "initiation" should read --initialization--.

Signed and Sealed this

Third Day of November 1981

[SEAL]

Attest:

Attesting Officer

GERALD J. MOSSINGHOFF

Commissioner of Patents and Trademarks